(12) United States Patent
Kharagorgiiev et al.

(10) Patent No.: US 12,164,301 B2
(45) Date of Patent: Dec. 10, 2024

(54) METHODS, DEVICES AND SYSTEMS FOR FACILITATING OPERATIONS OF MOBILE ROBOTS

(71) Applicant: STARSHIP TECHNOLOGIES OÜ, Tallinn (EE)

(72) Inventors: Sergii Kharagorgiiev, Tallinn (EE); Thomas Schildhauer, Tallinn (EE); Ahti Heinla, Ravila (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 120 days.

(21) Appl. No.: 17/916,908

(22) PCT Filed: Apr. 16, 2021

(86) PCT No.: PCT/EP2021/059973
§ 371 (c)(1),
(2) Date: Oct. 4, 2022

(87) PCT Pub. No.: WO2021/219404
PCT Pub. Date: Nov. 4, 2021

(65) Prior Publication Data
US 2023/0152810 A1    May 18, 2023

(30) Foreign Application Priority Data

Apr. 27, 2020  (EP) .................................. 20171622

(51) Int. Cl.
G05D 1/00    (2024.01)

(52) U.S. Cl.
CPC ......... *G05D 1/0214* (2013.01); *G05D 1/0088* (2013.01)

(58) Field of Classification Search
None
See application file for complete search history.

(56) References Cited

U.S. PATENT DOCUMENTS

| 4,549,841 A | 10/1985 | Ishige |
| 5,664,928 A | 9/1997 | Stauber |

(Continued)

FOREIGN PATENT DOCUMENTS

| EP | 17172808.2 | 5/2017 |
| WO | 2011/035839 A2 | 3/2011 |
| WO | 2017064202 A1 | 4/2017 |

OTHER PUBLICATIONS

Dogru et al., "Traffic Accident Detection Using Random Forest Classifier", Proceedings of the 2018 15th Learning and Technology Conference (L&T), Feb. 25-26, 2018, pp. 40-45 (Year: 2018).*

(Continued)

*Primary Examiner* — Tamara L Weber
(74) *Attorney, Agent, or Firm* — Siritzky Law, PLLC

(57) ABSTRACT

The present invention relates to a road crossing method for a mobile robot. The road crossing method comprises the mobile robot approaching a road crossing. Further, the road crossing method comprises estimating, with a data processing unit, a location and time of collision with at least one dynamic object on the road crossing. Further still, the road crossing method comprises generating, with the data processing unit, control commands for the mobile robot to avoid collision with the at least one dynamic object based on the estimated location and time of collision with the at least one dynamic object. In addition, the present invention relates to a mobile robot comprising the data processing unit and configured to carry out the road crossing method. In a further aspect, the present invention relates to a positioning method for a wheeled mobile robot positioned on a sloped terrain, comprising the mobile robot performing at least one maneuver for minimizing a magnitude of an acceleration vector of the mobile robot due to the gravity force acting on the (Continued)

mobile robot. In addition, the present invention relates to a mobile robot configured to carry out the positioning method.

17 Claims, 17 Drawing Sheets

(56) References Cited

U.S. PATENT DOCUMENTS

| | | | |
|---|---|---|---|
| 5,942,869 A | 8/1999 | Katou et al. | |
| 6,467,293 B1 | 10/2002 | Goosman | |
| 6,602,037 B2 | 8/2003 | Winkler | |
| 7,073,634 B2 | 7/2006 | Mitchell et al. | |
| 7,320,289 B1 | 1/2008 | Clarke et al. | |
| 7,894,939 B2 | 2/2011 | Zini et al. | |
| 7,931,431 B2 | 4/2011 | Benedict et al. | |
| 8,010,230 B2 | 8/2011 | Zini et al. | |
| 8,104,601 B2 | 1/2012 | Hayduchok et al. | |
| 8,204,624 B2 | 6/2012 | Zini et al. | |
| 8,485,285 B2 | 7/2013 | Ferrigni | |
| 8,874,360 B2 | 10/2014 | Klinger et al. | |
| 8,948,914 B2 | 2/2015 | Zini et al. | |
| 9,020,632 B2 | 4/2015 | Naylor | |
| 9,031,692 B2 | 5/2015 | Zhu | |
| 9,244,147 B1 | 1/2016 | Soundararajan et al. | |
| 9,256,852 B1 | 2/2016 | Myllymaki | |
| 9,266,675 B2 | 2/2016 | Yamashita | |
| 9,373,149 B2 | 6/2016 | Abhyanker | |
| 9,557,740 B2 | 1/2017 | Crawley | |
| 9,561,941 B1 | 2/2017 | Watts | |
| 9,694,976 B1 | 7/2017 | Wurman et al. | |
| 9,844,879 B1 | 12/2017 | Cousins et al. | |
| 2003/0165373 A1 | 9/2003 | Felder et al. | |
| 2005/0207876 A1 | 9/2005 | Springwater | |
| 2006/0237239 A1 | 10/2006 | Bruner et al. | |
| 2010/0324771 A1* | 12/2010 | Yabushita | G05D 1/024 701/25 |
| 2012/0090110 A1 | 4/2012 | Van Den Berg et al. | |
| 2013/0110281 A1 | 5/2013 | Jones et al. | |
| 2013/0332021 A1 | 12/2013 | Goren | |
| 2014/0136414 A1 | 5/2014 | Abhyanker | |
| 2014/0254896 A1 | 9/2014 | Zhou et al. | |
| 2014/0365258 A1 | 12/2014 | Vestal et al. | |
| 2015/0006005 A1 | 1/2015 | Yu et al. | |
| 2015/0045945 A1 | 2/2015 | Zini et al. | |
| 2015/0100152 A1 | 4/2015 | Barragan Trevino et al. | |
| 2015/0183581 A1 | 7/2015 | Worsley | |
| 2015/0379468 A1 | 12/2015 | Harvey | |
| 2016/0185466 A1 | 6/2016 | Dreano, Jr. | |
| 2016/0207710 A1 | 7/2016 | Conrad et al. | |
| 2016/0325928 A1 | 11/2016 | Lepek et al. | |
| 2016/0355337 A1 | 12/2016 | Lert et al. | |
| 2016/0368464 A1 | 12/2016 | Hassounah | |
| 2017/0017237 A1 | 1/2017 | Tokuyama et al. | |
| 2017/0043768 A1 | 2/2017 | Prokhorov | |
| 2017/0100837 A1 | 4/2017 | Zevenbergen et al. | |
| 2017/0185853 A1 | 6/2017 | Yokota et al. | |
| 2017/0220981 A1 | 8/2017 | Shucker et al. | |
| 2017/0267452 A1 | 9/2017 | Goren et al. | |
| 2018/0020896 A1 | 1/2018 | High et al. | |
| 2018/0329418 A1 | 11/2018 | Baalke | |
| 2018/0349834 A1 | 12/2018 | Heinla et al. | |
| 2019/0244525 A1 | 8/2019 | Heinla | |
| 2019/0322275 A1* | 10/2019 | Ondruska | G01C 21/3635 |
| 2021/0053561 A1* | 2/2021 | Beller | B60W 30/18154 |
| 2023/0150547 A1* | 5/2023 | Silva | B60W 60/0027 701/26 |

OTHER PUBLICATIONS

Zantalis et al., "A Review of Machine Learning and IoT in Smart Transportation", Future Internet, Apr. 10, 2019, pp. 1-23 (Year: 2019).*

Liu et al., "Design and Implementation of an Object Learning System for Service Robots by using Random Forest, Convolutional Neural Network, and Gated Recurrent Neural Network", 2019 IEEE International Conference on Systems, Man and Cybernetics (SMC), Oct. 6-9, 2019, pp. 933-940 (Year: 2019).*

Acharya, "Template Matching based Object Detection Using HOG Feature Pyramid" Jun. 27, 2014.

Anonymous (Jacobs): "Lieferroboter Starship: "Klauen wurde ich ihn nicht"—Auto—Tagesspiegel" Nov. 29, 2015 (and English translation) Retrieved from the Internet: URL: http://www.tagesspiegel.de/mobil/lieferroboter-starship-klauen-wuerde-ich-ihn-nicht/12647114.html.

Baker: "Automated Street Crossing for Assistive Robots" Proceedings of the 2005 IEEE, Jun. 28-Jul. 1, 2005, http://citeseerx.ist.psu.edu/viewdoc/downloaddoi=10.1.1.124.2156 rep=rep 1 type=pdf.

Benamar et al "Visual contact with catadioptric cameras" Robotics and Autonomous Systems, Elsevier BV, Amsterdam, NL, vol. 64, Nov. 11, 2014 (Nov. 11, 2014), p. 100-119, ISSN 0921-8890.

Felzenszwalb et al., "Object Detection with Discriminatively Trained Part-Based Models", in IEEE Transactions on Pattern Analysis and Machine Intelligence, vol. 32, No. 9, pp. 1627-1645, Sep. 1, 2010.

J. Johnson and K. Hauser, "Optimal acceleration-bounded trajectory planning in dynamic environments along a specified path," 2012 IEEE International Conference on Robotics and Automation, Jun. 28, 2012, pp. 2035-2041.

Jiménez et al, F. An Improved Method to Calculate the Time-to-Collision of Two Vehicles. Int. J. ITS Res. 11, 34-42, Boston (Jan. 1, 2013).

Kant, Kamal Zucker, Steven. (Sep. 1986). Toward Efficient Trajectory Planning: The Path-Velocity Decomposition. International Journal of Robotic Research—IJRR. 5. 72-89.

Liu et al, "SSD: Single Shot MultiBox Detector", in Computer Vision—ECCV 2016, pp. 21-37, Springer International Publishing, Dec. 29, 2016.

Pettitt: "Forget-delivery-drones-meet-your-new-delivery-robot" Nov. 2, 2015, Retrieved from the Internet: URL: https://www.cnbc.com/2015/11/02/forget-delivery-drones-meet-your-new-delivery-robot.html.

Radwan et al, "Why did the robot cross the road?—Learning from multi-modal sensor data for autonomous road crossing", 2017 IEEE/RSJ International Conference On Intelligent Robots and Systems (IROS), IEEE,Sep. 24, 2017 (Sep. 24, 2017), p. 4737-4742.

Redmon et al. "You Only Look Once: Unified, Real-Time Object Detection" May 9, 2015, also in 2016 IEEE Conference on Computer Vision and Pattern Recognition (CVPR).

Van Workum et al, "Smart wheelchair guidance using optical flow", Image and Vision Computing New Zealand, 2009. IVCNZ '09. 24th International Conference, IEEE, Piscataway, NJ, USA,Nov. 23, 2009 (Nov. 23, 2009), p. 7-11.

WIPO, International Preliminary Report on Patentability Chapter I, in PCT/EP2021/059973, Nov. 1, 2022 [8 pgs.].

WIPO, Written Opinion of the International Searching Authority in PCT/EP2021/059973, Apr. 11, 2021 [7 pgs.].

WIPO, International Search Report in PCT/EP2021/059973, Apr. 11, 2021 [4 pgs.].

Leibe et al (Eds.), Computer Vision—ECCV 2016, 14th European Conference, Amsterdam, The Netherlands, Oct. 11-14, 2016, Lecture Notes in Computer Science, Springer.

* cited by examiner

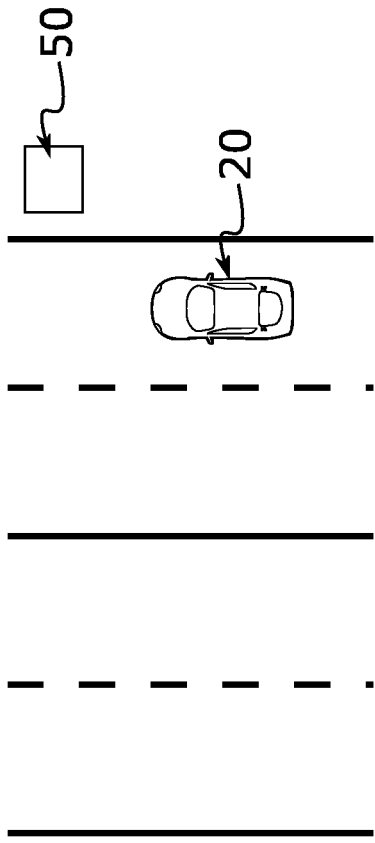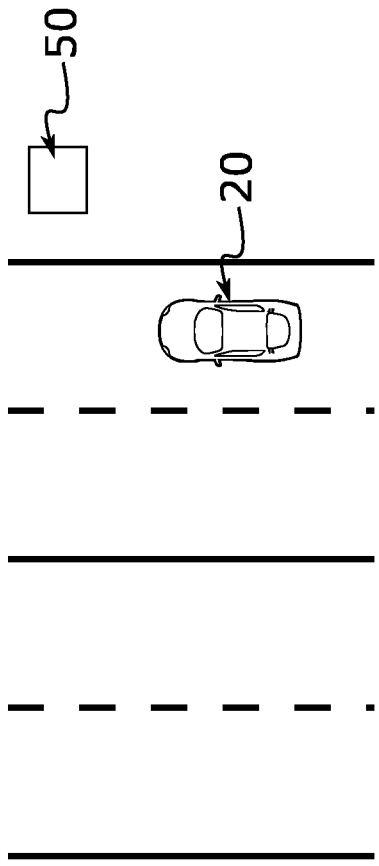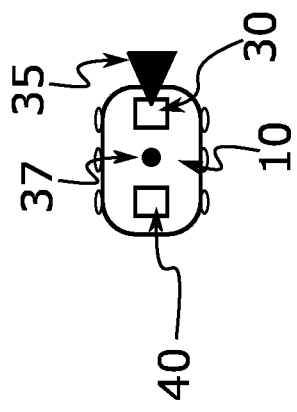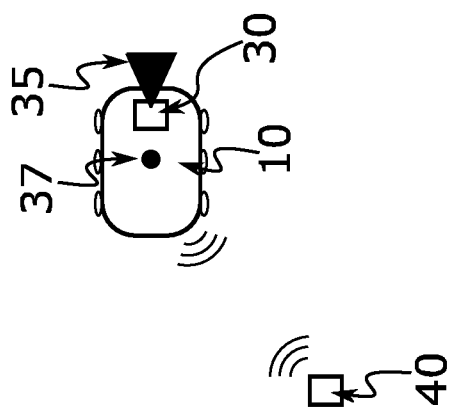
Fig. 1a
Fig. 1b

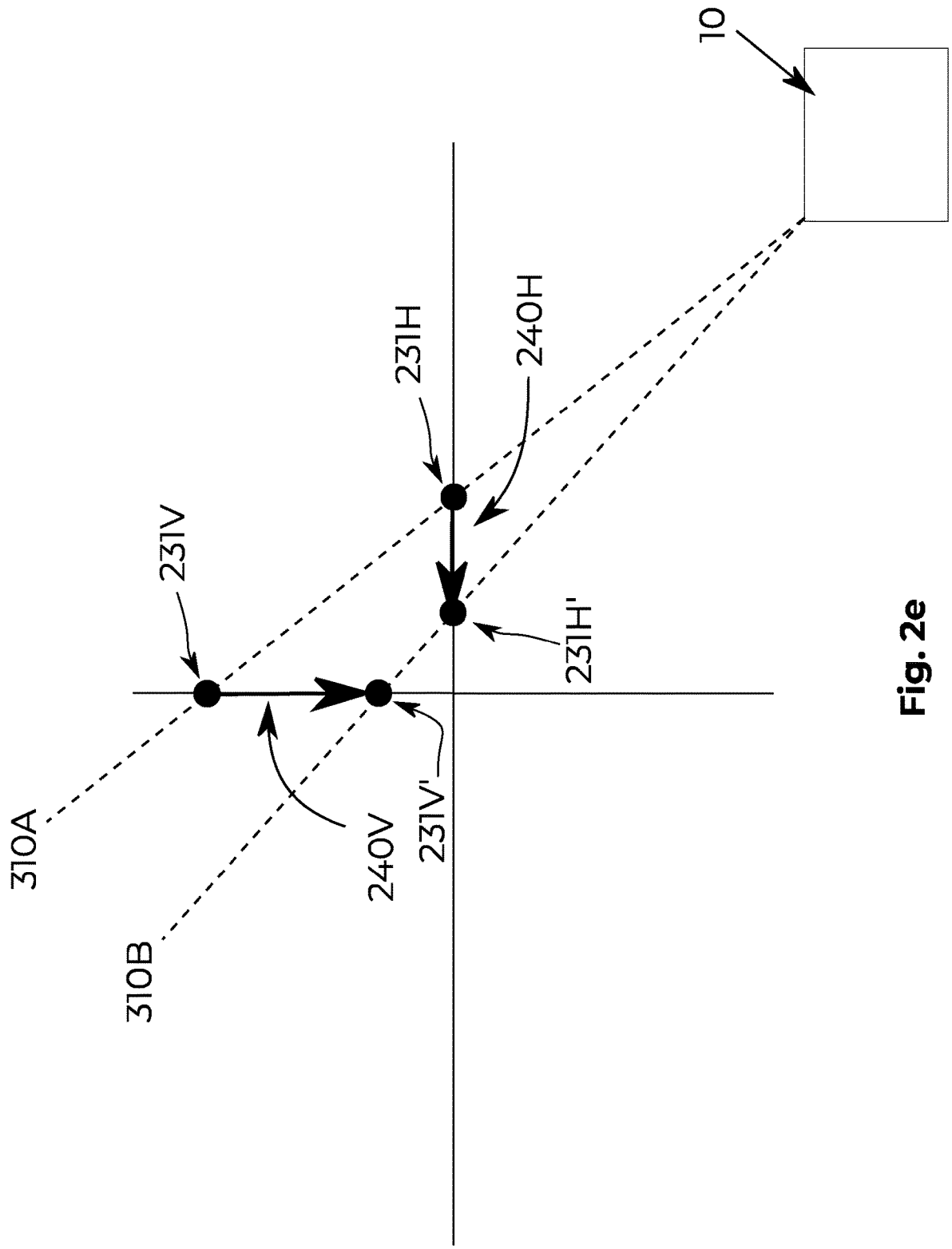

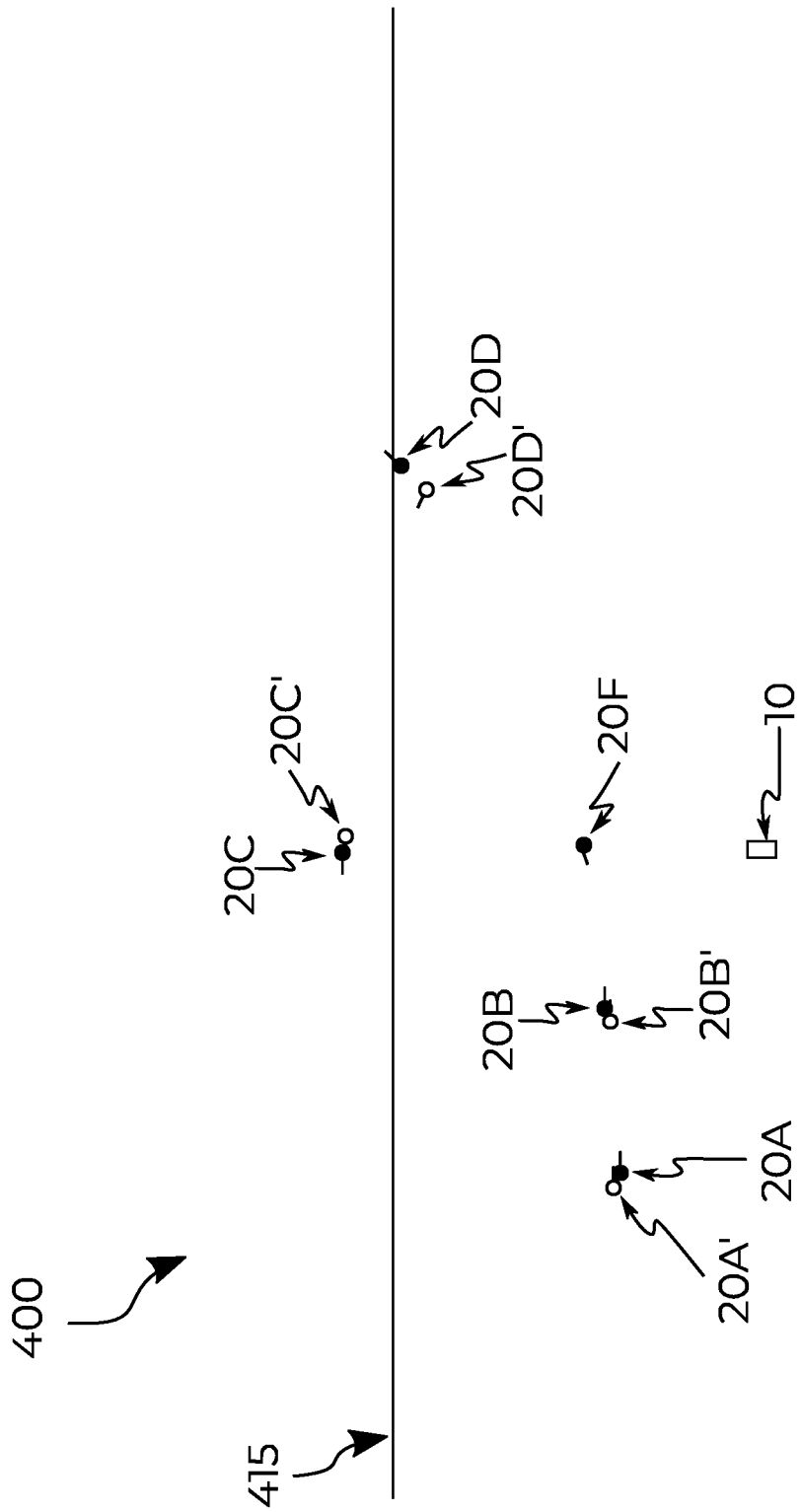

(a)

(b)

(c)

(d)

METHODS, DEVICES AND SYSTEMS FOR FACILITATING OPERATIONS OF MOBILE ROBOTS

RELATED APPLICATIONS

This application is the National Stage (a 371) of International Application No. PCT/EP2021/059973, filed Apr. 16, 2021, the entire contents of which are hereby fully incorporated herein by reference for all purposes. PCT/EP2021/059973 claims the priority benefit of European patent application 20171622.2, filed Apr. 27, 2020, the entire contents of which are hereby fully incorporated herein by reference for all purposes.

FIELD OF INVENTION

The invention relates to mobile robot operations in outdoor environments.

INTRODUCTION

Recently, mobile robots have been increasingly deployed in outdoor environments. Such robots are used for maintenance (such as grass mowing or snow cleaning), security (such as surveillance or patrolling), and services (such as carrying items or delivering parcels). For example, Starship Technologies has disclosed and launched a mobile robot configured to transport items between different locations, such as to deliver them to recipients. The applicant's international patent application WO 2017/064202 A1 discloses such mobile delivery robots.

For an efficient operation, it is advantageous that such mobile robots are configured to operate autonomously. Hence, they are generally outfitted with a plurality of sensors allowing the robots to build a computer vision picture of their surroundings, to perform navigation, mapping and localisation. The applicant's application WO 2017/064202 A1 also discloses a large number of such sensors that can be used in a complimentary way to ensure safe and efficient operation of mobile delivery robots.

Autonomy of such mobile robots should not be provided by sacrificing safety. That is, the motion of the mobile robot should be continuously planned such that it can safely travel between locations. Thus, the planned motion should be calculated such that the robot's trajectory does not intersect with static objects or with the trajectories of moving objects in the environment. For example, mobile robots travelling outdoors on sidewalks need to follow a path such that they don't collide with static objects like walls, buildings, traffic signs, posts, parked vehicles, people, etc. In addition, moving objects may intersect such a path during a period of time. To avoid collisions with the moving objects, either a new path needs to be calculated or the speed and acceleration of the robot need to be adjusted such that the robot can avoid colliding with the moving objects. For example, the robot can wait for the moving obstacle to pass. It will be noted that through the text the terms moving object, dynamic object, moving obstacle and dynamic obstacle are used interchangeably.

Several motion planning algorithms for obstacle avoidance exist. The basic idea behind such algorithms is to calculate (i.e. plan) a motion that connects a start location with and end location, while avoiding collisions with known obstacles. Generally, a configuration space is generated. The configuration space describes the pose of the robot and objects in the surrounding environment in relation to the robot. The configuration space may comprise a target space. The target space may comprise one or more targets (and/or intermediate targets) that the robot needs to reach. In addition, the configuration space may comprise a free space, obstacle space and danger space. The free space represents space that the robot may safely travel, obstacle space may represent occluded space by objects in the environments that the robot cannot move to and danger space may be space that the robot can reach but not in a safe manner (e.g. canals, mud pits). Thus, the motion planning problem consists on finding a path on the free space of the configuration space that allows the robot to reach the targets in the target space. The configuration space with some or all of the above components can be generated based on the sensory data obtained by the sensors in the mobile robot. In addition, external data such as maps can be used. Once the configuration space is generated, different algorithms can be used to find a valid safe path. Some examples of such algorithms are: grid-base (or graph) search, reward-based approaches, artificial potential field approaches and sampling-based approaches.

The motion planning problem, becomes more complex when moving objects are present, e.g. during a road crossing. This is due to the fact that the configuration space is not static when moving objects are considered. That is, the free space and obstacle space is constantly changing. Thus, a path that is valid at an instant of time may be occluded by a moving object at another instant.

In the following, some existing techniques that deal with the problem of collision avoidance with dynamic objects are presented.

Kant and Zucker in their paper K. Kant and S. W. Zucker, "Toward efficient trajectory planning: the path-velocity decomposition," Int. J. Rob. Res., vol. 5, September 1986, present an approach for solving the trajectory planning problem in time-varying environments. They decompose the trajectory planning problem in time-varying environments into two subproblems: (1) planning a path to avoid collision with static obstacles and (2) planning the velocity along the path to avoid collision with moving obstacles.

Johnson and Hauser in their paper J. Johnson and K. Hauser, "Optimal acceleration-bounded trajectory planning in dynamic environments along a specified path," 2012 IEEE International Conference on Robotics and Automation, Saint Paul, MN, 2012, extend the work by Kant and Zucker by planning safe trajectories along a given path in the presence of dynamic obstacles under acceleration bounds.

US patent application US 2017/0017237 A1 "Autonomous moving object" discloses an environment information acquisition unit that acquires a signal state of a traffic light. A self-position estimation unit estimates a self-position of the autonomous moving object. A traveling route decision unit calculates a first time necessary to move along a first route from the self-position to an end point of a crosswalk and a second time necessary to move along a second route from the self-point to a start point of the crosswalk in a case in which the signal state is changed from blue to red on the crosswalk after a predetermined time or in a case in which the signal state is changed from blue to red, and selects a route corresponding to a time smaller between the first time and the second time. A vehicle control unit controls autonomous movement of the autonomous moving object so that the autonomous moving object moves along the selected route.

US 2017/0043768A1 discloses an autonomous vehicle that may operate in an environment in which there is an unexpected dynamic object. The autonomous vehicle can detect the dynamic object. The dynamic object can have an associated movement. The movement of the dynamic object can be tracked. The movement of the dynamic object can be classified as being one ballistic or non-ballistic. It can be determined whether the dynamic object is on a collision course with the autonomous vehicle. Responsive to determining that the dynamic object is on a collision course with the autonomous vehicle, a driving maneuver for the autonomous vehicle can be determined. The driving maneuver can be based at least in part on the movement of the dynamic object. The autonomous vehicle can be caused to implement the determined driving maneuver.

US patent application US 2018/0329418 A1 "Methods for autonomously navigating across uncontrolled and controlled intersections" discloses one variation of a method for autonomously navigating along a crosswalk. The method includes: at a first time, navigating autonomously along a sidewalk toward a crosswalk coinciding with a navigation route assigned to the autonomous vehicle; recording optical data of a scene proximal the autonomous vehicle via an optical sensor integrated into the autonomous vehicle; aligning an anteroposterior axis of the autonomous vehicle to the crosswalk detected in the optical data; identifying a pedestrian proximal the crosswalk in the optical data; in response to the pedestrian entering the crosswalk at a second time succeeding the first time, predicting right of way of the autonomous vehicle to enter the crosswalk; and, in response to predicting right of the autonomous vehicle to enter the crosswalk, autonomously navigating from the sidewalk into the crosswalk and autonomously navigating along the crosswalk to an opposing sidewalk according to the navigation route.

US patent application US 2019/0244525 A1 "Mobile robot having collision avoidance system for crossing a road from a pedestrian pathway" discloses a collision avoidance method and system for a mobile robot crossing a road. When a mobile robot approaches a road, it senses road conditions via at least one first sensor, and initiates road crossing if the road conditions are deemed suitable for crossing. As it crosses the road, the mobile robot senses, via at least one second sensor, a change in the road conditions indicating the presence of at least one hazardous moving object. In response to determining that at least one hazardous object in present, the mobile robot initiates a collision avoidance maneuver. A mobile robot configured to avoid collisions while crossing a road includes: at least one first sensor configured to sense road conditions, at least one second sensor configured to sense road conditions, and a processing component configured to carry out one or more collision avoidance maneuvers.

Although existing methods are satisfactory to some extent, further improvements for collision avoidance under the presence of dynamic objects may be required to further mitigate the problem. For example, some existing techniques for motion planning under the presence of dynamic objects assume perfect knowledge on the trajectory of the dynamic objects. However, more often than not, the trajectory of the vehicles is not known by the mobile robot crossing the road. Some existing road crossing techniques are based on monitoring either traffic lights or pedestrians on the same road crossing. Thus, such techniques are only valid on signalized road crossing or when pedestrians are present.

To increase safety and autonomy of land based mobile robots that generally travel on sidewalks, improved methods are required for crossing roads.

SUMMARY

In a first aspect, the present invention relates to a road crossing method for a mobile robot. The road crossing method comprises the mobile robot approaching a road crossing. Further, the road crossing method comprises a data processing unit estimating a location and time of collision with at least one dynamic object on the road crossing. The data processing unit further generates control commands for the mobile robot to avoid collision with at least one dynamic object based on the estimated location and time of collision with the at least one dynamic object.

As an initial matter, the present invention can increase safety of operation of the mobile robot. Crossing roads may impose a more challenging task to the mobile robot, compared to its usual routine (e.g. traveling on sidewalks). This is because moving vehicles, generally travelling at high speeds, may be present on the roads to be crossed. Furthermore, the participation of mobile robots in traffic is a relatively new development. As such, other traffic participants such as car drivers, may not be used to the presence of the mobile robots. This imposes further danger as the other traffic participants such as car drivers may not be tolerative or yield to the mobile robot. The present invention alleviates this by providing a road crossing method for facilitating a mobile robot safe road crossing.

Secondly, the present road crossing method can be advantageous as it can increase autonomy of the mobile robot and, more particularly, the number of road crossings that the mobile robot can perform autonomously. Generally, according to prior art methods, a mobile robot is assisted by a human operator during the road crossing. This is particularly true for crossing wide roads, non-signalized roads, roads with a high-speed limit and roads with multiple lanes. The present invention provides a data processing unit generating control commands for the mobile robot (instead of a human operator), thus facilitating the robot to cross roads autonomously. Performing the road crossing autonomously alleviates the need of an operator, establishing a communication channel with an operator and waiting for an available operator. Thus, the road crossing can be performed faster, with a higher energy efficiency and less use of data communication resources, such as, bandwidth.

Furthermore, the present road crossing method is particularly advantageous for avoiding collisions with dynamic objects, such as, moving cars. In one hand, this can increase safety of the mobile robot and the traffic participants. On the other hand, this can increase the versatility of roads that can be crossed using the present method.

In some embodiments, the road crossing method can comprise an object detector detecting at least one dynamic object on the road crossing. On the one hand, this can facilitate the automation of the road crossing method, as the dynamic objects can be detected using an object detector. On the other hand, detecting dynamic objects that can be present on the road crossing can facilitate estimating a location and time of collision with the at least one dynamic object on the road crossing. That is, with the object detector at least one object on the road crossing can be detected. Then, for each of the detected objects and particularly for each of the dynamic objects, the data processing unit can estimate a location and time of collision.

The road crossing method can further comprise the object detector estimating a location of the at least one dynamic object. This can facilitate calculating the position of the at least one dynamic object relative to the mobile robot. This step can be performed for each of the detected dynamic objects.

The road crossing method can further comprise the object detector estimating a speed and direction of motion of the at least one dynamic object. That is, in some embodiments, a velocity vector of the at least one dynamic object can be estimated. This can be advantageous as it can provide information on the motion of the at least one dynamic object relative to the mobile robot. This can facilitate estimating a location and time of collision with the at least one dynamic object.

Put simply, the method can comprise estimating the location and velocity vector of the at least one detected dynamic object, preferably, of each detected dynamic object. This can facilitate estimating or predicting, for the at least one dynamic object, the trajectory that the dynamic object can follow. Based on this and the trajectory of the mobile robot, the location and time of collision with the at least one dynamic object can be estimated.

In some embodiments, the road crossing method can comprise estimating a physical feature of the at least one dynamic object, such as, size, shape, color or any combination thereof. For example, this can be performed by processing images, or portions of images, corresponding to the at least one dynamic object. In one hand, estimating physical features of the at least one dynamic object can facilitate determining a type of the object, i.e., classifying the objects. On the other hand, the estimated physical features can provide more information on the detected objects, which can be used to facilitate the estimation of the location and/or velocity of the at least one detected dynamic object.

In some embodiments, the method can comprise the object detector classifying the at least one dynamic object on at least one class, said classes comprising at least one of a car class, a bus class, a motorbike class, a pedestrian class, a bicycle class, a mobile robot class, a transportation device class, a low-speed transportation device, a high-speed transportation device, a light transportation device, a heavy transportation device or the like. That is, the object detector can be configured to detect a type or class that the detected object can belong to. This can be advantageous as it can provide a more accurate understanding of the surroundings. Moreover, norms, rationales and/or regulations applying to the type of detected object can be used to facilitate the estimation of the location, the velocity vector and/or the trajectory of the detected object. For example, if the detected object is a car then it can be expected that it is positioned within the boundaries of a road.

Further still, in some embodiments the method can comprise generating the control commands based on the type or class of the detected object. For example, the control commands can be generated such that the robot gives priority to heavy objects and/or fast-moving objects. This can increase the safety of crossing the road according to the control commands.

The object detector can comprise a processing unit (e.g. a programmable processor). The processing unit can allow the object detector to perform calculations, estimations and/or classifications as discussed above.

In some embodiments, the data processing unit can comprise the object detector. That is, the data processing unit can be configured to detect at least one dynamic object, estimate the location of the at least one dynamic object, estimate the velocity vector of at least one dynamic object, classify the at least one dynamic object or any combination thereof.

In other words, in some embodiments, the method can comprise detecting at least one dynamic object, estimating the location of the at least one dynamic object, estimating the velocity vector of at least one dynamic object, classifying the at least one dynamic object or any combination thereof, as discussed. In some embodiments, these steps can be performed by an object detector which can be separate from the data processing unit. Alternatively, the data processing unit can comprise the object detector and said steps can be performed by the data processing unit. Alternatively still, the object detector and the data processing unit can jointly perform said steps. For example, the object detector can detect at least one dynamic object and the data processing unit can estimate the location of the at least one dynamic object, estimate the velocity vector of at least one dynamic object and/or classify the at least one dynamic object.

In some embodiments, the step of the data processing unit estimating a location and time of collision with at least one dynamic object on the road crossing can comprise the data processing unit predicting a predicting a trajectory of motion of the at least one dynamic object and detecting at least one intersection between the trajectory of motion of the at least one dynamic object and the trajectory of motion of the mobile robot.

Predicting a trajectory of motion of the at least one dynamic object can comprise extending a velocity vector of the at least one dynamic object. That is, typically a dynamic object on a road crossing does not change its motion abruptly. Based on this rationale, the velocity vector of a dynamic object at a time instant can be used to predict the trajectory of the object during a time interval following the time instant. Particularly for short time intervals, this can provide an accurate prediction of the trajectory of the object.

Extending a velocity vector can comprise multiplying the velocity vector with an extending constant or extending vector. That is, the trajectory of the object can be predicted, at least fora short time interval (e.g. 0.1 to 1 second), assuming a linear motion of the object, at least during the short time interval. This can be particularly advantageous as it requires few computational resources for estimating the trajectory of the dynamic objects. Moreover, this can provide an accurate way of estimating the trajectory of dynamic objects, particularly if the velocity vector of the dynamic object is measured multiple times, preferably with short time intervals between each measurement, and after each measurement the trajectory of the object is updated by extending the latest velocity vector measurement.

In some embodiments, the method can comprise estimating a velocity vector of the at least one dynamic object based on at least one velocity measurement of the velocity of the at least one dynamic object, such as, based on at least one radar measurement. Measuring the velocity vector of the at least one dynamic object can be advantageous as it can provide an instantaneous speed and direction of motion of the at least one dynamic object. This can be used to predict the trajectory of the at least one object, e.g., as discussed above.

In some embodiments, the velocity vector of the at least one dynamic object can be based on at least two detections of the at least one dynamic object. That is, in some embodiments, the velocity vector of a dynamic object can be measured indirectly. For example, the object can be detected at a first timestamp positioned at a first location. At a second timestamp, after the first timestamp, the object can be detected again at a second location. Based on the first and second timestamp and the first and second location, the speed and direction of motion of the object can be estimated.

The method can comprises using a probabilistic filter, such as, a Kalman filter, to estimate the velocity vector of the at least one dynamic object. The probabilistic filter may receive as input at least one timestamp and corresponding location(s) of an object, prior to a time instant, and based thereon can estimate the velocity vector of the object at the time instant.

In some embodiments, the step of the data processing unit predicting a trajectory of motion of the at least one dynamic object can comprise extrapolating at least two previous locations of the at least one dynamic object. This can be particularly advantageous if the location of the dynamic object is estimated regularly within short time intervals, e.g., every 0.1 to 1 second.

Extrapolating at least two previous locations of the at least one dynamic object is based on a linear extrapolation technique. Based on the rationale that an object does not change its motion abruptly, the linear extrapolation technique can provide accurate estimations (i.e. predictions) of the trajectory of the object, particularly if the estimations are performed regularly within short time intervals, e.g., every 0.1 to 1 second.

In some embodiments, the method can comprise correcting the estimated location and time of collision with at least one dynamic object.

In some embodiments the estimated location and time of collision with at least one dynamic object can be corrected based on the type or class of the object. That is, as discussed above, in some embodiments physical features of an object can be detected and/or the objects can be classified into one or more classes. Based on the physical features of the object and/or the type of the objects the estimated location and time of collision with at least one dynamic object can be corrected. More particularly, norms, rationales and/or regulations applying to the type or class of the detected object can be used to facilitate the estimation of the location, the velocity vector and/or the trajectory of the detected object. For example, if the detected object is a car then it can be expected that it is positioned within the boundaries of a road.

In some embodiments, the road crossing method can comprise correcting the estimated location and time of collision with at least one dynamic object based on history data related to the crossing. In other words, history data that can be descriptive of a road crossing can be used to increase the accuracy of estimating the location and time of collision with at least one dynamic object on the road crossing.

The history data related to a road crossing can comprise a passing car histogram related to the road crossing and the method further comprises the data processing unit correcting the estimated location and time of collision based on the passing car histogram. The passing car histogram can indicate a number or frequency of traffic participants, particularly vehicles, passing on the road crossing. That is, the passing car histogram can indicate the volume of traffic on the road crossing. In some embodiments, the passing car histogram can indicate the volume of traffic for multiple sections of the road crossing. For example, for each of the lanes of the road, the passing car histogram can indicate the volume of traffic that passes thereon. The passing car histogram can thus be used to infer sections or lanes or zones on a road crossing that can comprise a high frequency of passing cars and thus a high likelihood of a collision with a dynamic object.

The step of the data processing unit correcting the estimated location and time of collision based on the passing car histogram can comprise correcting the estimated location and time of collision based on the mean and/or variance of the passing car histogram.

The step of correcting the estimated location and time of collision based on a passing car histogram related to the road crossing can comprise calculating the location and time of collision as a weighted average of the estimated location and time of collision and the mean or mode of the passing car histogram. This can be particularly advantageous for dealing with erroneous estimations and/or erroneous measurements used for the estimation.

The weighting constants used during the calculation of the weighted average can depend on the type of road crossing, time of day, salience of the road crossing, accuracy of estimation of the location and time of collision, accuracy of the passing car histogram, amount of data used to calculate the passing car histogram for that road crossing or the like. In some embodiments, the weighting constants used during the calculation of the weighted average can be calculated based on an artificial neural network algorithm.

In some embodiments, the method can comprise generating a collision point distribution related to the road crossing and wherein the collision point distribution of a road crossing can indicate for each point along the road crossing a probability of the mobile robot colliding with a dynamic object. The collision point distribution can be generated based on the rationale that the higher the frequency of passing car on a portion of the road (e.g. on a lane) the higher the likelihood of a collision with a dynamic object therein.

The method can further comprise the data processing unit correcting the estimated location and time of collision based on the collision point distribution, such as, based on the mean and/or variance of the collision point distribution.

The step of correcting the estimated location and time of collision based on a collision point distribution related to the road crossing can comprise calculating the location and time of collision as a weighted average of the estimated location and time of collision and the mean or mode of the collision point distribution. The weighting constants used during the calculation of the weighted average can depend on the type of road crossing, time of day, salience of the road crossing, accuracy of estimation of the location and time of collision, accuracy of the collision point distribution amount of data used to calculate the collision point distribution for that road crossing or the like. In some embodiments, the weighting constants used during the calculation of the weighted average can be calculated based on an artificial neural network algorithm.

The road crossing method can comprise generating the collision point distribution of a road crossing based on history data comprising dynamic object detections during at least one previous mobile robot road crossing on the road crossing. The history data can be accumulated by multiple mobile robots. Alternatively or additionally, the method can comprise receiving data from an external database and generating the collision point distribution based on the data received from the external database. The external database can for example be a database operated by an authority or agency dealing with transportations, such as, a transportation authority and a road traffic authority.

In some embodiments, the external database can comprise a map, preferably a map of roads and for each road it can comprise corresponding traffic data, such as, the volume of traffic at different times of day. An example of this can be traffic maps.

In some embodiments, the road crossing method can comprise generating the collision point distribution of a road crossing based on a passing car histogram related to the road crossing.

In some embodiments, the road crossing method can comprise generating a time to collision (TTC) map based on the estimated locations and time of collision with at least one dynamic object. The TTC map can be a two-dimensional map comprising in a first axis the distance along the road crossing and in a second axis the time. Thus, each point (i.e. coordinate) on the TTC map can indicate a position along the road crossing at a time instant. The TTC map can thus facilitate mapping the estimated locations and time of collision.

The road crossing method can comprise upon detecting a dynamic object and estimating the location and time to collision with the dynamic object, labeling a collision zone of the TTC map as occupied by the dynamic object. In other words, for each detected dynamic object the estimated time and location of collision can be plotted on the TTC map. Plotting the estimated time and location of collision with a dynamic object can comprise labeling a corresponding portion of the TTC map, referred to as a collision zone.

In some embodiments, labeling a collision zone of the TTC map as occupied by a dynamic object can comprise assigning at least one probability of collision to the collision zone. The probability of collision can be calculated during the estimation of the time and location of collision with a dynamic object and/or during the detection of the dynamic object. The probability of collision can also be determined based on the history data corresponding to the road crossing, such as, based on a passing car histogram of the road crossing.

The TTC map can comprise a plurality of TTC cell, wherein each TTC cell can comprise a unique time-distance coordinate in the TTC map. That is, each TTC cell can refer to a respective area of the road crossing at a respective time interval. The area of the road crossing corresponding to each TTC cell depends on the granularity of the distance axis of the TTC map. Similarly, the time interval corresponding to each TTC cell depends on the granularity of the time axis of the TTC map. Typically, a TTC cell can extend along the time axis with a duration of at least 0.01 seconds and at most 1 second, such as, 0.5 seconds and can extend along the distance axis with a length of at least 1 cm and at most 500 cm, preferably at least 30 cm and at most 300 cm, such as, 100 cm. However, it will be understood that the size of a TTC cell on each axis depends on the achievable accuracy during the estimation of the time and location of collision.

In such embodiments, the method can comprise upon detecting a dynamic object and estimating the location and time to collision with the dynamic object, labeling one or more TTC cells as occupied by the dynamic object. As it will be understood, the TTC cells labeled as occupied by the dynamic object can indicate a position along a road crossing wherein the dynamic object can be positioned as well as the time interval during which the dynamic object is positioned therein. The number of TTC cells labeled as occupied by the dynamic object can depend on the size and velocity of the dynamic object and of the mobile robot. Moreover, it can also depend on the accuracy of estimating the time and location of collision. Typically, for increased safety, it can be advantageous to label more TTC cells then indicated by the estimated time and location. In other words, in some embodiments the location of collision can be assumed to be larger than estimated and/or the time interval of collision can also be assumed to be longer than estimated. This may provide additional safety.

In some embodiments, labeling a collision zone of the TTC map can comprise assigning a probability of collision to each TTC cell of the collision zone. This can provide a more detailed information regarding the estimated time and location of collision.

In some embodiments, the step of generating control commands for the mobile robot to avoid collision with the at least one dynamic object based on the estimated location and time of collision with the at least one dynamic object can comprises calculating a road crossing plan for the mobile robot to cross the road.

The step of generating control commands and/or the step of generating a road crossing plan for the mobile robot to cross the road can comprise calculating a velocity of the mobile robot as a function of time, at least for the duration of the road crossing. That is, the control commands and/or the road crossing plan can be generated such that the robot crosses the road with a calculated velocity vector at any time instant during the crossing.

Alternatively or additionally, the step of generating control commands and/or the step of generating a road crossing plan for the mobile robot to cross the road can comprise calculating a velocity of the mobile robot as a function of distance, at least for the length of the road crossing. That is, the control commands and/or the road crossing plan can be generated such that the robot crosses the road with a calculated velocity vector at any position along the road crossing.

In general, the step of generating control commands for the mobile robot to avoid collision with the at least one dynamic object based on the estimated location and time of collision with the at least one dynamic object can comprise generating the control commands as a function of time and/or distance.

The step of generating control commands can comprise generating acceleration commands, braking commands, steering commands, reversing commands, jump back commands, jump forward commands, abandon autonomous operation commands, contact operator commands, request operator assistance command or any combination thereof. In general, generating control commands can comprise generating any command that the mobile robot can be operable to execute.

In some embodiments, the step of generating control commands can comprise finding on the TTC map a road crossing plan, preferably a safe road crossing plan, even more preferably a minimum-cost and safe road crossing plan. A safe road crossing plan is a road crossing plan with a minimum or zero or less than a threshold likelihood of collision. The cost of a road crossing plan can be proportional to the time required and/or distance traveled to perform the road crossing according to the road crossing plan.

Finding a road crossing plan on the TTC map can comprise finding a road crossing plan that does not intersect with the collision zone(s) on the TTC map. Thus, the road crossing plan can comprise or indicate control commands for the robot to cross the road without collision with a dynamic object.

In other words, finding on the TTC map a road crossing plan can comprise finding a plurality of non-occupied (i.e. non-labelled) TTC cells linking a first TTC cell corresponding to the start of the road crossing with a second TTC cell corresponding to the end of the road crossing (i.e., the other side of the road). Thus, the road crossing plan can indicate the position of the robot along the road crossing at each time interval until the road crossing can be completed. As it will be understood, there can be multiple ways of linking the first TTC cell corresponding to the start of the road crossing with the second TTC cell corresponding to the end of the road crossing.

In some embodiments, the road crossing plan can be generated based on an optimization algorithm that can find a plurality of non-occupied (i.e. non-labelled) TTC cells linking a first TTC cell corresponding to the start of the road crossing with a second TTC cell corresponding to the end of the road crossing (i.e., the other side of the road), such that safety and efficiency of performing the road crossing can be maximized.

In some embodiments, a path finding algorithm, such as, the Dijkstra's algorithm can be used to find on the TTC map a road crossing plan. The path finding algorithm, such as, the Dijkstra's algorithm, can be advantageous as it can find a path on the TTC map with the minimum likelihood of collision and further optionally with the minimum distance and/or with minimum time duration.

In some embodiments, the road crossing method can comprise using a first artificial neural network (ANN) to detect a dynamic object on the road crossing. For example, the first ANN can receive as input sensor data and can detect one or more objects based thereon. The first ANN can be referred to as an object detector ANN.

In some embodiments, the method can comprise using a second artificial neural network to estimate the location and time of collision. The second ANN can receive as input the location and velocity of one or more dynamic objects and can output the location and time of collision with each of the dynamic objects. The second ANN can be referred to as a collision predictor ANN.

In some embodiments, the road crossing method can comprise using a third artificial neural network to generate control commands for the mobile robot. More particularly, the third ANN can receive as input one or more estimated time and locations of collision and can output commands for controlling the robot such that the robot can cross the road without collisions. Alternatively, the third ANN can receive as input the location and velocity of one or more dynamic objects collision and can output commands for controlling the robot such that the robot can cross the road without collisions. In some embodiments, the method can comprise inputting the TTC map to the third artificial neural network to generate control commands for the mobile robot. The third artificial neural network can be based on reinforcement learning. The third ANN can also be referred to as a control command generator ANN.

In some embodiments, the first, the second and the third ANN or any combination thereof can be submodules of one ANN.

In some embodiments, the road crossing method can comprise generating a road crossing map. The road crossing map can comprise or indicate the pose of the mobile robot and the location of the at least one dynamic object relative to the pose of the mobile robot. The road crossing map can be generated based on the output of the object detector.

The road crossing map can further comprise or indicate a respective velocity vector for each of the at least one dynamic object.

The road crossing map can further comprise or indicate a velocity vector related to the mobile robot.

The road crossing map can further comprises map data related to the road crossing, such as, the boundaries of the road, the lanes of the road, the median strip of the road, the position of zebra lines, start of road crossing, end of road crossing or any combination thereof.

The mobile robot can be represented in the road crossing map by a point, circle, 2D-pulygon, sphere or 3D-shape.

The at least one dynamic object can be represented in the road crossing map by a point, circle, 2D-pulygon, sphere or 3D-shape.

The mobile robot and/or the at least one dynamic object can be represented in the road crossing map as occupying a larger area and/or volume than there are and/or volume. This can increase safety as it can ensure a distance is maintained between the mobile robot and the at least one dynamic object.

The road crossing map can comprise a configuration space, said configuration space comprising a free space comprising the portion of the configuration space wherein the mobile robot can be positioned without collision, an obstacle space comprising the portion of the configuration space occluded by at least one obstacle that is be a moving or static object, a danger space comprising the portion of the configuration space that is not occluded by any obstacle but the robot is not allowed to occupy, a target space comprising a final and/or intermediate destination for the mobile robot to reach, an initial space comprising a current pose of the mobile robot, or any combination thereof.

In some embodiments, the road crossing method can comprise updating the road crossing map periodically, such as, every at least 0.01 seconds and at most every 1 second, preferably every 0.25 seconds. As such, the road crossing map can accurately represent the presence and position of dynamic objects on the road crossing.

Alternatively or additionally, the road crossing method can comprise updating the road crossing map on an event-driven basis, such as, when a change of the pose and/or velocity and/or speed of the mobile robot is detected, a change of the pose and/or velocity and/or speed of at least one dynamic object is detected, a new dynamic object is detected, an output is provided by the object detector or any combination thereof.

Updating the road crossing map can comprise adding new object detections on the road crossing map.

In some embodiments, the data processing unit can generate and/or updates the road crossing map.

In some embodiments, the object detector can generate and/or updates the road crossing map.

Put simply, the road crossing map can be a computerized representation of the road crossing. This can allow the mobile robot to "know" the state of the road crossing, i.e., whether there are any objects on the road crossing and/or the position of the dynamic objects on the road crossing. It can be advantageous to update the road crossing map periodically and/or in an event-based manner. This can ensure that the road crossing map does not comprise an outdated representation of the road crossing. This further facilitates a safe and efficient road crossing.

The object detector can comprise at least one sensor, comprising at least one visual camera, at least one stereo camera pair, at least one ToF sensor, at least one LIDAR or any combination thereof. Such sensors can facilitate generating a computerized view of the surroundings of the mobile robot. Moreover, the step of detecting with the object detector at least one dynamic object on the road crossing can comprise acquiring with the at least one sensor, sensor data related to the road crossing. The sensor data can facilitate generating a computerized representation of the road crossing. For example, the sensor data can facilitate generating a road crossing map, described above.

The step of acquiring with the at least one sensor, sensor data related to the road crossing, can comprise capturing at least one visual image with at least one visual camera. The visual images can be advantageous as they can indicate visual features of the captured scene. Moreover, visual images can be efficient for detecting objects captured therein using image processing algorithms. Some exemplary algorithms that can facilitate the detection of at least one dynamic object are the scale-invariant feature transform (SIFT), single shot multi-box detector (SSD) and you only look once (YOLO).

The step of acquiring with the at least one sensor, sensor data related to the road crossing, can comprise capturing at least one stereo image with at least one stereo camera pair. The stereo images can comprise similar advantages to the visual images. In addition, the stereo images can be used to also obtain distance information to the objects captured on the stereo images.

The step of acquiring with the at least one sensor, sensor data related to the road crossing can comprise capturing at least one ToF sensor image with at least one ToF sensor, such as, capturing at least one brightness image and/or at least one depth image with at least one ToF sensor. The ToF sensor images can be advantageous as they can indicate visual features (typically without color information) of the captured scene, similar to visual images. Moreover, capturing ToF sensor images can be more efficient in low light conditions. Furthermore, ToF sensor images can further provide distance information.

The step of acquiring with the at least one sensor, sensor data related to the road crossing can comprise scanning a portion of the road crossing with a LIDAR sensor and generating depth data related to the scanned portion of the road crossing. Typically, the LIDAR sensor can provide accurate distance measurements with a higher resolution.

The step of acquiring with the at least one sensor, sensor data related to the road crossing can comprise scanning a portion of the road crossing with a radar sensor, such as, a Doppler sensor and generating velocity data related to the scanned portion of the road crossing. The radar sensor can be advantageous as it can be used to detect objects, the position of the object and the velocity vector of the object. In some embodiments, the radar sensor can be provided attached to the mobile robot.

Alternatively or additionally, the radar sensor can be provided external to the mobile robot. In such embodiments, the radar sensor, which can be referred to as a radar box, can be provided in proximity with the road crossing. Thus, the radar box can provide measurements related to the road crossing. This can be particularly advantageous, as radar measurements can be provided and used by mobile robots that may not be equipped with a radar sensor.

In some embodiments, any of the above sensor data can be used.

The step of acquiring with the at least one sensor, sensor data related to the road crossing can comprises recording a timestamp indicating a time of acquisition of the sensor data and associating the sensor data with the corresponding timestamp.

The method can comprises storing the sensor data in a memory device.

The data processing unit can access the memory device.

The memory device can be internal to the mobile robot.

The method can comprise storing in the memory device the sensor data with a corresponding timestamp.

The step of acquiring with the at least one sensor, sensor data related to the road crossing can comprise, capturing first sensor data at a first time-instance and capturing second sensor data at a second time-instance, wherein the second time-instance is different from the first time-instance.

The first time-instance and the second time-instance can differ by at least 0.01 seconds and at most 1 second, such as, 0.25 seconds. That is, in some embodiments the sensor data can be captured every 0.01 to 1 second, such as, every 0.25 second. This can be advantageous as it can facilitate generating an updated computerized view of the surroundings of the mobile robot.

The step of acquiring with the at least one sensor, sensor data related to the road crossing can comprises capturing the sensor data at a rate of at least 1 time per second and at most 100 times per second, such as, 4 times per second.

The mobile robot can comprise an auxiliary sensor, such as, at least one GPS receiver, at least one odometer, at least one gyroscope, at least one inertial measurement unit, at least one proximity sensor, at least one accelerometer or any combination thereof. The auxiliary sensor can further facilitate generating a computerized view of the surroundings of the robot and/or determining the location and pose of the mobile robot.

The method according to the preceding embodiment, wherein the step of acquiring with the at least one auxiliary sensor auxiliary sensor data related to the road crossing can comprise acquiring data facilitating an approximation of the pose of the robot, measuring a speed, acceleration, steering, braking force or any combination thereof of the mobile robot, measuring a distance traveled by the mobile robot, measuring a number of rotations of the wheels of the mobile robot, measuring an orientation and angular velocity of the mobile robot, measuring at least one distance between the mobile robot and at least one object in the surrounding of the mobile robot, or any combination thereof.

The step of detecting with the object detector at least one dynamic object on the road crossing can comprise the data processing unit processing the sensor data for detecting at least one object and classifying the at least one detected object into at least static objects and dynamic objects.

The step of detecting with the object detector at least one dynamic object on the road crossing can comprise the data processing unit detecting the same object on different locations of sensor data captured at different time-instances.

The step of processing the sensor data for detecting at least one dynamic object on the road crossing can comprise the data processing unit processing the first sensor data to detect a first set of objects at a first set of corresponding locations, the data processing unit processing the second sensor data to detect a second set of objects at a second set of corresponding locations and the data processing unit detecting at least one dynamic object by detecting at least one object that belongs to the first set of objects and to the second set of objects and that comprises a first location from the first set of locations different from a second location from the second set of locations.

The step of detecting with the object detector at least one dynamic object on the road crossing can comprise performing a velocity measurement of at least one object on the road crossing. Performing a velocity measurement of at least one object on the road crossing can comprise acquiring sensor data with a radar, such as, a Doppler radar.

In some embodiments, the road crossing method can comprise at least one parameter.

The at least one parameter can comprise at least one configurable parameter.

The at least one parameter can be set prior to executing the method.

The at least one parameter can relate to or indicate the time limit for how long to wait until calling for operator assistance, the distance limit for jumping back to the start of the road crossing if a car is detected while crossing the road, which object detection technique to use, when to stop or go to avoid dynamic objects or any combination thereof.

The method can be a computer implemented method.

The method can be implemented as one or more computer program products.

The method can further comprise the mobile robot crossing the road according to the generated control commands.

In a second aspect, the present invention related to a mobile robot comprising a data processing unit configured to estimate a location and time of collision with the at least one dynamic object and generate control commands for the mobile robot to avoid collision with the at least one dynamic object based on the estimated location and time of collision with the at least one dynamic object. The mobile robot is configured to cross a road according to the generated control commands.

The mobile robot can comprise an object detector configured to detect at least one dynamic object on the road crossing.

the object detector can comprise at least one sensor comprising at least one visual camera, at least one stereo camera pair, at least one ToF sensor, at least one LIDAR or any combination thereof.

The mobile robot can comprise an auxiliary sensor, such as, at least one GPS receiver, at least one odometer, at least one gyroscope, at least one inertial measurement unit, at least one proximity sensor, at least one accelerometer or any combination thereof.

The mobile robot can be configured to generally travel on sidewalks and at low speeds (e.g. similar to a human's walking or jogging speed), such as, 0-30 km/h, preferably less than 10 km/h.

The mobile robot can be a wheeled robot and can comprise 3 to 8 wheels, such as 6 wheels.

The mobile robot is a mobile delivery robot can be configured for item delivery.

The mobile robot can comprise a body or housing comprising a compartment configured to house or store items to be delivered.

The mobile robot can be configured to operate autonomously.

In some embodiments, the mobile robot can be configured to operate partially autonomously.

The mobile robot can be configured to carry out the road crossing method.

That is, the mobile robot can be configured to perform road crossing according to the road crossing method.

In a further aspect, the present invention can relate to a simulation-based method for optimizing a road crossing method comprising providing an action space, cost function, model of environment and collected data. Further the simulation-based method can comprise simulating a road crossing scenario based on the model of environment and collected data, simulating a mobile robot performing a road crossing on the simulated road crossing scenario based on the action space. Further the simulation-based method can comprise calculating for each simulated road crossing, a cost using the cost function. Further, the simulation-based method can determine a simulated road crossing with the minimum cost and output optimal parameters of the road crossing method based on the determined simulated road crossing.

The action space can comprise possible control commands that the mobile robot can be capable of executing, i.e., operable to execute.

The action space can comprise basic commands related to the robot's driving, such as, accelerating, braking, steering or any combination thereof.

The action space can comprise data related to complex behaviors of the robot, such as, reversing, jump back, jump forward, abandon autonomous operation, contact operator, request operator assistance or any combination thereof.

The action space can comprise restrictions on the actions of the robot, such as, a maximum acceleration, maximum braking, maximum velocity, maximum steering and the like.

The cost function can be used to calculate a cost of a simulated road crossing.

The cost of a simulated road crossing can indicate the safety and efficiency of the simulated road crossing.

The model of the environment can comprise a model of a road.

The collected data may relate to previous object detections during a real (i.e. non-simulated) mobile robot road crossing.

The simulation-based method can be based on reinforcement learning.

The optimal parameters can relate to the time limit for how long to wait unit calling for operator assistance, distance limit for jumping back to the start of the road crossing if a car is detected while crossing the road, which object detection technique to use, when to stop or go to avoid dynamic objects or any combination thereof.

The step of simulating a mobile robot performing a road crossing on the road crossing scenario based on the action space can comprise generating control commands for the mobile robot to cross the road using the road crossing method and simulating a mobile robot performing a road crossing based on the generated control commands.

Generating control commands for the mobile robot to cross the road using the road crossing method can comprise setting at least one parameter of the road crossing method prior to executing the method for generating the control commands.

Determining a simulated road crossing with the best score can comprise determining the parameters of the road crossing method that were used to generate control commands for the simulated road crossing with the best score.

Outputting optimal parameters of the road crossing method based on the determined simulated road crossing with the best score can comprise outputting the parameters of the road crossing method that were used to generate control commands for the simulated road crossing with the best score.

In some embodiments the road crossing method is the road crossing method according to the first aspect of the present invention.

The simulation-based method can be configured to optimize the road crossing method according to the first aspect of the present invention.

The simulation-based method can be carried out in a processing unit external to the mobile robot.

In a further aspect, the present invention relates to a positioning method for a wheeled mobile robot positioned on a sloped terrain, the positioning method comprising the mobile robot performing at least one maneuver for minimizing a magnitude of an acceleration vector of the mobile robot due to the gravity force acting on the mobile robot.

Minimizing the magnitude of the acceleration vector of the mobile robot due to the gravity force can comprises reducing the magnitude of the acceleration vector of the mobile robot due to the gravity force to zero.

Minimizing the magnitude of the acceleration vector of the mobile robot due to the gravity force can comprise reducing a component of the gravity force parallel to the wheel's direction of rotation such that wheels do not rotate due to gravity.

After the mobile robot performs the at least one maneuver the mobile robot can be positioned such that the component of the gravity force parallel to the wheel's direction of rotation is minimized, preferably reduced to zero. Alternatively or additionally, after performing the at least one maneuver the mobile robot can positioned such that an acute angle between the wheel's direction of motion and the direction of the slope of the terrain is between 70°-90°, preferably 88-90°, even more preferably 90°.

The method can comprise acquiring sensor data relating to the gravity vector.

Acquiring sensor data can comprise acquiring sensor data with at least one gyroscope, at least one accelerometer or any combination thereof.

In some embodiments, the positioning method can further comprise determining the slope of the terrain. In some embodiments, the slope of the terrain can be based on the acquired sensor data.

The slope of the terrain can be at least 0.5°, preferably at least 2°.

In some embodiments, the positioning method can comprise determining a sign of the acceleration vector of the mobile robot due to the gravity force. This can also be referred to as a direction of rolling and can indicate the direction that the mobile robot moves due to gravity, e.g., forwards or backwards.

In some embodiments, the positioning method can comprise determining a direction of the acceleration vector of the mobile robot due to the gravity force.

In some embodiments, the positioning method can comprise determining a magnitude of the acceleration vector of the mobile robot due to the gravity force.

Determining the acceleration vector of the mobile robot and particularly determining the sign of the acceleration vector can comprise detecting a rotation of the wheels of the mobile robot due to gravity force and further determining the direction of rotation of the wheels Detecting a rotation of the wheels of the mobile robot can comprise detecting a speed of rotation of the wheels. This can be particularly advantageous for determining a magnitude of the acceleration vector of the robot due to gravity.

The robot can comprise a braking system configured to generate a resistance force for stopping the wheels from rotating and wherein determining the acceleration vector of the mobile robot due to the gravity force can comprise releasing the brakes of the mobile robot.

Determining the acceleration vector of the mobile robot due to gravity can comprise determining a direction of motion of the mobile robot due to gravity.

The positioning method can comprise determining whether the acceleration vector of the mobile robot due to gravity is zero.

In some embodiments, the positioning method can comprise the mobile robot changing its pose if the determined acceleration vector of the mobile robot due to gravity is not zero.

In some embodiments the steps of determining the acceleration vector of the mobile robot due to the gravity force, determining whether the acceleration vector of the mobile robot due to gravity is zero and if the acceleration vector of the mobile robot due to gravity is not zero the mobile robot changes its pose are performed iteratively until it is determined that the acceleration vector is zero.

In such embodiments, in a first iteration the robot can changes its pose by rotating by 90° and in each further iteration the robot can change its pose by rotating by half the previous angle of rotation. That is, in such embodiments the advantageous orientation wherein the acceleration vector reduces to zero can be searched according to a bisection search algorithm.

Alternatively, in each iteration the robot can changes its pose by rotating by a fixed step size, such as, by 1 to 10°. That is, in such embodiments the advantageous orientation wherein the acceleration vector reduces to zero is searched according to a linear search algorithm.

Moreover, in each iteration the direction of rotation can be determined based on the acceleration vector determined during that iteration. More particularly, the direction of rotation can be determined based on the sign of the acceleration vector (i.e. direction of rolling) determined during that iteration. In addition, in each iteration the direction of rotation can be determined based on the direction of rotation in the previous iteration.

In a first iteration the robot can rotate by 90°.

In some embodiments, the mobile robot performing the at least one maneuver can be triggered manually by a human operator.

Alternatively, the mobile robot performing the at least one maneuver can be triggered automatically.

The mobile robot performing the at least one maneuver cane triggered automatically if the robot is positioned on a sloped terrain with a slope of at least 0.5°, preferably at least 2°.

In some embodiments, the positioning method can comprise periodically measuring the slope of the terrain.

In some embodiments, the method can comprise maintaining an idle timer configured to a time since which the robot has been idle and wherein the mobile robot performing the at least one maneuver can be triggered automatically if the idle timer indicates an idle duration longer than an idle duration threshold, such as, 5 minutes.

In some embodiments, the mobile robot can comprise an internal energy source, such as a battery. In such embodiments, the positioning method can comprise measuring the energy level of the energy source. Furthermore, in such embodiments, the mobile robot performing the at least one maneuver can be triggered automatically if the energy level drops below a threshold energy level.

In some embodiments, the mobile robot can comprise an active braking system. In such embodiments, the method can comprise measuring the temperature of at least one component of the active braking system. Furthermore, in such embodiments the mobile robot performing the at least one maneuver can be triggered automatically if the temperature of at least one component of the active braking system rises above a temperature threshold level, such as, 75°.

In a further aspect, the present invention relates to a system comprising a mobile robot comprising an object detector configured to detect at least one dynamic object on the road crossing. The system can further comprise a data processing unit configured to process the output of the object detector for estimating a location and time of collision with the at least one dynamic object and generate control commands for the mobile robot to avoid collision with the at least one dynamic object based on the estimated location and time of collision with the at least one dynamic object. Furthermore, the mobile robot is configured to cross the road according to the generated control commands.

The mobile robot can comprise any of the features discussed above.

The system can further comprise a server external to the mobile robot.

In some embodiments, the data processing unit can be comprised by the server. That is, the data processing unit can be external to the mobile robot. Alternatively, the mobile robot can comprise the data processing unit.

The mobile robot can be configured to be remotely connected with the server.

The system can be configured to carry out the road crossing method according to any of the preceding road crossing method embodiments.

The mobile robot can be configured to perform road crossings according to the road crossing method.

The system can be configured to carry out the simulation-based method for optimizing the road crossing method.

The server can be configured to carry out the simulation-based method.

In some embodiments, the robot can carry out the method according to any of the preceding positioning method embodiments.

In some embodiments, the mobile robot can comprise a processing unit configured to facilitate the execution of the positioning method.

In some embodiments, the data processing unit can be configured to facilitate the execution of the positioning method.

The present technology is also defined by the following numbered embodiments.

Below, road crossing method embodiments will be discussed. These embodiments are abbreviated by the letter "M" followed by a number. Whenever reference is herein made to road crossing method embodiments, these embodiments are meant.

M1. A road crossing method for a mobile robot (10), the method comprising:
the mobile robot (10) approaching a road crossing;
a data processing unit (40)
estimating a location and time of collision with at least one dynamic object (20) on the road crossing;
generating control commands for the mobile robot (10) to avoid collision with the at least one dynamic object (20) based on the estimated location and time of collision with the at least one dynamic object (20).

Object Detection

M2. The method according to the preceding embodiment, wherein the method comprises an object detector (30) detecting the at least one dynamic object (20) on the road crossing.

M3. The method according to the preceding embodiment, wherein the method comprises the object detector (30) estimating a location of the at least one dynamic object (20).

M4. The method according to any of the 2 preceding embodiments, wherein the method comprises the object detector (30) estimating at least one of speed and direction of motion of the at least one dynamic object (20).

M5. The method according to any of the 3 preceding embodiments, wherein the method comprises the object detector (30) estimating a velocity vector describing the motion of the at least one dynamic object (20).

M6. The method according to any of the 4 preceding embodiments, wherein the method comprises the object detector (30) estimating a physical feature of the at least one dynamic object (20), such as, size, shape and color or any combination thereof.

M7. The method according to any of the 5 preceding embodiments, wherein the method comprises the object detector (30) determining a type of the at least one dynamic object (20) based on a speed, size, shape, color or any combination thereof of the at least one dynamic object (20).

M8. The method according to any of the 6 preceding embodiments, wherein the method comprises the object detector (30) classifying the at least one dynamic object (20) on at least one class, said class(es) comprising at least one of:
a car class, a bus class, a motorbike class, a pedestrian class, a bicycle class, a mobile robot class, a transportation device class, a low-speed transportation device, a high-speed transportation device, a light transportation device, a heavy transportation device or the like.

M9. The method according to any of the 7 preceding embodiments, wherein the object detector (30) comprises a corresponding processing unit and any of the steps of the method wherein the object detector (30) performs a calculation, estimation and/or classification is carried out by the corresponding processing unit of the object detector (30).

M10. The method according to any of the 8 preceding embodiments, wherein the data processing unit (40) comprises the object detector (30).

Collision Prediction

M11. The method according to any of the preceding embodiments, wherein the step of the data processing unit (40) estimating a location and time of collision with at least one dynamic object (20) on the road crossing
comprises the data processing unit (40) predicting a trajectory of motion of the at least one dynamic object (20) and detecting at least one intersection between the trajectory of motion of the at least one dynamic object (20) and the trajectory of motion of the mobile robot (10).

M12. The method according to the preceding embodiment, wherein predicting a trajectory of motion of the at least one dynamic object (20) comprises extending a velocity vector of the at least one dynamic object (20).

M13. The method according to the preceding embodiment, wherein extending a velocity vector comprises multiplying the velocity vector with an extending constant or extending vector.

M14. The method according to any of the three preceding embodiments, wherein predicting a trajectory of motion of the at least one dynamic object (20) comprises estimating a velocity vector of the at least one dynamic object (20) based on at least one velocity measurement of the velocity of the at least one dynamic object (20), such as, based on at least one radar measurement.

M15. The method according to any of the four preceding embodiments, wherein predicting a trajectory of motion of the at least one dynamic object (20) comprises estimating a velocity vector of the at least one dynamic object (20) based on at least two detections of the at least one dynamic object (20).

M16. The method according to any of the two preceding embodiments, wherein the method comprises using a probabilistic filter, such as, a Kalman filter, to estimate the velocity vector of the at least one dynamic object (20).

M17. The method according to any of the six preceding embodiments, wherein the step of the data processing unit (40) predicting a trajectory of motion of the at least one dynamic object (20) comprises extrapolating at least two previous locations of the at least one dynamic object (20).

M18. The method according to the preceding embodiment, wherein extrapolating at least two previous locations of the at least one dynamic object (20) is based on a linear extrapolation technique.

Collision Points Correction

M19. The method according to any of the preceding embodiments, wherein the method further comprises the data processing unit (40) correcting the estimated location and time of collision based on history data related to the road crossing.

M20. The method according to the preceding embodiment, wherein the history data related to a road crossing comprises a passing car histogram (410) related to the road crossing and
the method further comprises the data processing unit (40) correcting the estimated location and time of collision based on the passing car histogram (410).

M21. The method according to the preceding embodiment, wherein the step of the data processing unit (40) correcting the estimated location and time of collision based on the passing car histogram (410) comprises
correcting the estimated location and time of collision based on the mean and/or variance of the passing car histogram (410).

M22. The method according to any of the two preceding embodiments, wherein the step of correcting the estimated location and time of collision based on a passing car histogram (410) related to the road crossing comprises
calculating the location and time of collision as a weighted average of the estimated location and time of collision and the mean or mode of the passing car histogram (410).

M23. The method according to the preceding embodiment, wherein the weighting constants used during the calculation of the weighted average depend on at least one of
a type of road crossing, time of day, salience of the road crossing, accuracy of estimation of the location and time of collision, accuracy of the passing car histogram (410) and amount of data used to calculate the passing car histogram (410) for that road crossing.

M24. The method according to any of the two preceding embodiments, wherein the weighting constants used during the calculation of the weighted average are calculated based on an artificial neural network algorithm.

Collision Point Distribution

M25. The method according to any of the preceding embodiments, wherein the method comprises generating a collision point distribution (412) related to the road crossing and
wherein the collision point distribution (412) of a road crossing indicates, for each point along the road crossing, a probability of the mobile robot (10) colliding with a dynamic object (20).

M26. The method according to the preceding embodiment, wherein the method further comprises the data processing unit (40) correcting the estimated location and time of collision based on the collision point distribution (412).

M27. The method according to the preceding embodiment, wherein the step of the data processing unit (40) correcting the estimated location and time of collision based on the collision point distribution (412) comprises
correcting the estimated location and time of collision based on the mean and/or variance of the collision point distribution (412).

M28. The method according to any of the two preceding embodiments, wherein the step of correcting the estimated location and time of collision based on a collision point distribution (412) related to the road crossing comprises
calculating the location and time of collision as a weighted average of the estimated location and time of collision and the mean or mode of the collision point distribution (412).

M29. The method according to the preceding embodiment, wherein the weighting constants used during the calculation of the weighted average depend on at least one of
a type of road crossing, time of day, salience of the road crossing, accuracy of estimation of the location and time of collision, accuracy of the collision point distribution (412) and amount of data used to calculate the collision point distribution (412) for that road crossing.

M30. The method according to any of the two preceding embodiments, wherein the weighting constants used during the calculation of the weighted average are calculated based on an artificial neural network algorithm.

M31. The method according to any of the six preceding embodiments, wherein the method comprises generating the collision point distribution (412) of a road crossing based on history data comprising dynamic object detections during at least one previous mobile robot (10) road crossing on the road crossing.

M32. The method according to the preceding embodiment, wherein the history data is accumulated by multiple mobile robots (10).

M33. The method according to any of the eight preceding embodiments, wherein the method comprises receiving data from an external database and generating the collision point distribution based on the data received from the external database.

M34. The method according to the preceding embodiment, wherein the external database comprises a map.

M35. The method according to any of the two preceding embodiments, wherein the external database is maintained by an authority or agency dealing with transportation.

M36. The method according to any of the 11 preceding embodiments, wherein the method comprises generating the collision point distribution (412) of a road crossing based on a passing car histogram (410) related to the road crossing.

Time to Collision Map

M37. The method according to any of the preceding embodiments, wherein the method comprises the data processing device generating a time to collision (TTC) map (420) based on the estimated locations and times of collision with the at least one dynamic object (20)
wherein the TTC map (420) is a two-dimensional map comprising in a first axis the distance along the road crossing and in a second axis the time.

M38. The method according to the preceding embodiment, wherein the method comprises upon detecting a dynamic object (20) and estimating the location and time to collision with the dynamic object (20), labeling a collision zone (422) of the TTC map (420) as occupied by the dynamic object (20).

M39. The method according to the preceding embodiment, wherein labeling a collision zone (422) of the TTC map (420) as occupied by the dynamic object (20) comprises assigning at least one probability of collision to the collision zone (422).

M40. The method according to any of the three preceding embodiments, wherein the TTC map (420) comprises a plurality of TTC cells, each cell comprising a unique time-distance coordinate in the TTC map (420).

M41. The method according to the preceding embodiment, wherein a TTC cell comprises
a duration of at least 0.01 seconds and at most 1 second, such as, 0.5 seconds, and
a length of at least 1 cm and at most 500 cm, preferably at least 30 cm and at most 300 cm, such as, 100 cm.

M42. The method according to any of the two preceding embodiments, wherein the method comprises upon detecting a dynamic object (20) and estimating the location and time to collision with the dynamic object (20), labeling one or more TTC cells as occupied by the dynamic object (20).

M43. The method according to the preceding embodiment, wherein labeling a TTC cell as occupied by the dynamic object (20) comprises assigning a probability of collision to the TTC cell.

M44. The method according to any of the preceding embodiments and with the features of embodiments M38 and M40, wherein a collision zone (422) comprises a plurality of TTC cells.

M45. The method according to the preceding embodiment, wherein labeling a collision zone (422) of the TTC map (420) comprises assigning a probability of collision to each TTC cell of the collision zone (422).

Crossing Plan

M46. The method according to any of the preceding embodiments, wherein the step of generating control commands for the mobile robot (10) to avoid collision with the at least one dynamic object (20) based on the estimated location and time of collision with the at least one dynamic object (20) comprises
calculating a road crossing plan (430) for the mobile robot (10) to cross the road.

M47. The method according to any of the preceding embodiments, wherein the step of generating control commands for the mobile robot (10) to avoid collision with the at least one dynamic object (20) based on the estimated location and time of collision with the at least one dynamic object (20) comprises
calculating a velocity of the mobile robot (10) as a function of time, at least for the duration of the road crossing and/or
calculating a velocity of the mobile robot (10) as a function of distance, at least for the length of the road crossing.

M48. The method according to any of the preceding embodiments, wherein the step of generating control commands for the mobile robot (10) to avoid collision with the at least one dynamic object (20) based on the estimated location and time of collision with the at least one dynamic object (20) comprises
generating the control commands as a function of time and/or distance.

M49. The method according to any of the preceding embodiments, wherein the step of generating control commands for the mobile robot (10) to avoid collision with the at least one dynamic object (20) based on the estimated location and time of collision with the at least one dynamic object (20) comprises at least one of
generating acceleration commands, braking commands, steering commands, reversing commands, jump back commands, jump forward commands, abandon autonomous operation commands, contact operator commands and request operator assistance command.

M50. The method according to any of the preceding embodiments and with the features of embodiment M37, wherein the step of generating control commands for the mobile robot (10) to avoid collision with the at least one dynamic object (20) based on the estimated location and time of collision with the at least one dynamic object (20) comprises
finding on the TTC map (420) a road crossing plan (430), preferably a safe road crossing plan (430), even more preferably a minimum-cost and safe road crossing plan (430),
wherein a safe road crossing plan (430) is a road crossing plan (430) with a minimum or zero or less than a threshold likelihood of collision, and
wherein the cost of a road crossing plan (430) is proportional to the time required and/or distance traveled to perform the road crossing according to the road crossing plan (430).

M51. The method according to the preceding embodiment and with the features of embodiment M38, wherein finding on the TTC map a road crossing plan (430), preferably a safe road crossing plan (430), even more preferably a minimum-cost and safe road crossing plan (430), comprises finding a road crossing plan (430) that does not intersect with the collision zone(s) (422) on the TTC map (420).

M52. The method according to any of the two preceding embodiments, wherein a path finding algorithm is used to find on the TTC map (420) a road crossing plan (430).

Artificial Intelligence Utilization

M53. The method according to any of the preceding embodiments, wherein the method comprises using a first artificial neural network to detect a dynamic object (20) on the road crossing.

M54. The method according to any of the preceding embodiments, wherein the method comprises using a second artificial neural network to estimate the location and time of collision.

M55. The method according to any of the preceding method embodiments, wherein the method comprises using a third artificial neural network to generate control commands for the mobile robot (10).

M56. The method according to the preceding embodiment, wherein the third artificial neural network is based on reinforcement learning.

M57. The method according to any of the four preceding embodiments, wherein the first, second and the third artificial neural network or any combination thereof are submodules of one artificial neural network.

M58. The method according to any of the preceding method embodiments and with the features of embodiment M37 and M55, wherein the method comprises inputting the TTC map (420) to the third artificial neural network to generate control commands for the mobile robot (10).

Road Crossing Map

M59. The method according to any of the preceding embodiments and with the features of embodiment M2, wherein the method comprises generating a road crossing map (400) based on the output of the object detector (30),
wherein the road crossing map (400) comprises the pose of the mobile robot (10) and the location of the at least one dynamic object (20) relative to the pose of the mobile robot (10).

M60. The method according to the preceding embodiment, wherein the road crossing map (400) further comprises a velocity vector related to the at least one dynamic object (20).

M61. The method according to any of the two preceding embodiments, wherein the road crossing map (400) further comprises a velocity vector related to the mobile robot (10).

M62. The method according to any of the three preceding embodiments, wherein the road crossing map (400) further comprises map data related to the road crossing.

M63. The method according to any of the four preceding embodiments, wherein the mobile robot (10) is represented in the road crossing map (400) by a point, circle, 2D-polygon, sphere or 3D-shape.

M64. The method according to any of the five preceding embodiments, wherein the at least one dynamic object (20) is represented in the road crossing map by a point, circle, 2D-pulygon, sphere or 3D-shape.

M65. The method according to any of the six preceding embodiments, wherein the road crossing map (400) comprises a configuration space, said configuration space comprising at least one of
- a free space comprising the portion of the configuration space wherein the mobile robot (10) can be positioned without collision,
- an obstacle space comprising the portion of the configuration space occluded by at least one obstacle that is be a moving or static object,
- a danger space comprising the portion of the configuration space that is not occluded by any obstacle but the robot (10) is not allowed to occupy,
- a target space comprising a final and/or intermediate destination for the mobile robot (10) to reach, and
- an initial space comprising a current pose of the mobile robot (10).

M66. The method according to any of the seven preceding embodiments, wherein the method comprises updating the road crossing map (400) periodically, such as, every at least 0.01 seconds and at most every 1 second, preferably every 0.25 seconds.

M67. The method according to any of the eight preceding embodiments, wherein the method comprises updating the road crossing map on an event-driven basis, such as, when
- a change of the pose and/or velocity and/or speed of the mobile robot (10) is detected,
- a change of the pose and/or velocity and/or speed of at least one dynamic object (20) is detected,
- a new dynamic object is detected,
- an output is provided by the object detector (30), wherein the method comprises the features of embodiment M2,
- or any combination thereof.

M68. The method according to any of the two preceding embodiments, wherein updating the road crossing map (400) comprises adding new object detections on the road crossing map (400).

M69. The method according to any of the 10 preceding embodiments, wherein the data processing unit (40) generates and/or updates the road crossing map (400).

M70. The method according to any of the 11 preceding embodiments and with the features of embodiment M2, wherein the object detector (30) generates and/or updates the road crossing map (400).

Sensing

M71. The method according to any of the preceding embodiments and with the features of embodiment M2, wherein the object detector (30) comprises at least one sensor (35) comprising at least one visual camera (35), at least one stereo camera pair (35), at least one ToF sensor (35), at least one LIDAR (35) or any combination thereof
and the step of detecting with the object detector (30) at least one dynamic object (20) on the road crossing comprises acquiring with the at least one sensor (35) sensor data related to the road crossing.

M72. The method according to the preceding embodiment, wherein the step of acquiring with the at least one sensor (35) sensor data related to the road crossing, comprises
- capturing at least one visual image with at least one visual camera (35),
- capturing at least one stereo image with at least one stereo camera pair (35),
- capturing at least one ToF sensor image with at least one ToF sensor (35), such as, capturing at least one brightness image and/or at least one depth image with at least one ToF sensor (35),
- scanning a portion of the road crossing with a LIDAR sensor (35) and generating depth data related to the scanned portion of the road crossing,
- scanning a portion of the road crossing with a radar sensor (35), such as, a Doppler sensor (35) and generating velocity data related to the scanned portion of the road crossing,
- or any combination thereof.

M73. The method according to any of the two preceding embodiments, wherein the step of acquiring with the at least one sensor (35) sensor data related to the road crossing comprises recording a timestamp indicating a time of acquisition of the sensor data and associating the sensor data with the corresponding timestamp.

M74. The method according to any of the three preceding embodiments, wherein the method comprises storing the sensor data in a memory device.

M75. The method according to the preceding embodiment, wherein the data processing unit (40) accesses the memory device.

M76. The method according to any of the two preceding embodiments, wherein the memory device is internal to the mobile robot (10).

M77. The method according to any of the three preceding embodiments, wherein the method comprises storing in the memory device the sensor data with a corresponding timestamp.

M78. The method according to any of the seven preceding embodiments, wherein the step of acquiring with the at least one sensor (35) sensor data related to the road crossing comprises
- capturing first sensor data at a first time-instance,
- capturing second sensor data at a second time-instance, wherein the second time-instance is different from the first time-instance.

M79. The method according to the preceding embodiment, wherein the first time-instance and the second time-instance differ by at least 0.01 seconds and at most 1 second, such as, 0.25 seconds.

M80. The method according to any of the nine preceding embodiments, wherein the step of acquiring with the at least one sensor (35) sensor data related to the road crossing comprises capturing the sensor data at a rate of at least 1 time per second and at most 100 times per second, such as, 4 times per second.

M81. The method according to any of the preceding embodiments, wherein the mobile robot (10) comprises an auxiliary sensor (37), such as, at least one GPS receiver (37), at least one odometer (37), at least one gyroscope (37), at least one inertial measurement unit (37), at least one proximity sensor (37), at least one accelerometer (37) or any combination thereof,
and the method comprises acquiring with the at least one auxiliary sensor (37) auxiliary sensor data related to the road crossing.

M82. The method according to the preceding embodiment, wherein the step of acquiring with the at least one auxiliary sensor (37) auxiliary sensor data related to the road crossing, comprises at least one of acquiring data facilitating an approximation of the pose of the robot, measuring a speed, acceleration, steering, braking force or any combination thereof of the mobile robot (10), measuring a distance traveled by the mobile robot (10), measuring a number of rotations of the wheels of the mobile robot (10), measuring an orientation and angular velocity of the mobile robot (10), and measuring at least one distance between the mobile robot (10) and at least one object in the surrounding of the mobile robot (10)

Sensor Data Processing

M83. The method according to any of the preceding embodiments and with the features of embodiments M2 and M71, wherein the step of detecting with the object detector (30) at least one dynamic object (20) on the road crossing comprises the data processing unit (40) processing the sensor data for detecting at least one object and classifying the at least one detected object into at least static objects and dynamic objects (20).

M84. The method according to any of the preceding embodiments and with the features of embodiments M2 and M71, wherein the step of detecting with the object detector (30) at least one dynamic object (20) on the road crossing comprises the data processing unit (40) detecting the same object on different locations of sensor data captured at different time-instances.

M85. The method according to any of the preceding embodiments and with the features of embodiment M78, wherein the step of processing the sensor data for detecting at least one dynamic object (20) on the road crossing comprises the data processing unit (40) processing the first sensor data to detect a first set of objects at a first set of corresponding locations, the data processing unit (40) processing the second sensor data to detect a second set of objects at a second set of corresponding locations, the data processing unit (40) detecting at least one dynamic object by detecting at least one object that belongs to the first set of objects and to the second set of objects and that comprises a first location from the first set of locations different from a second location from the second set of locations.

M86. The method according to any of the preceding embodiments and with the features of embodiment M2, wherein the step of detecting with the object detector (30) at least one dynamic object (20) on the road crossing comprises performing a velocity measurement of at least one object on the road crossing.

M87. The method according to the preceding embodiment, wherein performing a velocity measurement of at least one object on the road crossing comprises acquiring sensor data with a radar, such as, a Doppler radar.

Parameters of the Method

M88. The method according to any of the preceding method embodiments, wherein the method comprises at least one parameter.

M89. The method according to the preceding embodiments, wherein the at least one parameter comprises at least one configurable parameter.

M90. The method according to any of the two preceding embodiments, wherein the at least one parameter is set prior to executing the method.

M91. The method according to any of three preceding embodiments, wherein the at least one parameter relates to at least one of the time limit for how long to wait until calling for operator assistance, distance limit for jumping back to the start of the road crossing if a car is detected while crossing the road, which object detection technique to use, and when to stop or go to avoid dynamic objects.

Further Features

M92. The method according to any of the preceding embodiments, wherein the method is a computer implemented method.

M93. The method according to any of the preceding embodiments, wherein the method is implemented as one or more computer program products.

M94. The method according to any of the preceding embodiments, wherein the method comprises the mobile robot (10) crossing the road according to the generated control commands.

M95. The method according to any of the preceding embodiments, wherein the method is executed iteratively.

M96. The method according to the preceding embodiment, wherein in each iteration the method comprises generating control commands for the mobile robot (10) to avoid collision with the at least one dynamic object (20) based on the estimated location and time of collision with the at least one dynamic object (20) and the mobile robot (10) crossing at least a portion of the road according to the control commands generated on that iteration.

M97. The method according to any of the 2 preceding embodiments, wherein the method comprises updating the control commands on each iteration.

M98. The method according to any of the 3 preceding embodiments and with the features of embodiment M37, wherein the method comprises updating the TTC map (420) on each iteration.

M99. The method according to any of the 4 preceding embodiments and with the features of embodiment M59, wherein the method comprises updating the road crossing map (400) on each iteration.

M100. The method according to any of the 5 preceding embodiments, wherein the method is executed every 0.1 to 1 second, such as, every 0.25 seconds.

M101. The method according to any of the preceding embodiments and with the features of embodiments M55 and M59, wherein the method comprises providing the road crossing map (400) as input to the third artificial neural network and the third artificial neural network generating control commands for the mobile robot (10) based thereon.

M102. The method according to the preceding embodiment and with the features of embodiment M95, wherein the method comprises at each iteration providing the road crossing map (400) as input to the third artificial neural network and the third artificial neural network generating commands for the mobile robot (10) based thereon.

M103. The method according to any of the preceding embodiments and with the features of embodiment M52, wherein the path finding algorithm is the Dijkstra's algorithm.

M104. The method according to any of the preceding embodiments and with the features of embodiment M62, wherein the map data related to the road crossing are indicative for at least one of boundaries of the road (415), lanes of the road, median strip of the road, start of road crossing, end of road crossing and the position of zebra lines.

Below, mobile robot embodiments will be discussed. These embodiments are abbreviated by the letter "R" followed by a number. Whenever reference is herein made to mobile robot embodiments, these embodiments are meant.

R1. A mobile robot (10) comprising:
a data processing unit (40) configured to
estimate a location and time of collision with the at least one dynamic object (20);
generate control commands for the mobile robot (10) to avoid collision with the at least one dynamic object (20) based on the estimated location and time of collision with the at least one dynamic object (20).

R2. The mobile robot (10) according to the preceding embodiment, wherein the mobile robot (10) comprises an object detector (30) configured to detect at least one dynamic object (20) on the road crossing.

R3. The mobile robot (10) according to the preceding embodiment, wherein the object detector (30) comprises at least one sensor (35) comprising at least one visual camera (35), at least one stereo camera pair (35), at least one ToF sensor (35), at least one LIDAR (35) or any combination thereof.

R4. The mobile robot (10) according to any of the preceding robot embodiments, wherein the mobile robot (10) comprises an auxiliary sensor (37), such as, at least one GPS receiver (37), at least one odometer (37), at least one gyroscope (37), at least one inertial measurement unit (37), at least one proximity sensor (37), at least one accelerometer (37) or any combination thereof.

R5. The mobile robot (10) according to any of the preceding robot embodiments, wherein the mobile robot (10) is configured to travel on sidewalks and at low speeds (e.g. similar to a human's walking or jogging speed), such as, 0-30 km/h, preferably less than 10 km/h.

R6. The mobile robot (10) according to any of the preceding robot embodiments, wherein the mobile robot (10) is a wheeled robot (10).

R7. The mobile robot (10) according to any of the preceding robot embodiments, wherein the mobile robot (10) comprises 3 to 8 wheels, such as 6 wheels.

R8. The mobile robot (10) according to any of the preceding robot embodiments, wherein the mobile robot (10) is a mobile delivery robot (10) configured for item delivery.

R9. The mobile robot (10) according the preceding embodiment, wherein the mobile robot (10) comprises a body or housing comprising a compartment configured to house or store items to be delivered.

R10. The mobile robot (10) according to any of the preceding robot embodiments, wherein the mobile robot (10) is configured to operate autonomously.

R11. The mobile robot (10) according to any of the preceding robot embodiments, wherein the mobile robot (10) is configured to operate partially autonomously.

R12. The mobile robot (10) according to any of the preceding robot embodiments, wherein the mobile robot (10) is configured to carry out the road crossing method according to any of the preceding road crossing method embodiments.

R13. The mobile robot (10) according to any of the preceding robot embodiments, wherein the mobile robot (10) is configured to perform road crossings according to the road crossing method according to any of the preceding road crossing method embodiments.

R14. The mobile robot (10) according to any of the preceding robot embodiments, wherein the mobile robot (10) is configured to carry out the positioning method according to any of the following positioning method embodiments.

R15. The mobile robot (10) according to any of the preceding robot embodiments and with the features of embodiments R12 and R14, wherein the mobile robot (10) is configured to cross a sloped road crossing by carrying out the road crossing method according to any of the preceding road crossing method embodiments and the positioning method according to any of the following positioning method embodiments.

R16. The mobile robot (10) according to any of the preceding embodiments, wherein the mobile robot (10) is configured to cross the road according to the generated control commands.

Below, embodiments of a simulation-based method for optimizing a road crossing method will be discussed. These embodiments are abbreviated by the letter "O" followed by a number. Whenever reference is herein made to simulation-based method embodiments, these embodiments are meant.

O1. A simulation-based method for optimizing a road crossing method comprising providing an action space (610), cost function (620), model of environment (630) and collected data (640);
simulating a road crossing scenario based on the model of environment (630) and collected data (640);
simulating a mobile robot (10) performing a road crossing on the simulated road crossing scenario based on the action space (610);
for each simulated road crossing, calculating a cost using the cost function (620);
determining a simulated road crossing with the minimum cost;
outputting optimal parameters (650) of the road crossing method based on the determined simulated road crossing with the minimum cost.

O2. The simulation-based method according to the preceding embodiment, wherein the action space (610) comprises possible control commands that the mobile robot (10) is capable of executing.

O3. The simulation-based method according to any of the two preceding embodiments, wherein the action space (610) comprises basic commands related to the robot's driving, such as, accelerating, braking, steering or any combination thereof.

O4. The simulation-based method according to any of the three preceding embodiments, wherein the action space (610) comprises data related to complex behaviors of the robot (10), such as, reversing, jump back, jump forward, abandon autonomous operation, contact operator, request operator assistance or any combination thereof.

O5. The simulation-based method according to any of the four preceding embodiments, wherein the action space (610) comprises restrictions on the actions of the robot (10), such as, a maximum acceleration, maximum braking, maximum velocity, maximum steering and the like.

O6. The simulation-based method according to any of the five preceding embodiments, wherein the cost function (620) is used to calculate a cost of a simulated road crossing.

O7. The simulation-based method according to preceding embodiment, wherein the cost of a simulated road crossing indicates the safety and efficiency of the simulated road crossing.

O8. The simulation-based method according to any of the seven preceding embodiments, wherein the model of the environment (630) comprises a model of a road.

O9. The simulation-based method according to any of the eight preceding embodiments, wherein collected data may relate to previous object detections during a real mobile robot (10) road crossing.

O10. The simulation-based method according to any of the nine preceding embodiments, wherein the simulation-based method is based on reinforcement learning.

O11. The simulation-based method according to any of the 10 preceding embodiments, wherein the optimal parameters (650) relate to at least one of
the time limit for how long to wait unit calling for operator assistance, distance limit for jumping back to the start of the road crossing if a car is detected while crossing the road, which object detection technique to use and when to stop or go to avoid dynamic objects.

O12. The simulation-based method according to any of the 11 preceding embodiments, wherein the step of simulating a mobile robot (10) performing a road crossing on the road crossing scenario based on the action space (610) comprises
generating control commands for the mobile robot (10) to cross the road using the road crossing method and simulating a mobile robot (10) performing a road crossing based on the generated control commands.

O13. The simulation-based method according to the preceding embodiment, wherein generating control commands for the mobile robot (10) to cross the road using the road crossing method
comprises setting at least one parameter of the road crossing method prior to executing the method for generating the control commands.

O14. The simulation-based method according to the preceding embodiment, wherein determining a simulated road crossing with the best score comprises determining the parameters of the road crossing method that were used to generate control commands for the simulated road crossing with the best score.

O15. The simulation-based method according to the preceding embodiment, wherein outputting optimal parameters (650) of the road crossing method based on the determined simulated road crossing with the best score comprises outputting the parameters of the road crossing method that were used to generate control commands for the simulated road crossing with the best score.

O16. The simulation-based method according to any of the 15 preceding embodiments, wherein the road crossing method is the road crossing method according to any of the preceding road crossing method embodiments.

O17. The simulation-based method according to the preceding embodiment, wherein the simulation-based method is configured to optimize the road crossing method according to any of the preceding road crossing method embodiments.

O18. The simulation-based method according to any of the 17 preceding embodiments, wherein the simulation-based method is carried out in a processing unit external to the mobile robot (10).

M105. The road-crossing method according to any of the preceding road-crossing method embodiments, wherein the control commands for the mobile robot to cross the road are generated at least in part based on the output of the simulation-based method according to any of the simulation-based method embodiments.

M106. The road crossing method according to any of the preceding road-crossing method embodiments and with the features of embodiment M88, wherein the road crossing method comprises setting the at least one parameter at least in part based on the output of the simulation-based method according to any of the simulation-based method embodiments.

Below, positioning method embodiments will be discussed. These embodiments are abbreviated by the letter "P" followed by a number. Whenever reference is herein made to positioning method embodiments, these embodiments are meant.

P1. A positioning method for a mobile robot positioned on a sloped terrain, the method comprising
the mobile robot performing at least one maneuver for minimizing a magnitude of an acceleration vector of the mobile robot due to gravity force acting on the mobile robot.

P2. The method according to the preceding embodiment, wherein minimizing the magnitude of the acceleration vector of the mobile robot due to the gravity force comprises
reducing the magnitude of the acceleration vector of the mobile robot due to the gravity force to zero.

P3. The positioning method according to any of the preceding positioning method embodiments, wherein minimizing the magnitude of the acceleration vector of the mobile robot due to the gravity force comprises
reducing a component of the gravity force parallel to a mobile robot's wheel's direction of rotation such that wheels of the mobile robot do not rotate due to gravity.

P4. The method according to any of the preceding positioning method embodiments, wherein after the mobile robot performs the at least one maneuver
the mobile robot is positioned such that the component of the gravity force parallel to a mobile robot's wheel's direction of rotation is minimized, preferably reduced to zero, and/or
the mobile robot is positioned such that an acute angle between a mobile robot's wheel's direction of motion and the direction of the slope of the terrain is between 70°-90°, preferably 88-90°, even more preferably 90°.

P5. The positioning method according to any of the preceding positioning method embodiments, wherein the method comprises acquiring sensor data indicating the gravity vector, such as, the direction of the gravity vector relative to the mobile robot.

P6. The positioning method according to the preceding embodiment, wherein acquiring sensor data comprises acquiring sensor data with at least one gyroscope.

P7. The positioning method according to any of the two preceding embodiments, wherein acquiring sensor data comprises acquiring sensor data with at least one accelerometer.

P8. The positioning method according to any of the preceding positioning method embodiments, wherein the method comprises determining the slope of the terrain.

P9. The positioning method according to the preceding embodiment and with the features of embodiment P5, wherein the method comprises determining the slope of the terrain based on the acquired sensor data.

P10. The positioning method according the preceding embodiment, wherein the slope of the terrain is at least 0.5°, preferably at least 2°.

P11. The positioning method according to any of the preceding positioning method embodiments, wherein the method comprises determining the direction of rolling of the mobile robot (10) due to gravity.

Determining the direction of rolling can be equivalent to determining the sign of the pitch angel of the mobile robot.

P12. The positioning method according to any of the preceding positioning method embodiments, wherein determining the direction of rolling of the mobile robot (10) due to gravity comprises
- determining the acceleration vector of the mobile robot due to the gravity force and
- wherein determining the acceleration vector of the mobile robot due to gravity comprises determining the sign of the acceleration vector, the direction of the acceleration vector, the magnitude of the acceleration vector or any combination thereof.

P13. The positioning method according to any of the 2 preceding positioning method embodiments, wherein determining the direction of rolling of the mobile robot (10) due to gravity comprises detecting a rotation of the wheels of the mobile robot due to gravity force.

P14. The positioning method according to the preceding embodiment, wherein detecting a rotation of the wheels of the mobile robot comprises detecting a direction of rotation of the wheels.

P15. The positioning method according to any of the two preceding embodiments, wherein detecting a rotation of the wheels of the mobile robot comprises detecting a speed of rotation of the wheels.

P16. The positioning method according to any of the 5 preceding embodiments,
- wherein the robot comprises a braking system configured to generate a resistance force tending to stop the wheels from rotating and
- wherein determining the direction of rolling of the mobile robot due to the gravity force comprises releasing the brakes of the mobile robot.

P17. The positioning motion according to any of the 6 preceding embodiments, wherein determining the direction of rolling of the mobile robot due to gravity comprises determining a direction of motion of the mobile robot due to gravity.

P18. The positioning method according to any of the preceding positioning method embodiments, wherein the method comprises determining whether the acceleration vector of the mobile robot due to gravity is zero.

P19. The positioning method according to the preceding embodiment, wherein if the determined acceleration vector of the mobile robot due to gravity is not zero the mobile robot changes its pose.

P20. The positioning method according to the preceding embodiment and with the features of embodiments P11 and P18, wherein the steps
- determining the direction of rolling of the mobile robot due to the gravity force,
- determining whether the acceleration vector of the mobile robot due to gravity is zero,
- if the acceleration vector of the mobile robot due to gravity is not zero the mobile robot changes its pose
- are performed iteratively until it is determined that the acceleration vector is zero.

P21. The positioning method according to the preceding embodiment, wherein in a first iteration the robot changes its pose by rotating by 90° and in each further iteration the robot changes its pose by rotating by half the previous angle of rotation.

That is, in such embodiments the advantageous orientation wherein the acceleration vector reduces to zero is searched according to a bisection search algorithm.

P22. The positioning method according to the penultimate embodiment, wherein in each iteration the robot changes its pose by rotating by a fixed step size, such as, by 1 to 10°.

That is, in such embodiments the advantageous orientation wherein the acceleration vector reduces to zero is searched according to a linear search algorithm.

P23. The positioning method according to any of the three preceding embodiments, wherein in each iteration the direction of rotation is determined based on the direction of rolling of the mobile robot due to the gravity force determined during that iteration.

P24. The positioning method according to any of the 4 preceding embodiments, wherein in the first iteration the robot rotates by 90°.

P25. The positioning method according to any of the preceding positioning method embodiments, wherein the mobile robot performing the at least one maneuver is triggered manually by a human operator.

P26. The positioning method according to any of the preceding positioning method embodiments, wherein the mobile robot performing the at least one maneuver is triggered automatically.

P27. The positioning method according to the preceding embodiment, wherein the mobile robot performing the at least one maneuver is triggered automatically if the robot is positioned on a sloped terrain with a slope of at least 0.5°, preferably at least 2°.

P28. The positioning method according to any of the two preceding embodiments, wherein the positioning method comprises periodically measuring the slope of the terrain.

P29. The positioning method according to any of the three preceding embodiments,
- wherein the method comprises maintaining an idle timer configured to a time since which the robot has been idle and
- wherein the mobile robot performing the at least one maneuver is triggered automatically if the idle timer indicates an idle duration longer than an idle duration threshold, such as, 5 minutes.

P30. The positioning method according to any of the two preceding embodiments,
- wherein the mobile robot comprises an internal energy source, such as a battery,
- wherein the method comprises measuring the energy level of the energy source, and
- wherein the mobile robot performing the at least one maneuver is triggered automatically if the energy level drops below a threshold energy level.

P31. The positioning method according to any of the two preceding embodiments,
- wherein the mobile robot comprises an active braking system,
- wherein the method comprises measuring the temperature of at least one component of the active braking system, and
- wherein the mobile robot performing the at least one maneuver is triggered automatically if the temperature of at least one component of the active braking system rises above a temperature threshold level, such as, 75°.

M107. The road crossing method according to any of the preceding road crossing method embodiments, wherein the method comprises the mobile robot performing the positioning method according to any of the preceding positioning method embodiments.

Below, embodiments of a mobile robot configured to carry out the positioning method will be discussed. These embodiments are abbreviated by the letter "Q" followed by a number.

Q1. A mobile robot configured to carry positioning method according to any of the preceding positioning method embodiments.

Q2. The mobile robot according to the preceding embodiment, wherein the mobile robot comprises an active braking system.

Q3. The mobile robot according to any of the 2 preceding embodiments, wherein the mobile robot comprises 3 to 8 wheels, such as, 6 wheels.

Q4. The mobile robot according to any of the 3 preceding embodiments, wherein the mobile robot comprises at least one odometer.

Q5. The mobile robot according to any of the 4 preceding embodiments, wherein the mobile robot comprises at least one gyroscope.

Q6. The mobile robot according to any of the 5 preceding embodiments, wherein the mobile robot comprises at least one accelerometer.

Q7. The mobile robot according to any of the 6 preceding embodiments, wherein the mobile robot comprises at least one inertial measuring unit.

Q8. The mobile robot according to any of the 7 preceding embodiments, wherein the mobile robot comprises any of the features of the embodiments R1 to R16.

Below, system embodiments will be discussed. These embodiments are abbreviated by the letter "S" followed by a number. Whenever reference is herein made to system embodiments, these embodiments are meant.

S1. A system comprising:
a mobile robot (10) comprising an object detector (30) configured to detect at least one dynamic object (20) on the road crossing; and
a data processing unit (40) configured to
process the output of the object detector (30) for estimating a location and time of collision with the at least one dynamic object (20);
generate control commands for the mobile robot (10) to avoid collision with the at least one dynamic object (20) based on the estimated location and time of collision with the at least one dynamic object (20);
wherein the mobile robot (10) is configured to cross the road according to the generated control commands.

S2. The system according to the preceding embodiment, wherein the object detector (30) comprises at least one sensor (35) comprising at least one visual camera (35), at least one stereo camera pair (35), at least one ToF sensor (35), at least one LIDAR (35) or any combination thereof.

S3. The system according to any of the preceding system embodiments, wherein the mobile robot (10) comprises an auxiliary sensor (37), such as, at least one GPS receiver (37), at least one odometer (37), at least one gyroscope (37), at least one inertial measurement unit (37), at least one proximity sensor (37), at least one accelerometer (37) or any combination thereof.

S4. The system according to any of the preceding system embodiments, wherein the mobile robot (10) is configured to travel on sidewalks and at low speeds (e.g. similar to a human's walking or jogging speed), such as, 0-30 km/h, preferably less than 10 km/h.

S5. The system according to any of the preceding system embodiments, wherein the mobile robot (10) is a wheeled robot (10).

S6. The system according to any of the preceding system embodiments, wherein the mobile robot (10) comprises 3 to 8 wheels, such as 6 wheels.

S7. The system according to any of the preceding system embodiments, wherein the mobile robot (10) is a mobile delivery robot (10) configured for item delivery.

S8. The system according to the preceding system embodiment, wherein the mobile robot (10) comprises a body or housing comprising a compartment configured to house or store items to be delivered.

S9. The system according to any of the preceding system embodiments, wherein the mobile robot (10) is configured to operate autonomously.

S10. The system according to any of the preceding system embodiments, wherein the mobile robot (10) is configured to operate partially autonomously.

S11. The system according to any of the preceding system embodiments, wherein the mobile robot (10) comprises the data processing unit (40).

S12. The system according to any of the preceding system embodiments, wherein the system further comprises a server external to the mobile robot (10).

S13. The system according to the preceding embodiment and without the features of the penultimate embodiment, wherein the data processing unit (40) is comprised by the server.

S14. The system according to any of the two preceding embodiments, wherein the mobile robot (10) is configured to be remotely connected with the server.

S15. The system according to any of the preceding system embodiments, wherein the system is configured to carry out the road crossing method according to any of the preceding road crossing method embodiments.

S16. The system according to any of the preceding system embodiments, wherein the mobile robot (10) is configured to perform road crossings according to the road crossing method according to any of the preceding method embodiments.

S17. The system according to any of the preceding system embodiments, wherein the system is configured to carry out the simulation-based method for optimizing a road crossing method according to any of the preceding simulation-based method embodiments.

S18. The system according to the preceding embodiment and with the features of embodiments S12, wherein the server is configured to carry out the simulation-based method.

S19. The system according to any of the preceding system embodiments, wherein the robot carries out the method according to any of the preceding positioning method embodiments.

S20. The system according to the preceding embodiment, wherein the mobile robot (10) comprises a processing unit configured to facilitate the execution of the positioning method.

S21. The system according to any of the two preceding embodiments and with the features of embodiment S11, wherein the data processing unit (40) is configured to facilitate the execution of the positioning method.

S22. The system according to any of the three preceding embodiments, wherein the mobile robot (10) comprises any of the features of the embodiments Q1 to Q8.

BRIEF DESCRIPTION OF THE DRAWINGS

FIG. 1a illustrates a typical scenario of a mobile robot road crossing wherein the mobile robot comprises a data processing unit executing routines for planning the road crossing;

FIG. 1b illustrates a typical scenario of a mobile robot crossing a road wherein the data processing unit executing routines for planning the road crossing is external to the mobile robot;

FIG. 4a illustrates a road crossing map comprising data related to the pose of the mobile robot and of the detected objects;

FIG. 5a illustrates the calculation of an efficient road crossing plan;

FIG. 5b illustrates the calculation of a speed function with respect to time for the mobile robot to cross the road based on the road crossing plan of FIG. 5a;

FIG. 5c illustrates the calculation of an efficient road crossing plan wherein complex behavior of the robot is considered;

FIG. 5d illustrates the calculation of a speed function with respect to time for the mobile robot to cross the road based on the road crossing plan of FIG. 5c;

DETAILED DESCRIPTION OF THE DRAWINGS

Figure 2:
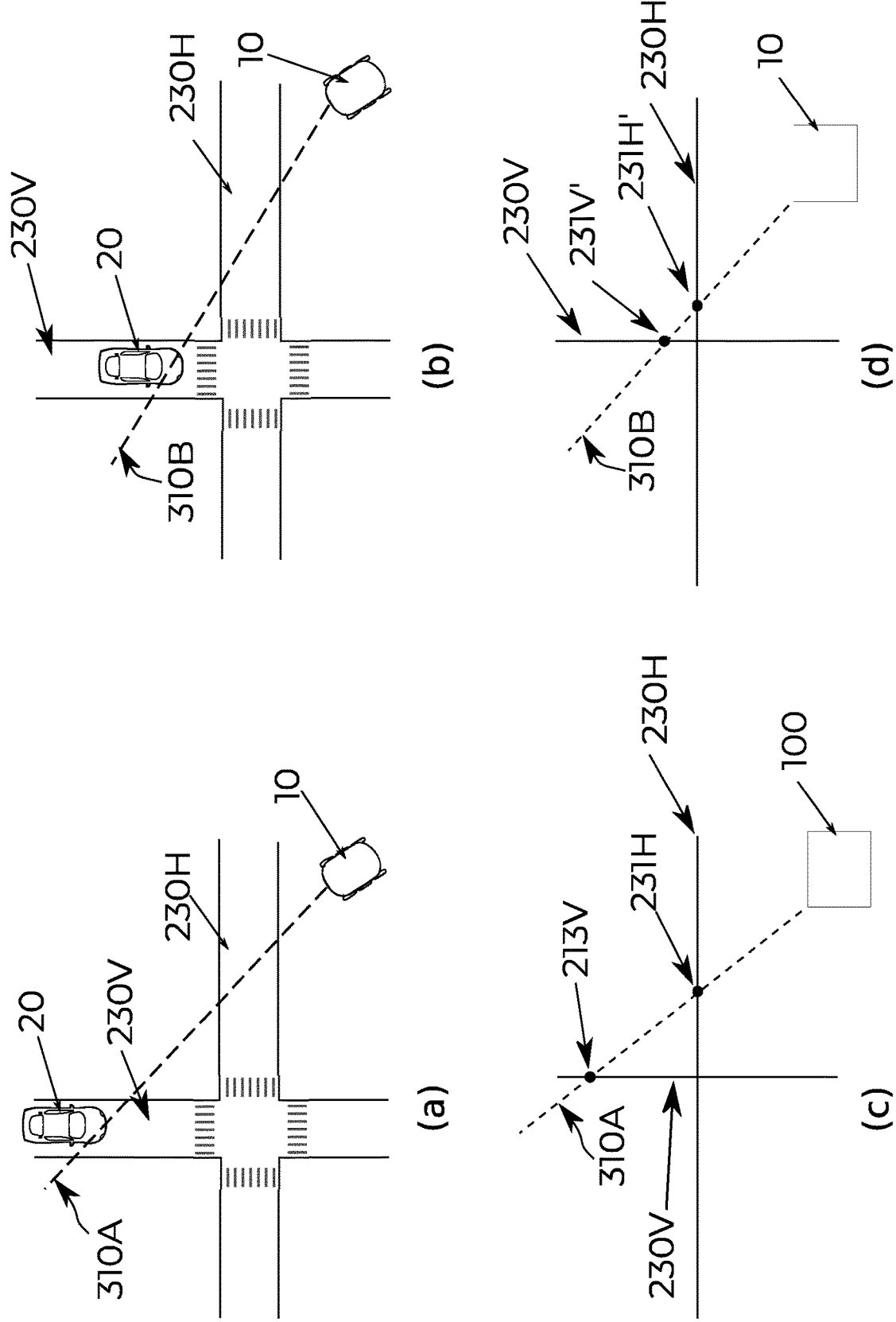
FIGS. 2a to 2e illustrate an advantageous method for combining map data with sensor data to determine the location of a dynamic object.

In the following, exemplary embodiments of the invention will be described, referring to the figures. These examples are provided to give further understanding of the invention, without limiting its scope.

In the following description, a series of features and/or steps are described. The skilled person will appreciate that unless required by the context, the order of features and steps is not critical for the resulting configuration and its effect. Further, it will be apparent to the skilled person that irrespective of the order of features and steps, the presence or absence of time delay between steps can be present between some or all of the described steps.

FIG. 1a illustrates a typical scenario of a mobile robot 10 intending to cross a road. The mobile robot 10 can be a land based mobile robot 10. It can be configured to generally travel on sidewalks and at low speeds (e.g. similar to a human's walking or jogging speed), such as, 0-30 km/h, preferably less than 10 km/h. The mobile robot 10 can be configured to travel according to norms and regulations that are valid for pedestrians and/or special norms and regulations applying to land-based mobile robots traveling on sidewalks (and on other pedestrian pathways). Further, the mobile robot 10 can be a wheeled mobile robot 10. The mobile robot 10 may comprise 3 to 8 wheels, such as 6 wheels. The wheels can be rotated by a motion generation system, such as, a combustion engine or electrical motor. The motion of the wheels can be controlled such that the mobile robot 10 may accelerate, brake, steer and reverse. In addition, the wheels and their connection to the robot 10 can be configured such that the robot may climb or descent short obstacles.

In some particular embodiments, the mobile robot 10 can be a mobile delivery robot 10. That is, the mobile robot 10 can be configured for item delivery. For example, the mobile robot 10 may comprise a body or housing comprising a compartment adapted to house or store items to be delivered. The body may comprise an opening on one of its sides or on a part of one of its side, such as, on the top side. Said opening may allow for the insertion of goods, items and packages in the compartment of the body. The opening of the compartment may be covered by a lid. Said lid, may assume an opened or closed position. The lid in the closed position cannot allow access in the inside of the compartment, hence the items cannot be accessed when the lid is in a closed position. The lid of the compartment in the open position may allow access to the inner of the compartment through the opening of the body and hence, the items that may be positioned there can be accessed. For example, this can allow the recipient to reach for the item(s). The lid can be locked (unlocked) to (from) the body of the mobile robot 10. That is, the lid can be locked in the closed position and hence cannot be opened without causing damage to the structure of the mobile robot. The lid can be unlocked which can allow the positioning of the lid from the closed to the opened position. As such, the mobile robot 10 in its normal routine can transport items from a first location (e.g. a parcel collective depot, delivery van, bar, restaurant, shop) to a second location (e.g. recipient address).

Furthermore, the robot 10 can be configured to operate autonomously or partially autonomously. For example, the autonomy level of the mobile robot 10 can be between the levels 1 to 5, as defined by the Society of Automotive Engineers (SAE) in J3016—Autonomy Levels. In some embodiments the mobile robot 10 can be controlled (e.g. steered) by a human operator through a user terminal (i.e. the user terminal can exchange data with the mobile robot 10). In some other embodiments, the robot 10 can be assisted by the human operator only in some instances, e.g. in particular situations imposing more risk than usual, such as, crossing a road. In other embodiments, the robot 10 can be fully autonomous—that is, can navigate, drive and carry out an assigned task without human intervention.

As depicted in FIG. 1a, the mobile robot 10 can comprise an object detector 30. The object detector can be configured to facilitate the detection of at least one dynamic object in the vicinity of the mobile robot 10. For example, the object detector 30 can be configured to detect a dynamic object 20, such as, a vehicle 20, passing on a road (e.g. in the road that the mobile robot 10 intends to cross). Furthermore, the object detector 30 can be configured for estimating the location, speed, direction of motion, velocity (e.g. radial velocity), a physical feature (e.g. size, shape, color) or any combination thereof of a dynamic object 20.

The object detector 30 may comprise at least one sensor 35. The sensor 35 may be positioned with a field of view towards the front of the mobile robot 10. This is particularly advantageous for detecting an object in the front of the mobile robot 10. For example, during a road crossing the front of the mobile robot that comprises a portion of the road can be sensed. Nevertheless, it can further advantageous to provide a plurality of sensors 35 with different fields of view, e.g. toward the front, sides, rear of the mobile robot 10 or any combination thereof. This can provide a more complete view of the surroundings of the mobile robot 10. Thus, a moving object can be detected from different directions of the mobile robot 10 which can increase the safety of operation of the mobile robot 10.

The sensors 35 may comprise at least one camera, stereo-camera, laser-based sensor (LIDAR), time-of-flight camera, infrared based sensor, thermal camera, microphone, microphone array, ultrasound sensor, radar or any combination thereof. The at least one sensor 35 may be utilized to sense the surroundings of the mobile robot 10. More particularly, each sensor 35 can be configured to sense a portion of the surroundings of the mobile robot 10 corresponding to the respective field of view of the sensor 35. The at least one sensor 35 may be configured to periodically sense the surroundings of the mobile robot 10 and output sensor data. If a plurality of sensors 35 are provided they can be configured with different sensing periods. Typically, sensors 35 such as cameras, stereo cameras, ToF sensors and the like can be configured to sense 2 to 10 times per second, such as, 4 times per second.

In some embodiments, the object detector may comprise a radar sensor 35 (also referred to as radar 35). The radar sensor 35 can typically comprise a transmitter antenna, receiver antenna and a signal processor. The antennas and the signal processor may be provided within one chip. The transmitter and receiver antenna are configured for transmitting and receiving radio frequency (RF) signals. The signal processor is configured for processing the transmitted and received signals for extracting information about the location, size and motion of a target. In some embodiments, the data processing unit 40 can process the transmitted and received signals for extracting information about the location, size and motion of a target. The latter embodiment can be advantageous as it can allow the use of radar sensors 35 without a signal processor.

In some embodiments the object detector 30 may comprise 1 to 10 radars 35, such as, 4 radars 35. The radars 35 may be positioned on different sides of the robot 10, such as, on the front, on the sides and on the rear of the robot. The radar 35 can be configured or operated to detect location, size and motion of a target or any combination thereof. In some embodiments, the radar 35 may be configured to generate a continuous wave with a constant frequency. By detecting the frequency shift of received signals (i.e. signals reflected by moving targets) the radial velocity of the moving target (i.e. rate of change of the distance between the moving target and the radar) can be measured. Such radars are generally referred to as Doppler radars and they are typically used for detecting presence of moving objects and measuring the radial velocity of the moving objects.

In some embodiments, the radar 35 may be configured to generate an amplitude modulated wave (e.g. pulse wave). In such embodiments, in addition to the radial velocity, the time-of-flight of the transmitted and reflected signal can be measured. Hence, the radar 35 can further facilitate measuring a distance to a target. In some embodiments, the radar 35 can be configured to generate a frequency modulated signal. Using frequency modulated signals can facilitate measuring a distance to the target. Generally, measuring a distance based on frequency modulation can be more accurate than measuring the distance based on the time-of-flight. Measuring the time of flight, especially for short distances, may require precise electronic devices. An example of radars operating with frequency modulated signals are FSK radars.

In addition, the antennas of the radar 35 may be configured such that the direction of arrival of received signals can be measured. This further provides information on the direction of the target relative to the radar. For example, the radar sensor 35 may comprise an antenna array.

In the above, a radar sensor 35 that can be comprised by the object detector 35 is described. That is, the radar sensor 35 can be provided attached to the mobile robot 10. In other words, in some embodiments, the mobile robot 10 can be equipped with a radar sensor. Alternatively or additionally, an external radar sensor 50 can be provided external to the mobile robot 10. More particularly, the external radar sensor 50 can be provided in the vicinity of the road crossing and preferably with a field of view towards the road crossing. In other words, the road crossing can be equipped with a radar sensor 50. The external radar sensor 50 can also be referred to as a radar box 50. The external radar sensor 50 can comprise any of the features discussed with respect to the radar sensor 35. In addition, the external radar sensor 50 can be configured to transmit data (e.g. its measurements) to the mobile robot 10. In some embodiments, the external radar sensor 50 can be configured for wireless data communication, such as, short range wireless data communication. In such embodiments, the external radar sensor 50 may directly transmit and/or receive data to/from the mobile robot 10, when the robot 10 is within the communication range of the external radar sensor 50. Alternatively or additionally, the external radar sensor 50 can be connected with a central server (e.g. cloud server) and the communication between the external radar sensor 50 and the robot 10 is indirectly performed through the server.

In some embodiments, the object detector 30 may comprise at least one visual sensor 35. The visual sensor 35 can be configured for extracting visual information (i.e. shape, brightness, color or any combination thereof) of its field of view. A typical example of a visual sensor 35 is a visual camera 35 and an IR camera 35. Generally, visual sensors 35 can be configured to output visual images which comprise brightness and/or color information. The visual images can be processed for detecting objects therein.

That is, the detection of objects on visual images can be based on object recognition algorithms, such as the ones described in:

Leibe B., Matas J., Sebe N., Welling M. (eds) Computer Vision—ECCV 2016, ECCV 2016, Lecture Notes in Computer Science, vol 9905, Springer, Cham;

Joseph Redmon, Santosh Kumar Divvala, Ross B. Girshick, Ali Farhadi: You Only Look Once: Unified, Real-Time Object Detection, CVPR 2016: 779-788.

In some embodiments, the detection of dynamic objects can be based on a motion detector algorithm. For example, dynamic objects can be detected based on a subtraction of visual images captured consecutively (e.g. blob detection). That is, at least two images are compared, wherein a time delay exists between the moments that the at least two images were captured, such as 0.1-1 second. The differences found by the comparison can indicate a possible presence of a moving object. The differences can further be analyzed to determine whether they indicate the presence of a dynamic object.

For example, detecting at least one dynamic object can comprise computing a sum of absolute differences between corresponding pixels (i.e. brightness and/or color values) of two images captured consecutively (i.e. with a short time delay between the two, such as, 0.1 to 1 second). If the sum of the absolute differences is greater than a threshold then it can be determined that a moving object may be present. Based on this, the location of the moving object on the image can be detected over the whole image, or in image regions. These regions can, for example, be obtained with object detection.

That is, in some embodiments, first it can be determined whether a dynamic object can be present on an image. This can be performed with algorithms that are not computationally complex, such as, computing a sum of absolute differences between corresponding pixels of two images. If for an image it can be determined that a dynamic object is present then the image can be further processed with an object detection algorithm for further finding the position of the object on the image and/or for extracting features of the object.

In another embodiment, an object recognition algorithm can be used for an accurate detection and localization of dynamic objects 20, such as vehicles 20. Object recognition algorithm can be based on Template Matching, Deformable Parts Model (DPM) and/or Neural Networks (NN), preferably Deep Neural Networks (DNN).

An exemplary Template Matching algorithm that can be used is disclosed by Anish Acharya, Template Matching based Object Detection Using HOG Feature Pyramid, June 2014, obtainable by www.arxiv.orq (https://arxiv.org/abs/1406.7120).

An exemplary Deformable Parts Model algorithm that can be used is disclosed by P. F. Felzenszwalb, R. B. Girshick, D. McAllester and D. Ramanan, "Object Detection with Discriminatively Trained Part-Based Models," in IEEE Transactions on Pattern Analysis and Machine Intelligence, vol. 32, no. 9, pp. 1627-1645, September 2010.

An exemplary Deep Neural Network algorithm that can be used is disclosed by Liu W. et al. (2016) SSD: Single Shot MultiBox Detector, in: Leibe B., Matas J., Sebe N., Welling M. (eds) Computer Vision—ECCV 2016, ECCV 2016, Lecture Notes in Computer Science, vol 9905, Springer, Cham. A further exemplary Deep Neural Network algorithm that can be used is disclosed by Joseph Redmon, Santosh Kumar Divvala, Ross B. Girshick, Ali Farhadi: You Only Look Once: Unified, Real-Time Object Detection, CVPR 2016: 779-788.

In another embodiment, detection of objects can be facilitated by detecting particular parts of the objects, preferably highly salient parts. For example, detection of vehicles can be facilitated by detecting headlights of the vehicle and/or wheels of the vehicle.

In some embodiments, the object detector 30 can comprise at least one depth sensor 35, such as, a time-of-flight (ToF) sensor, LIDAR sensor or stereo cameras. The depth sensor 35 can be configured for extracting depth information (i.e. distance between surfaces on the field of view and the sensor). Further on, the depth information may be used to not only determine distance to a target, but also to extract visual information, such as, shapes. For example, the shape of on object in the field of view of the depth sensor 35 can be extracted by detecting the boundaries of the object wherein abrupt changes of depth measurements can be present. The extraction of shapes from a depth image can be similar to the extraction of shapes from a visual image. In addition, some depth sensors 35 can be configured for also obtaining a brightness image based on the intensity of the received light (typically IR light).

In addition, the mobile robot 10 can comprise at least one auxiliary sensor 37, such as, at least one GPS receiver 37, at least one odometer 37, at least one gyroscope 37, at least one inertial measurement unit 37, at least one proximity sensor 37, at least one accelerometer 37 or any combination thereof.

Furthermore, a data processing unit 40 may be provided. The data processing unit 40 can be configured to execute a plurality of steps and sub-steps (e.g. the steps and sub-steps depicted in FIG. 3) to facilitate a safe road crossing. The data processing unit 40 can be programmable. That is the software that can run on the data processing unit 40 can be updated. The data processing unit 40 can comprise at least one Graphical Processing Unit (GPU), Central Processing Unit (CPU), microcontroller (μC), Digital Signal Processor (DSP), System-on-Chip (SoC) or any combination thereof. In a preferred embodiment, the data processing unit 40 can be a System-on-Chip, that comprises proper interface for at least one of uploading, downloading, installing, deleting, updating, debugging, logging and compiling a software that can run on the data processing unit 40. The data processing unit 40 can be configured to at least execute an image processing algorithm (i.e. a program for processing an image, a sequence of sentences written in a specific programming language, for example: C, C/C++, Java, Python, Assembly Language, processor specific language, etc.).

In general, the data processing unit 40 can be configured to process any sensor data generated by the sensor(s) 35 and/or map data and/or other external or internal (to the mobile robot 20) data that can be provided to the data processing unit 40. The data processing unit 40 can also comprise or have access to a storage unit (i.e. memory device) configured to store the software that can be uploaded on the data processing unit 40. The storage can be a main memory such as random-access memory and/or a secondary memory such as hard disk drives (HDD) or solid-state devices (SSD). The data processing unit 40 can further comprise or have access to a cache memory wherein the data processing unit 40 may store temporary data for increasing time efficiency of the computations.

Generally speaking, the data processing unit 40 can be configured to process the output of the object detector 30 for estimating a location and time of collision with the at least one dynamic object 20. Furthermore, the data processing unit 40 can be configured to generate control commands for the mobile robot 10 to avoid collision with the at least one dynamic object 20 based on the estimated location and time of collision with the at least one dynamic object (20). In some embodiments, the data processing unit 40 can be configured to process sensor data acquired by at least one sensor 35 for detecting at least one object in the vicinity of the mobile robot. In addition, the data processing unit (40) can be configured to classify the detected objects as static or dynamic objects.

The data processing unit 40 can be provided internal (or embedded) to the mobile robot 10. This is illustrated in FIG. 1a. This can be advantageous as the output of the object detector 30 (e.g. sensor data) may be directly provided to the data processing device 40. As such, control commands for the mobile robot 10 to perform the road crossing may be generated faster. However, this configuration imposes constraints on the complexity of the tasks that can be executed by the data processing unit 40. This is due to the fact, that the computational, memory and energy resources can be limited in a mobile robot 10.

Alternatively, as illustrated in FIG. 1b, the data processing unit 40 can be provided external to the mobile robot 10. In the latter embodiment, the data processing unit 40 can be a server external to the mobile robot 10. In such embodiments, a remote connection can be established between the mobile robot 10 and the data processing unit 40 (i.e. server 40). That is, both the mobile robot 10 and the data processing unit 40 can comprise a communication component (not shown) configured for data transmission. The remote connection can allow the output of the object detector 30 (e.g. sensor data) to be communicated from the mobile robot 10 to the server 40 and any output generated by the server (e.g. control commands for road crossing) to be communicated from the server 40 to the mobile robot 10. This configuration can be advantageous as more complex tasks can be executed, due to the fact that generally, in a server, computational, memory and energy resources can be extensive. However, such embodiments may require a fast data connection between the robot 10 and the server 40. That is, the time required to transmit information between the robot and the server 40 should be kept within reasonable upper bounds (e.g. less than 0.5 seconds).

In some embodiments a hybrid approach may be followed. That is, a data processing unit 40 can be provided internal to the robot 10 and a server 40 can be provided external to the robot 10. The server 40 may serve one or more mobile robots 10, preferably a plurality of mobile robots 10. Typically, the data processing unit 40 responsible for executing tasks that deal with quick responses of the robot 10 (e.g. collision avoidance, road crossing) is provided internal to the robot 10, as illustrated in FIG. 1a. On the other hand, tasks that do not comprise tight delay-bounds (e.g. routing from the initial location to the end location) can be executed at the data processing unit 40 external to the robot, as illustrated in FIG. 1b.

The robot 10 can further have access to map data. The map data can facilitate the mobile robot's localization and navigation. For example, the map data may facilitate determining when the mobile robot 10 is approaching a road crossing. Additionally, the map data may comprise information about the road crossing, such as, the width of the road, the number of lanes, boundaries of the road, presence/position/width of the median strip of the road, the position of zebra lines, start of the road crossings, end of the road crossings or any combination thereof. Furthermore, the map may comprise visual features that further describe the surroundings of the mobile robot 10. Visual features can, for example, be straight lines extracted from object boundaries, light sources etc. By extracting visual features from the sensor data and comparing them with mapped visual features, a more precise localization can be achieved (typically with an error of less than 10 cm). This can further facilitate the detection of a road crossing and the positioning of the mobile robot 10 for crossing the road.

Furthermore, map data may can facilitate the detection of a dynamic object, particularly the detection of dynamic objects passing on a road, such as, vehicles. In some embodiments, map data can be combined with sensor data to determine the location of a dynamic object.

FIG. 2 illustrates an advantageous method for combining map data with sensor data to determine the location of a dynamic object. A more detailed description of such a method is disclosed in the European patent application of Starship Technologies OÜ, "Device and method for detection and localization of vehicles" with filing number EP 17172808.2. FIG. 2 is adapted from EP 17172808.2, wherein the numbering has been adapted according to the present application.

FIGS. 2a and 2b, illustrate a scenario wherein the mobile robot 10 approaches an intersection of the roads 230V and 230H. The location of the roads 230V and 230H can be extracted from map data. Similarly, the boundaries of the road can be extracted form map data. For a more precise location, the map can comprise straight lines related to the roads 230V and 230H, e.g. the boundaries between the road and the sidewalk. Thus, the robot 10 can "know" when it has approached a road.

Using the object detector 30, the robot may detect the vehicle 20. In some embodiments, the robot may detect only a direction to the vehicle 20 (as illustrated by the dashed lines 310). This is particularly the case when visual sensors are used, which typically can provide only the direction towards a target. In some embodiments, a range to the vehicle 20 can be measured, e.g. using a depth or radar sensor. Either way, the object detector 30 cannot provide a precise object detection and localisation. Typically, due to measurement uncertainties ambiguities regarding the objects position may exist. For example, when only a direction to the vehicle 20 is measured (e.g. using a visual sensor) the vehicle 20 can be positioned anywhere in the direction line 310. Although, measuring the range (e.g. using a depth or radar sensor) may reduce the ambiguity on the location of the vehicle, again due to uncertainties associated with the measurement of range some ambiguity may still be present.

Ambiguity on the position of a dynamic object can decrease the safety of operation of the robot 10. However, to increase certainty on the localisation of a dynamic object 20 and particularly of a vehicle 20, map data can be used. Based on the rationale, that a moving vehicle 20 (or generally a fast-moving object) is very likely positioned on a road, the map can facilitate narrowing the location of the moving vehicle 20 only on those locations positioned in a road. That is, by intersecting a measured direction to a moving object 20 with map data, ambiguity on the location of the moving object 20 can be reduced. An exact location can be found if there is only one road present in the vicinity of the robot and in the direction of the moving object 20. In addition, range measurements can be facilitated to further increase the precision on the estimated location of the dynamic object 20.

However, in some instances, simply intersecting a measured direction to a vehicle with map data may still generate ambiguous locations of the moving object. Such a scenario is depicted in FIGS. 2a and 2c, wherein after intersection the direction 310A with map data (roads 230V and 230H), two possible locations 231V and 231H of the vehicle 20 are obtained. Same is true for the second instance depicted in FIGS. 2b and 2d, the two possible locations 231V' and 231H' are obtained.

Said ambiguity can be solved by performing a range (i.e. depth) measurement. That is, by estimating the distance between the robot 10 and the moving object 20, it can be determined which of the possible locations 231V and 231H (or which of 231V' and 231H') is more plausible.

Alternatively or additionally, said ambiguity can be solved based on the velocity of the vehicle. Based on map data it can be inferred that the vehicle 20 moved (during the two instances depicted in FIGS. 2a and 2b) either from possible location 231V to 231V' or from possible location 231H to 231H'. In other words, the vehicle 20 is either driving on road 231V or on road 231H. Furthermore, based on map data the distances between possible locations 231V and 231V' and between 231H and 231H' can be determined.

Further still, the time between instances depicted in FIGS. 2a and 2b is typically known—as it can correspond to the times of acquiring sensor data. Using the determined distance between possible locations and the time between the two instances the velocity of the vehicle can be estimated, as shown in FIG. 2e, by the possible velocity vectors 240V and 240H. It can be noticed, that one of the velocity vectors comprises a smaller magnitude than the other. More particularly, the road closer to the mobile robot—for the same two measured directions—will always give a velocity vector smaller than the road further from the robot 10. In other words, using map data and at least two measured direction to a moving object, multiple possible velocity vectors of the moving object can be estimated, such as, for each road intersecting the at least two measured velocity vectors a respective velocity vector can be estimated.

In some embodiments, ambiguity on the estimated velocity of the moving object 20 can be solved by performing a velocity measurement of the moving object 20 (e.g. using a radar sensor). The measured velocity (or radial velocity) of the moving object can disambiguate the velocity estimation of the moving object 20. For example, one of the velocity vectors 240V and 240H can be determined as the velocity of the moving object 20. This can further disambiguate the location of the vehicle.

In some embodiments, ambiguity on the estimated velocity of the moving object 20 can be directly solved, if some of the estimated velocities is above norms. For example, if one of the velocities is estimated to be 150 km/h in a city, then it can be determined that it is in fact an artefact.

During its operation, the mobile robot 10 may be required to cross roads. Crossing roads may impose a more challenging task to the mobile robot 10, compared to its usual routine (i.e. traveling on sidewalks). This is due to the fact that moving vehicles 20, generally travelling at high speeds, may be present on the roads to be crossed. Furthermore, the participation of mobile robots 10 in traffic is a relatively new development. As such, other traffic participants such as car drivers, may not be used to the presence of the mobile robots 10. This imposes further danger as the other traffic participants such as car drivers may not be tolerative or yield to the mobile robot 10.

Further challenging is the crossing of wide roads, non-signalized roads (e.g. without traffic lights) or roads (or instances) without other pedestrians crossing. For example, as shown in the scenario of FIGS. 1a and 1b, the road to be crossed is a 4-lane road, without signals and without pedestrians or other traffic participants crossing.

Figure 3:
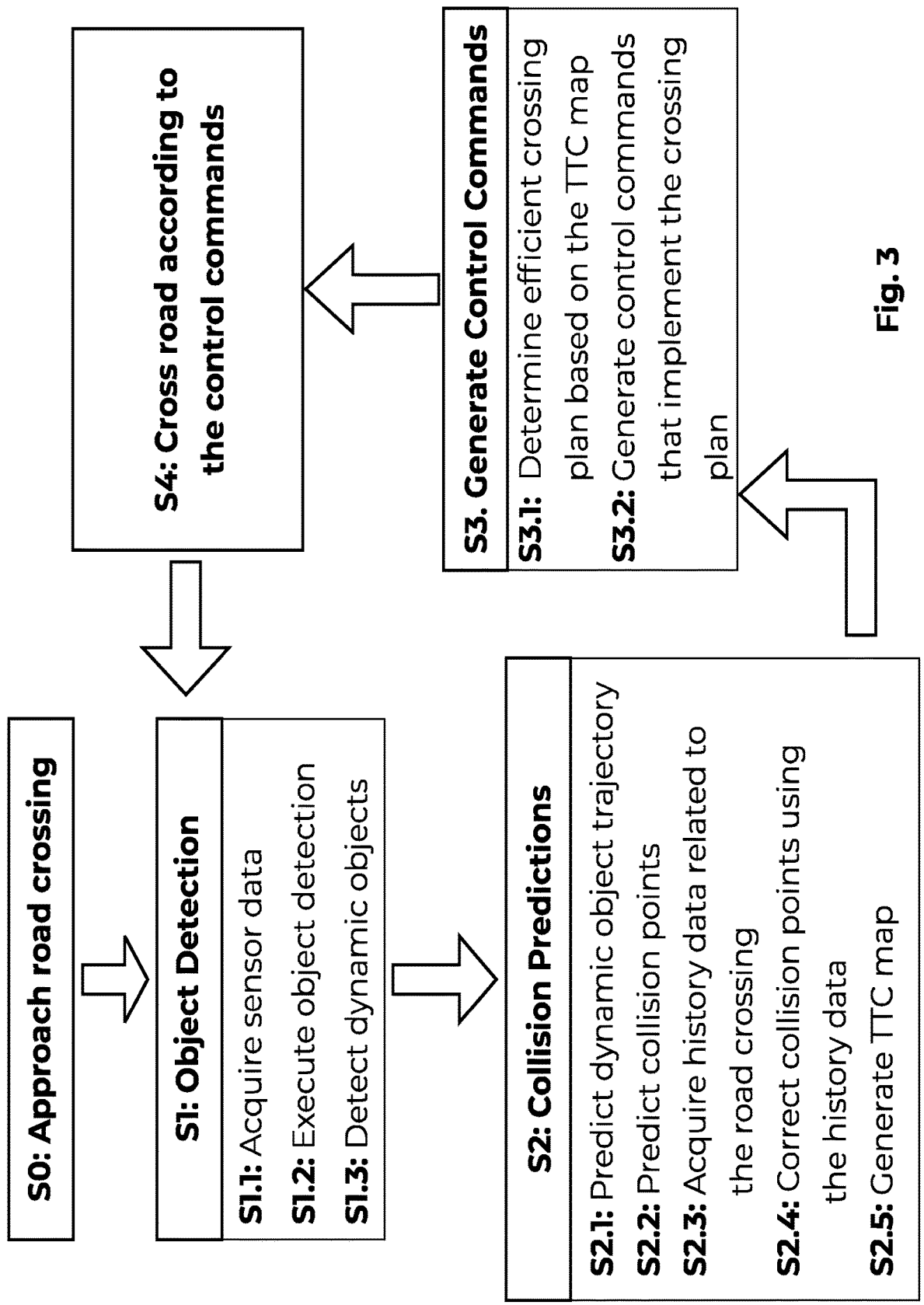
FIG. 3 provides a plurality of steps and sub-steps of a road crossing method according to embodiments of the present invention.

FIG. 3 depicts a method for performing a safe and efficient mobile robot road crossing. Generally speaking, the method, which can initiate after a mobile robot 10 approaches a road crossing (i.e. step S0), can comprise four main steps or routines. In a step S1 object detection can be performed. This step can be facilitated or performed by the object detector 30 and/or the radar box 50. In a step S2 collision prediction can be performed. In this step, for example, for each detected object in step S1 the risk of collision can be evaluated and furthermore a prediction (i.e. estimation) of the location and time of collision can be made. Step S2 can be performed by the data processing unit 40 and preferably based on the results of step S1. It will be noted that in some embodiments the data processing unit 40 can comprise the object detector 30. That is, in some embodiments, steps S1 and S2 can be performed by the data processing unit 40. In a step S3 control commands for the mobile robot 10 to cross the road can be generated. This step can preferably be performed by the data processing unit 40 and based on the results of step S2. In a final step S4, the crossing of the road according to the generated control commands in step S3 is performed.

In some embodiments, while crossing the road (in step S4) the method may repeat. That is, the method can be performed in a closed loop manner. More particularly, after step S4, step S1 can be executed again. This can be repeated 4 times per second while crossing the road. This can facilitate dealing with changing road crossing situations (e.g. a new moving object approaches). In such embodiments, during step S4 only one command of the mobile robot can be executed, i.e., there can be time to execute only one command. Put differently, step S4 can be performed only for a time interval at a time, such as, 0.1 to 1 second, such as 0.25 seconds, at a time.

That is, initial control commands may be generated when the robot approaches the road by performing steps S1-1, S2-1, S3-1 and S4-1 (note that the "1" after the minus sign indicates that it is the first time the routines of the method are executed). As instructed by the commands generated in step S3-1, the crossing of the road may initiate in step S4-1. While crossing the road (i.e. while performing step S4-1), the method may be executed again. Thus, a second execution of the method can be carried out according to steps S1-2, S2-2, S3-2 and S4-2. It will be noted that while step S4-1 may be in execution, steps S1-2, S2-2 and S3-2 may be executed in parallel to step S4-1. If new or different control commands are generated in step S3-2 as compared to the control commands generated in step S3-1, the crossing of the road may be readjusted. That is, step S4-1 may be stopped or interrupted and step S4-2 may be executed. In step S4-2 the crossing of the road can be performed based on commands generated in step S3-1 and S3-2. If there is contradiction, commands generated in step S3-1 that contradict the commands generated in step S3-2 may be disregarded. Again, while step S4-2 may be in execution, steps S1-3, S2-3, S3-3 and S4-3 can be executed in parallel to step S4-2. In other words, the method can be executed a plurality of times while crossing the road and the road crossing plan can be readjusted according to the latest commands.

In step S3, although control commands for a predetermined time in the future (e.g. 20 seconds) may be generated, they may not be fully executed. This is due to the fact that the method can be re-executed and the plan can change depending on the road crossing situation.

For example, in multiple lane roads it can be advantageous to perform the method before entering each lane. Hence, a crossing plan for each lane can be calculated. Alternatively, if the road comprises a median strip wherein the robot can stand, then the method can be calculated once at the beginning of the road crossing and another time at the median strip. Alternatively still, the method can be executed every time a new set of sensor data is acquired by the sensors of the robot 10. That is, the method can be executed according to the frequency that the sensor data are acquired such as every 0.01-1 seconds, preferably every 0.25 seconds.

In some embodiments, the method can be executed at the start of the road crossing. During the road crossing only step S1 can be repeated by default. The other steps (i.e. S2 and S3) can be repeated only if an object is detected in step S1 (i.e. object detector raises an alarm which can trigger the execution of steps S2 and S3). This can be advantageous, as processing resources can be used more efficiently (i.e. by not wasting them on needlessly re-performing steps S2 and S3) while at the same time providing safety (by reperforming step S1, e.g. periodically).

In the following, the steps of the road crossing method are discussed in more detail. It will be understood that the following details provide an exemplary way of carrying out the method.

In a first sub-step S1.1, sensor data related to the road crossing can be acquired. That is, at least one sensor 35 comprised by the mobile robot 10 can be utilized to acquire sensor data. As discussed with reference to FIGS. 1a and 1b, the at least one sensor 35 can comprise at least one camera, stereo-camera, laser-based sensor (e.g. time-of-flight (ToF) sensor, LIDAR), ultrasound sensor, radar or any combination thereof. Alternatively or additionally at least one sensor external to the mobile robot 10, such as, the radar box 50, can be utilized to acquire sensor data. The acquired sensor data may comprise visual data (e.g. visual images captured by a visual sensor such as a camera), depth data (e.g. depth images captured by a depth sensor such as a ToF sensor), object location and velocity data (e.g. radar data measured by a radar) or any combination thereof.

Additionally, further auxiliary sensor data can be acquired during the sub-step S1.1. More particularly, the mobile robot 10 can comprise an auxiliary sensor 37, such as, at least one GPS receiver 37, at least one odometer 37, at least one gyroscope 37, at least one inertial measurement unit 37, at least one proximity sensor 37, at least one accelerometer 37 or any combination thereof and the method and the method can comprise acquiring with the at least one auxiliary sensor 37 sensor data related to the road crossing. Sub-step S1.1 may comprise acquiring data facilitating an approximation of the pose of the robot (e.g. using a GPS sensor, extracting straight lines from images), measuring a speed, acceleration, steering, braking force or any combination thereof of the mobile robot 10, measuring a distance traveled by the mobile robot 10 (e.g. using an odometer), measuring a number of rotations of the wheels of the mobile robot 10 (e.g. using an odometer), measuring an orientation and angular velocity of the mobile robot 10 (e.g. using a gyroscope), measuring at least one distance between the mobile robot 10 and at least one object in the surrounding of the mobile robot 10 (e.g. using an ultrasound sensor), or any combination thereof. As it will be understood, the capturing of the auxiliary sensor data can be optional.

In a further sub-step S1.2, an object detection algorithm can be executed. That is, the acquired sensor data can be processed for detecting the presence of at least one object on the surroundings of the mobile robot 10, preferably on the road crossing. In this sub-step, traffic participants can be detected, such as, pedestrians, bicycles, vehicles and the like. Alternatively or additionally, occlusions such as, trees, walls, buildings, bins and the like can be detected.

The detection of traffic participants can be advantageous as in one hand it can facilitate sub-step S1.3 and on the other hand it can facilitate avoiding collision with them. The detection of occlusions can be advantageous for avoiding collision with them. Additionally, as some of the occlusions may obstruct the view of the road, it may be advantageous to determine whether occlusions obstructing the view of the road are present. Furthermore, elements of the road to be crossed can be detected, such as, road boundaries, zebra-lines, traffic signs, traffic lights, median strip, lanes and the like.

Different object detection algorithm can be used in sub-step S1.2, said object detection algorithms configured to detect a presence of an object, estimate a direction to an object, estimate a distance to an object, extract at least one feature of the object (e.g. size, color), classify the object (e.g. pedestrian, car, bus, tree, bicycle, wall, bin, building, etc.) or any combination thereof. Some objects detection algorithms that can be used with the present technology have been discussed with reference to FIGS. 1 and 2.

In a further sub-step S1.3 at least one dynamic object can be detected. In some embodiments, the detection of dynamic objects can be based on sensor data. That is, sensor data can be processed for detecting at least one dynamic object. In other words, sub-step S1.3 can directly follow sub-step S1.3. Hence, by processing sensor data, at last one dynamic (i.e. moving) object can be detected, such as, vehicles, pedestrians, bicycles and the like. It can be particularly advantageous, to detect dynamic objects moving on the road, such as, vehicles. Such embodiments wherein sensor data can be processed for detecting at least one dynamic object, are particularly advantageous when the sensor data or a portion of the sensor data is acquired by a radar sensor 35, 50. The radar measurements can be processed to directly detect dynamic objects (i.e. without going through sub-step S1.2).

However, in some embodiment, sub-step S1.3 can follow sub-step S1.2. That is, the detection of dynamic objects is performed in two phase manner, wherein first objects are detected in sub-step S1.2 and then those detected objects that are dynamic are detected in sub-step S1.3. An example of this can be the detection of dynamic objects on a plurality of images captured with a time delay (e.g. 0.25 seconds). In each image, step S1.2 can be performed for detecting objects therein. Then, in step S1.3 dynamic objects can be detected by determining if the same object appears on multiple images on different locations.

Thus, in step S1 at least the presence, position and direction of motion of at least one dynamic object can be estimated. For example, referring to the example illustrated in FIGS. 1a and 1b, in step S1 the presence of the car 20 can be detected. Furthermore, the location of the car 20 relative to the mobile robot 10 (or to the road) can be estimated. Furthermore, the direction of motion of the car 20 can be estimated. Further still, the speed of the car 20 can be estimated.

In some embodiments, step S1 can be performed entirely by the object detector 30. That is, the object detector 30 comprising at least one sensor 35 may carry out all the sub-steps of step S1. In such embodiments, the object detector 30 may further comprise a processing unit for facilitating the processing of sensor data (e.g. in sub-steps S1.2 and S1.3). Put simply, the object detector 30 may function as a stand-alone unit configured for detecting objects, preferably dynamic objects 20.

In some embodiments, the object detector 30 may utilize the data processing unit 40 for processing the sensor data (e.g. in sub-steps S1.2 and S1.3). That is, the object detector 30 can acquire sensor data and the data processing unit 40 can process sensor data for detecting objects, preferably dynamic objects 20.

In a further sub-step S2.1, the trajectories of the dynamic objects can be estimated (i.e. predicted). That is, the detection of dynamic objects during step S1, can be followed by the detection of the trajectories of the dynamic objects in sub-step S2.1. In some embodiments, the trajectory of a dynamic object can be predicted by initially estimating a velocity vector of the dynamic object (e.g. in step S1.3) and then extending the velocity vector to estimate the future trajectory of the dynamic object. In other words, the trajectory of the dynamic object can be predicted based on the direction of motion of the dynamic object. Alternatively or additionally, the trajectory of a dynamic object can be predicted by extrapolating at least two previous locations of the object. For example, if all previous locations lie in a straight line, it is likely that the object will continue to move in that straight line.

In a further sub-step S2.2, collision points can be predicted. The term collision point is used in this context and in general throughout the document to refer to the time and location of collision. That is, the collision point comprises a time and a location parameter. The location of a collision with a dynamic object can be predicted based on the intersection of the trajectory of the mobile robot 10 for crossing the road (e.g. a straight line) with a predicted trajectory of the dynamic object 20. If no such intersection exists, then a collision between the robot 10 and the dynamic object 20 is unlikely. The time of collision may consist of the time interval between the time instance that the front of the dynamic object 20 enters the location of collision and the time instance that the rear end of the dynamic object 20 leaves the location of collision. As such, the time of collision can be estimated based on the size and speed of the moving object. For better safety, the object may be considered to be larger than it actually is.

This can increase the time of collision window—thus ensuring that a safety distance is kept between the robot 10 and the dynamic object 20.

In a further sub-step S2.3, history data related to the road crossing can be acquired. The history data can be global in the sense that they generally refer to any road crossing. However, a portion (or all the history data) can also be tailored (i.e. correspond) to each road crossing. That is, the history data relate only to a corresponding road crossing. Alternatively, the history data can be tailored to geographical locations. For example, the history data may relate to the road crossing in a corresponding geographical location, such as, a country, city, campus, etc.

The history data can be stored in a memory device which can be external or internal to the mobile robot 10. Preferably, the history data can be stored in an external database (e.g. in a server), which can be accessed through a remote connection by the mobile robot 10, and particularly by the by data processing unit 40. The history data can be provided, upon request, to the mobile robot 10. For example, the history data can be downloaded to the mobile robot 10 upon request when the mobile robot 10 approaches a road crossing. Alternatively, and particularly if the route of the mobile robot 10 is priory planned, history data related to each of the road crossings can be downloaded prior to approaching the road crossing. This can result in a faster road crossing as the robot does not have to wait for the history data of a road crossing to be downloaded when approaching a road crossing.

The history data related to a road crossing can preferably comprise a passing car histogram of that road crossing. The passing car histogram can be generated by counting the number of cars that drive on the road. On the simplest case, the passing car histogram can comprise only a number, which indicates the number of cars that pass on the road over a period of time. In some embodiments, the passing car histogram can indicate the number of cars that pass on a road and their direction of driving. This is particularly advantageous for roads with opposite driving lanes. Thus, the passing car histogram can comprise two numbers, each indicating the number of cars passing on each direction of the road. In preferred embodiments, the road can be divided into multiple sections and the passing car histogram can indicate the number of cars passing one each section of the road. For example, the passing car histogram can indicate the number of cars passing on each lane of the road. An example of such a passing car histogram is depicted in FIG. 4c.

The passing car histogram can be generated, as discussed, by counting the number of cars that pass on the road. This can be based on previous mobile robot crossings on that road. That is, previous car detections on a road crossing can be stored and aggregated for each road crossing. The history data for a road crossing may not only be aggregated based on multiple crossings of the road by a single robot but can also be aggregated based on crossings of the road by multiple robots. In general, the more data is aggregated, the more correct the histogram can reflect the true frequency of passing cars on a road. In some embodiments, the number of cars passing on a road crossing can be counted using a traffic count.

The passing car histogram can be used to calculate a collision point distribution of the road crossing. The calculation of the collision point distribution can be based on the rationale that the higher the frequency of cars passing on a section (e.g. lane) of a road the higher the likelihood of a collision is on that section.

In a further sub-step S2.4, the collision points predicted in sub-step S2.2 can be corrected. A correction of the predicted collision points can be advantageous particularly to mitigate the prediction error due to noisy sensor data. As discussed, the prediction of collision points is based on the prediction of the trajectory of an object, which in turn is based on the detection of dynamic objects. Dynamic objects are detected from sensor data. Sensor data can be noisy, due to imperfections of the sensors and/or algorithms used to detect objects. As such, the estimation of the true location and/or trajectory and/or collision point of a dynamic object may comprise a certain error. Step S2.4 tends to make this error smaller. That is, the correction of collision points aims at lowering the estimation error of the true location and/or trajectory and/or collision point of a dynamic object.

In some embodiments, in sub-step S2.4 the correction of the collision points can be based on history data. More particularly, the correction of the collision points can be based on the passing car histogram and/or collision point distribution. In such embodiments, sub-step S2.4 can follow sub-step S2.3. The predicted collision point can be combined with history data, more particularly with passing car histogram, more particularly with a collision point distribution, related to that road crossing. In some embodiments, the collision point can be a weighted average of the predicted collision point in step S2.3 and the mean of the collision point distribution. The mean of the collision point distribution can be calculated from the passing car histogram and/or from the collision point distribution. It can indicate a section of the road wherein on average the likelihood of a collision is the highest. Thus, the collision point can be calculated as follows:

$$X = a * X_P + (1-a) * \overline{X},$$

wherein X denotes the corrected collision point, $X_P$ denotes the predicted collision point in sub-step S2.2, $\overline{X}$ denotes the mean of the collision point distribution and a denotes the weighting constant. The weighting constant can be tuned to give more weight to the predicted collision point or to the mean of the collision point distribution. For example, when the sensor data are noisy (e.g. due to occlusion of the view toward the road crossing, poor performance of sensors, fog, rain etc.) it may be more advantageous to set the weighting constant smaller than 0.5 (i.e. give more weight to history data). Alternatively, if the history data is not rich (i.e. the number of samples used to generate the histogram is small) it can be advantageous to set the weighting constant bigger than 0.5 (i.e. give more weight to current prediction). In general, different tuning algorithms can be used to set the value of the weighting constant. In some embodiments, an optimal (or nearly optimal) weighting constant can be learned through machine learning algorithms based on previous data. In some embodiments, the value of the weighting constant can be 0.5 (i.e. equal weights).

In a further sub-step S2.5, a time-to-collision (TTC) map can be generated based on the estimated collision times and locations. The TTC map can indicate for different sections of the road the time of collision. As such, the TTC map can comprise a time axis and a distance axis. The distance axis can extend across the road. The time axis can extend into a predefined horizon (e.g. 20 s into the future) and can be dynamically extended as time passes. The granularity of the time axis can be between 0.01 to 1 second, preferably between 0.25 to 0.75, such as, 0.5 seconds. The granularity of the distance axis can be between 0.1 to 3 meters, preferably between 0.5 to 2 meters, such as, 1 meter. The granularity of the distance axis can also be different for different roads. For example, wider roads may be less granular than narrow roads. In some embodiments, the smallest unit of the distance axis may correspond to the width of a lane of the road.

As it will be understood, fine-grained time and distance axis can generally provide more detailed information and can result in a more efficient and safer road crossing. However, the generation of TTC map with fine-grained time and distance axis may require more computational resources and accurate collision point predictions. In general, the granularity of the axes of the TTC map can be constrained by the error in estimating the collision point. For example, if the error of estimating the collision point is 1 meter, then it may not be very advantageous to set the distance axis unit at 0.1 meters. Generally, the granularity of the time and distance axis of the TTC map can correspond to the error of predicting the collision points (e.g. being at the same magnitude).

Each predicted/corrected collision point can be mapped (i.e. plotted) on the TTC map. That is, the TTC map spans a 2-dimensional space with time and distance as dimensions. The 2-dimensional space can be dived by a grid corresponding to the granularity of the time and distance axis. Each block in this grid (also referred to as a TTC cell) comprises a unique time-distance coordinate. Thus, based on the predicted/corrected collision time and location, one or more blocks in the TTC map can be labeled by a collision indicating label. The collision indicating label can be a binary parameter (i.e. collision/no collision) or a more granular parameter, such as, a decimal number between 0 and 1 indicating the likelihood of a collision at that block (i.e. at a particular time and distance).

The predicted/corrected collision point can typically be represented by a range in space and time. For example, for a vehicle with a width of 3 meters the collision point can have a width of at least 3 meters. If the center of vehicle is 2 meters from the start of the road crossing, the calculated collision location would be the range between 0.5 meters to 3.5 meters. Further, if the vehicle length is 5 meters and it is driving at a speed of 10 meter/s, the vehicle will occupy a space with a width of 1 meter (exemplary width of the robot 10) for 0.6 seconds. If the vehicle reaches the collision point after 2 seconds, the estimated time of collision can be the interval between 2 to 2.6 seconds. Thus, in the TTC map the space between 0.5-3.5 meters and 2 to 2.6 seconds will be labeled to indicate a collision.

Steps S1 and S2 are further illustrated in FIGS. 4*a* to 4*e*. Before continuing with the rest of the steps of the road crossing method, steps S1 and S2 (and their sub-steps) will be discussed in further detail with respect to the illustrations provided in FIGS. 4*a* to 4*e*.

FIG. 4*a* illustrates a road crossing map 400, which can also be referred to as a road crossing situation map, bird's eye view of a road crossing or bird's eye occupancy map. The road crossing map 400 can be generated based on the output of the object detector 30 and/or radar box 50. The road crossing map 400 can be generated as a result of step S1. That is, the road crossing map 400 can be generated during (or at the end) of step S1. The road crossing map 400 can comprise data indicating the pose of the mobile robot 10 and the location of the at least one dynamic object 20 relative to the pose of the mobile robot 10. In addition, the road crossing map 400 may comprise data indicating the velocity (or speed) of at least one dynamic object. Additionally still, the road crossing map 400 may comprise data that relate to different times (i.e. data extracted from sensor data acquired at different times). That is, the road crossing map 400 may comprise data estimated at different times (e.g. at two different times with a delay of 0.25 seconds), said data relating to the pose of the robot, pose of the detected objects, velocity of the detected objects, direction of motion of the detected objects, direction of motion of the robot 10 or any combination thereof.

For example, in FIG. 4*a* a road crossing map 400 is visually illustrated. The pose of the mobile robot 10 is represented by the polygon 10. The polygon 10 can, for example, be a bounding box of the robot 10. That is, the polygon may comprise dimensions corresponding to the dimensions of the robot 10. More particularly, the dimension of the polygon 10 may be similar, equal or slightly bigger to/than those of the robot 10. It will be noted that the polygon 10 may also be a scaled version of the real dimensions of the robot 10. In some embodiments, the robot 10 may be represented by circles or other shapes or by models that are approximately the same to the shape of the robot. In some embodiments, the robot 10 may also be modeled on the road crossing map 400 by a point.

Further, the road crossing map 400 in FIG. 4 depicts a plurality of detected objects 20. The objects 20 (followed by a character to differentiate among different objects) are represented by a circle and a segment extending from the circle. The circle indicates the location of the object 20 relative to the robot 10 and the segment extending from the circle indicates the velocity of the object. Alternatively, in some embodiments, the segment extending from the circle may also indicate simply the direction of motion of the object 20. The direction of motion (and/or the velocity) of an object 20 can be estimated either after at least two consecutive detections of the same object or using a radar sensor 35.

The road crossing map 400 illustrated in FIG. 4*a*, depicts data relating to two different time instances. More particularly, the road crossing map 400 depicts a first set of data extracted from a first set of sensor data captured at a first time instances and a second set of data extracted from a second set of sensor data captured at a second time instance, wherein the first and the second time instances comprise a time difference of at least 0.01 and at most 1 second, such as 0.25 seconds. The different sets of data comprised in the road crossing map 400 can be labeled with their corresponding timestamp. This labeling is illustrated in FIG. 4*a*, by the color of the circles depicting the detected objects 20. Filled circles 20 depict detections from sensor data acquired at a later time, while empty circles 20' shows detection from sensor data acquired at an earlier time. If a third set of sensor data is acquired at a third time instance, a third set of data can be added to the road crossing map 400 and can be labeled with the corresponding timestamp. In general, the road crossing map may comprise object detections relating to different time instances.

In the example of FIG. 4a, objects 20A', 20B', 20C' and 20D' were detected at an earlier time. They were also detected at a later time as indicated by the circles 20A, 20B, 20C and 20D. Additionally, at the later time a further object 20F is detected.

Additionally, the road crossing map 400 may show the boundaries of the road. As shown in FIG. 4a, the road crossing map 400 comprises data related to a boundary 415 of the road. Additionally, the road crossing map 400 may comprise data related to the other boundaries of a road.

Figure 4B:
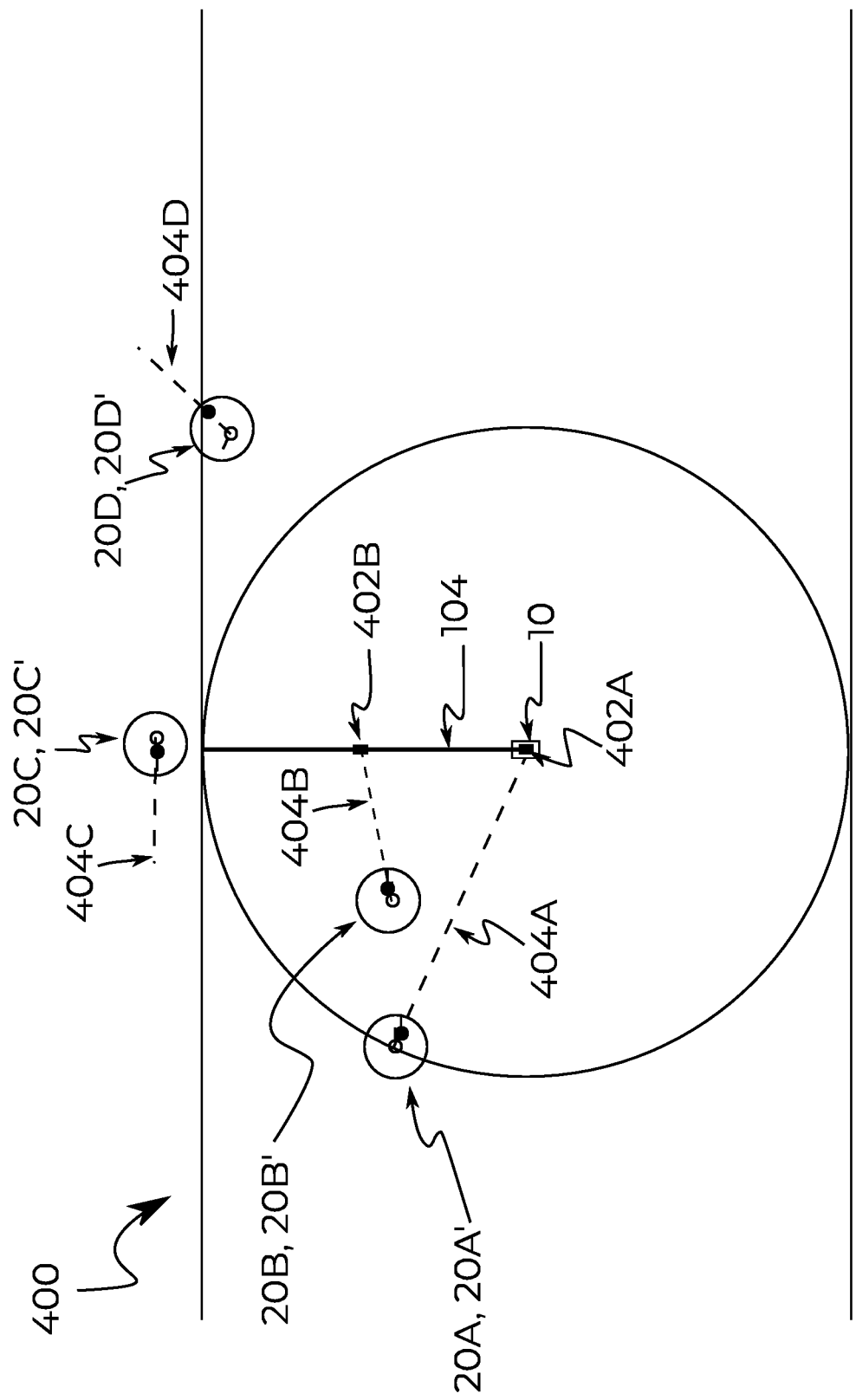
FIG. 4b illustrates a prediction of the trajectories of detected dynamic objects and of the collision points between the robot and the detected dynamic objects.
Figure 4C:
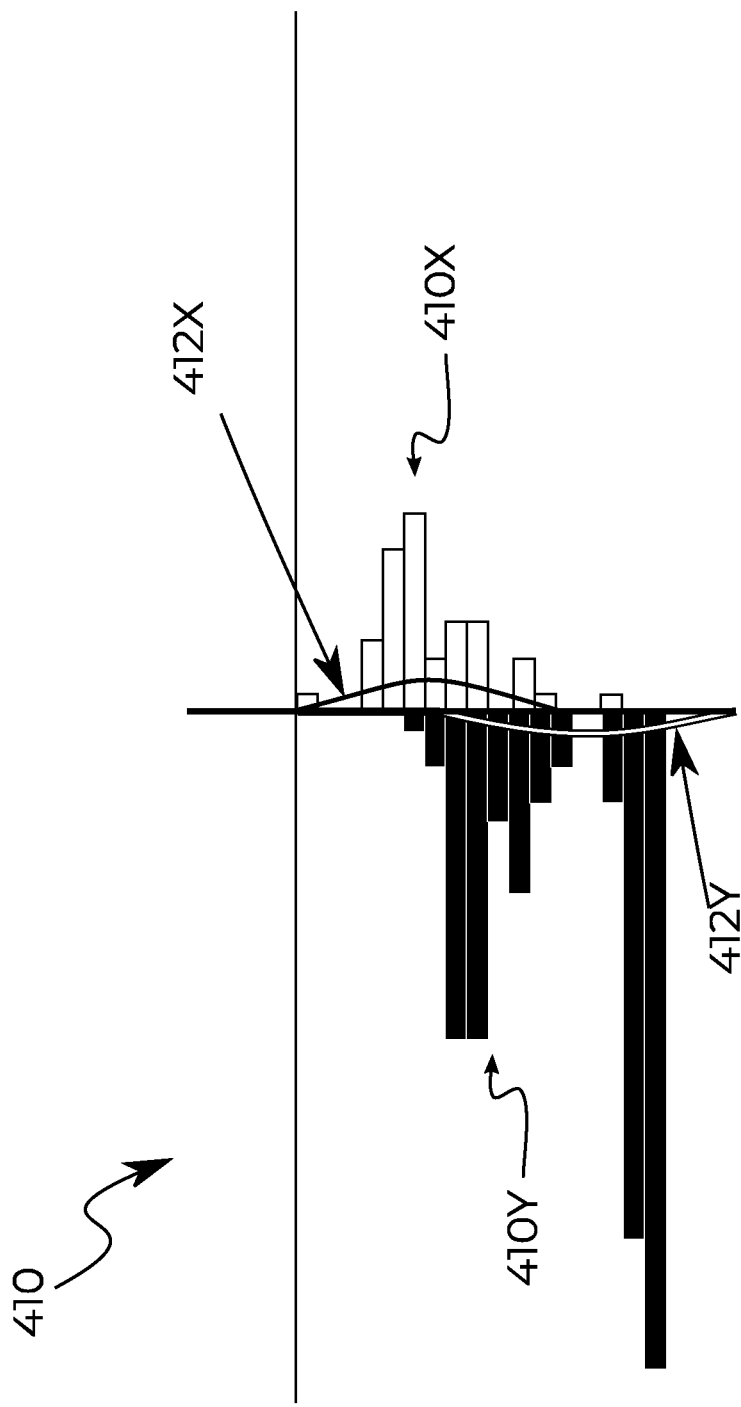
FIG. 4c illustrates a passing car histogram related to a road crossing.

FIG. 4b illustrates the predictions of the trajectory of the detected objects 20, as well as the predictions of the collision points. Note that in FIG. 4b, the referrals are depicted in a compact form, not to overload the figure.

FIG. 4b shows the same scenario as FIG. 4a. For each dynamic object 20 (i.e. for each object 20 detected on multiple sensor data sets) the trajectory is predicted (i.e. step S2.1). The predicted trajectories are indicated by the dashed lines 404. The trajectories 404 for each object can be estimated by extending the velocity vector of each object. The velocity vector can be measured when an object is detected on at least two different data sets. Additionally or alternatively, the velocity vector can be measured using a radar sensor. The trajectories 404 for each object can, additionally or alternatively, be estimated by extrapolating at least two detected locations of the same object. For example, a linear extrapolation can be used.

As shown in FIG. 4b, the trajectories 404 of each object can be estimated based on the data comprised by the road crossing map 400. Further, the data indicating the trajectories of each object can be added to the road crossing map 400.

Further, FIG. 4b indicates the estimated (i.e. predicted) collision points 402. As discussed, the collision points can be estimated by finding the intersections between the trajectories of the detected objects and the trajectory of the robot 10. The trajectory of the robot can be a straight line 104 across the road. However, the trajectory of the robot 10 may also be a curved line. In the example shown in FIG. 4b, only the trajectories 404A and 404B belonging to objects 20A and 20B intersect with the trajectory 104 of the robot 10. Thus, two collision points are identified, 402A and 402B.

As shown in FIG. 4b, the collision points 402 can be estimated based on the data comprised by the road crossing map 400. Further, the data indicating the predicted collision points can be added to the road crossing map 400.

The estimated trajectories 404 and collision points 402 can be a result of steps S2.1 and S2.2 shown in FIG. 3.

As discussed above, the estimated collision points can be corrected using history data. FIG. 4c shows an example of history data. More precisely, FIG. 4c shows a passing car histogram 410. The horizontal axis of the passing car histogram 410 (i.e. the length of the bars of the histogram) indicates the number (or frequency) of traffic participants (e.g. vehicles, cars, bicycles). The vertical axis of the passing car histogram depicts the position across the road. The filled bars 410Y relate to cars moving according to a first direction, while the empty bars 410X relate to cars moving according to an opposite direction compared to the first direction.

Based on each histogram 410X, 410Y a matching distribution 412 can be calculated. Thus, for the histogram 410Y for the first direction the matching distribution 412Y can be calculated, while for the histogram 410X of the opposite direction the matching distribution 412X can be calculated. The matching distribution 412 of a passing car histogram 410 can be calculated such that they comprise similar statistical parameters, such as, mean and variance. For example, the passing car histograms can be matched with a Gaussian distribution with a similar (or identical) mean and variance.

In some embodiments, the matching distribution 412 can represent a collision point distribution 412.

Figure 4D:
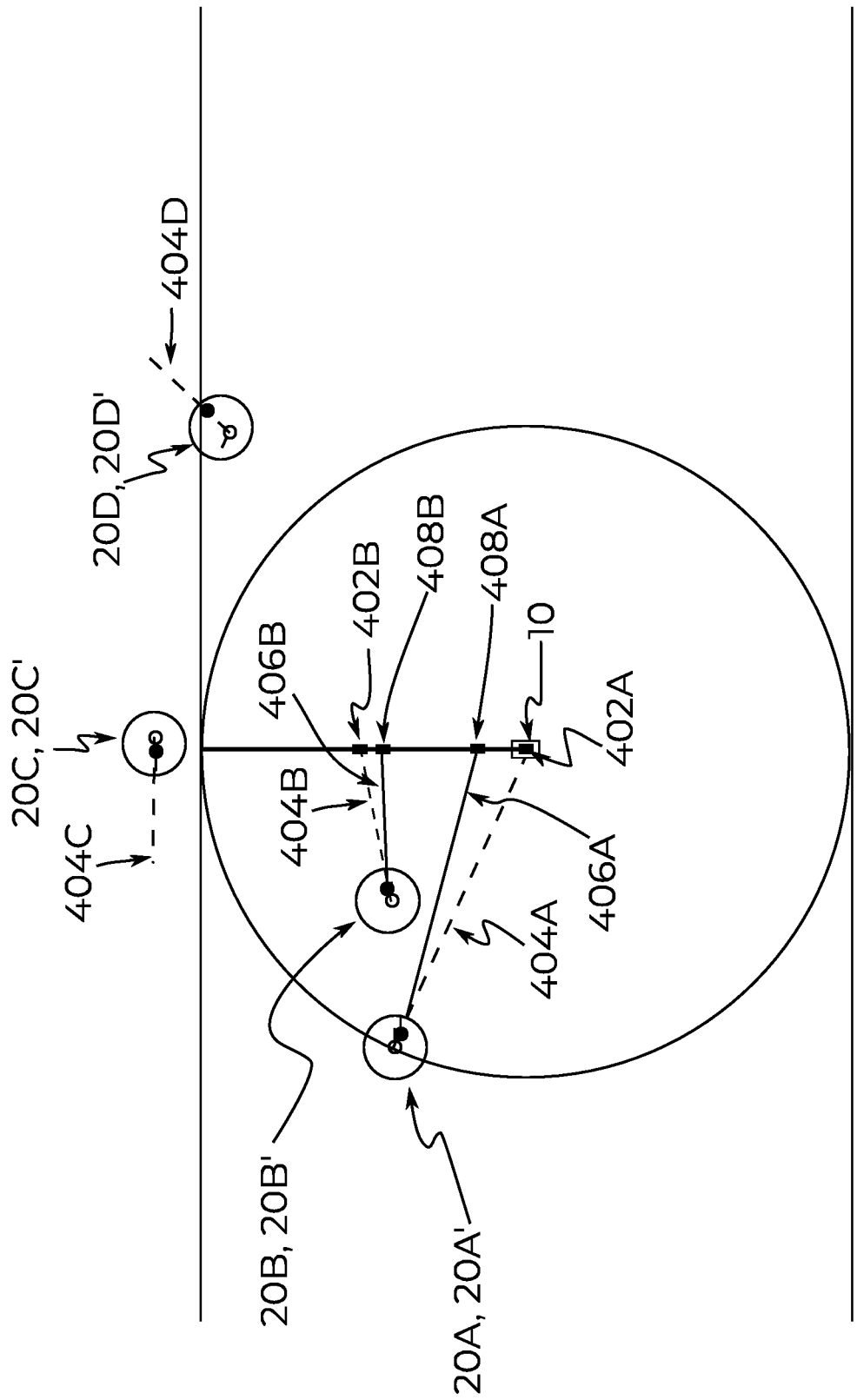
FIG. 4d illustrates a correction of the collision points based on a passing car histogram.

FIG. 4d illustrates the correction of collision points that can be performed in step S2.4. The correction of the collision points can be performed only for those objects 20 which trajectory intersects with the trajectory of the robot 10. In the given example, only the trajectories 404A and 404B of objects 20A and 20B are intersect with the trajectory of the robot. Thus, for the object 20A the new collision point 408A is estimated by combining the predicted collision point 402A and the passing car histogram 410 shown in FIG. 4c. Similarly, for the object 20B the new collision point 408A is estimated by combining the predicted collision point 402B and the passing car histogram 410 shown in FIG. 4c. New trajectories 406 can be recalculated based on the newly estimated collision points 408.

Figure 4E:
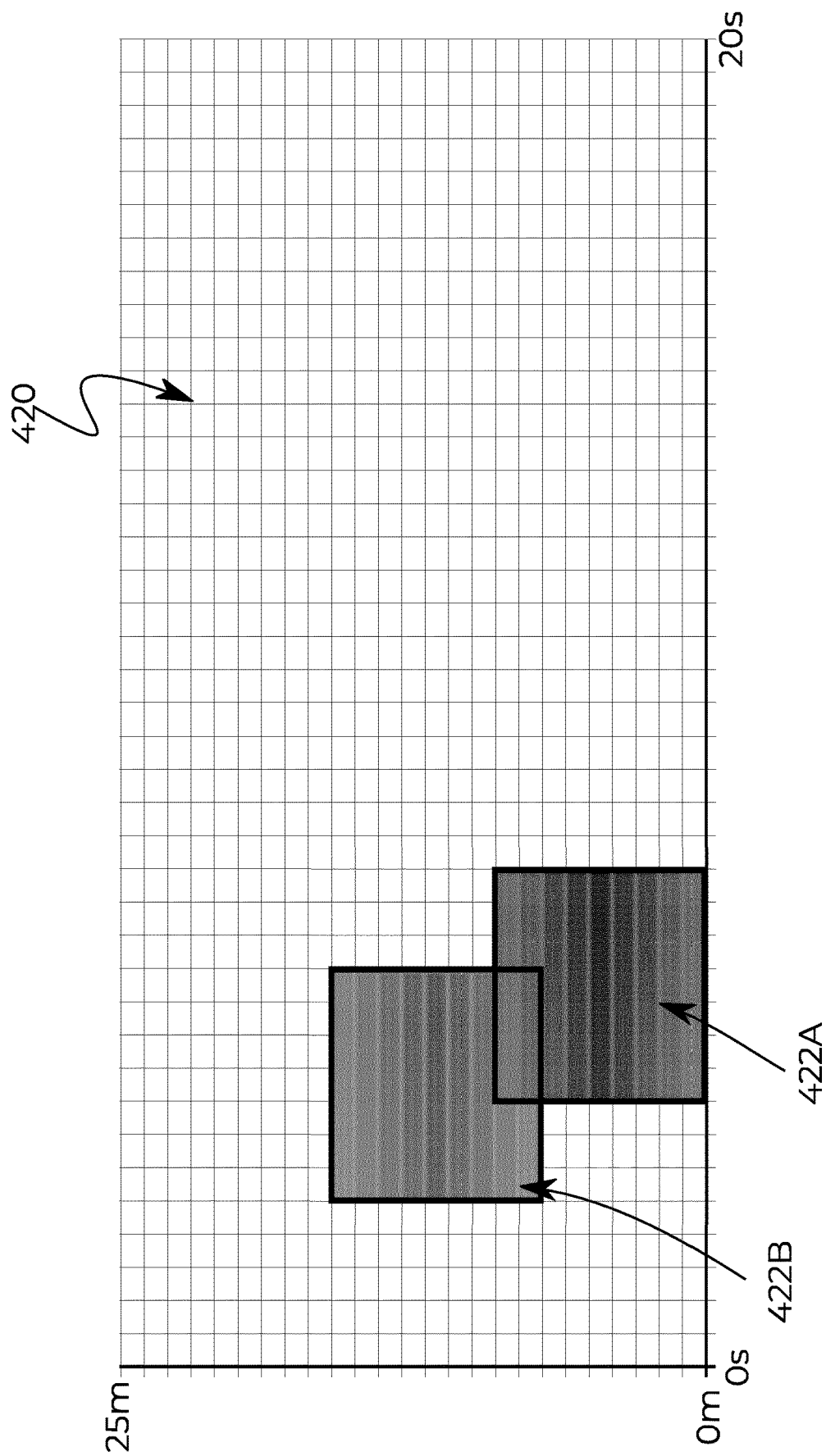
FIG. 4e illustrates a time to collision (TTC) map generated based on estimations of time and location of collision.

FIG. 4e depicts the TTC map 420 calculated for the scenario depicted in FIGS. 4a to 4d. As shown, the TTC map comprises a time axis (i.e. the horizontal axis) and a distance axis (i.e. the vertical axis). It will be understood that the time axis can be the vertical axis and the distance axis can be horizontal axis. In the provided example, the distance axis extends along a distance of 25 meters from the mobile robot's pose (which is at zero meters). The time axis extends over 20 seconds from the current time of the mobile robot (which is at zero seconds). It will be understood that the provided values are only exemplary.

The two estimated collisions are plotted in the TTC map 420 as indicated by the collision zones 422A and 422B, corresponding respectively to collisions with objects 20A and 20B. In the example of FIG. 4e, the collision zones 422 in the TTC map 420 depict the likelihood of a collision across the collision zone 422. In FIG. 4e, this is visualized through color coding with darker colors indicating a higher likelihood of collision compared to lighter colors. In general, the collision zones 422 can be represented by a matrix, each element in the matrix being a number within a range (e.g. a decimal number between 0 and 1).

Figure 4F:
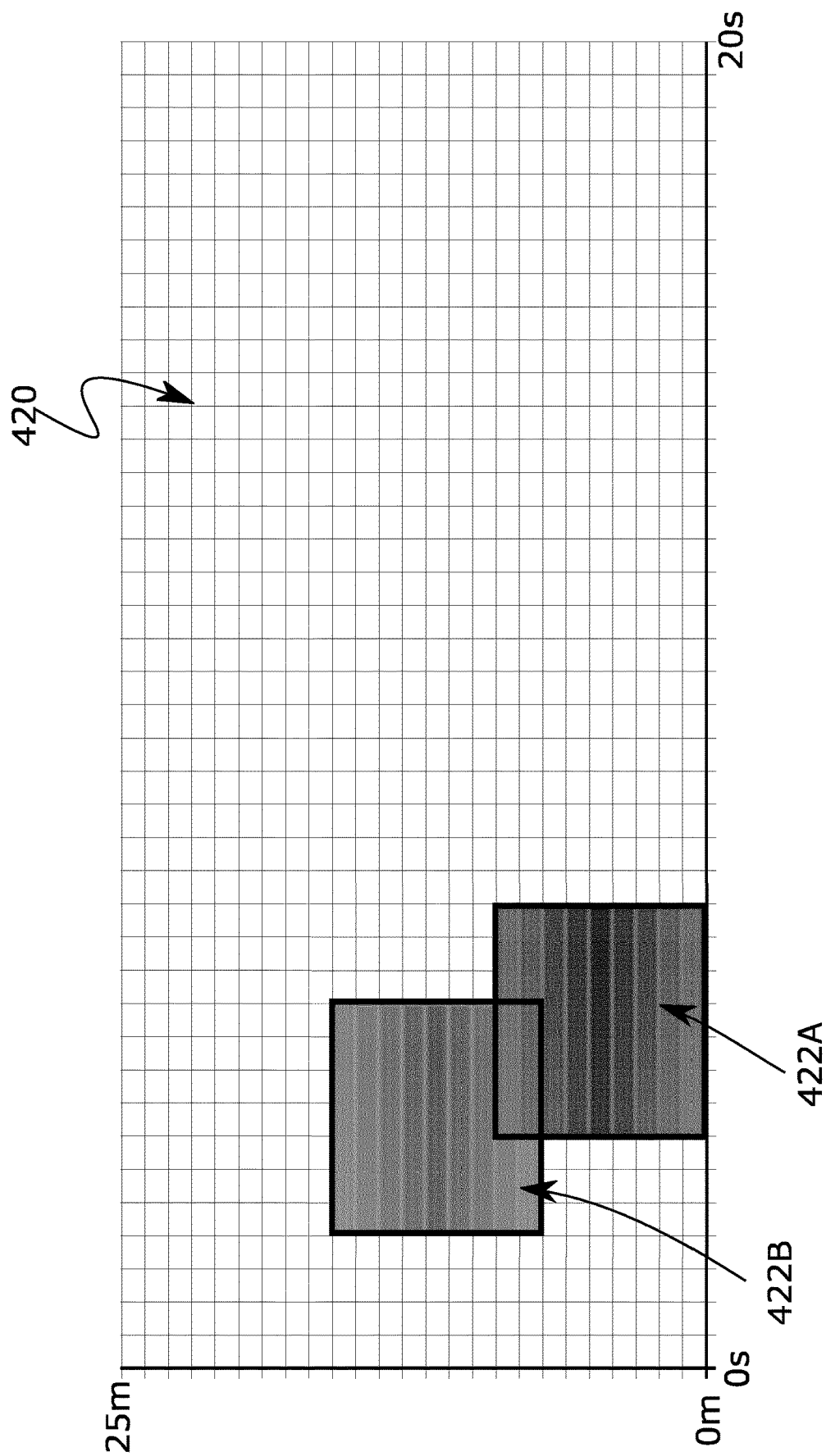
FIG. 4f illustrates the TTC map of FIG. 4e at a time instance after the time instance of the TTC map illustrated in FIG. 4e.

FIG. 4f, depicts the TTC map of FIG. 4e in a future time step following the time depicted by the TTC map of FIG. 4e. As depicted, as time progresses the TTC map is updated by shifting all the values of the TTC to the left (i.e. according to the direction of the horizontal axis, towards the origin). As such, the origin of the TTC map is always maintained at time zero (i.e. current time of the robot). On the other hand, at each time step the position of the collision zones 422 on the distance axis can be adjusted accordingly.

Referring back to the road crossing method depicted in FIG. 3, the method can proceed with step S3, wherein control commands for the robot 10 to cross the road are generated. More particularly, using the estimated collision times and locations (which can be indicated on a TTC map, e.g. see FIG. 4e) control commands that realize a safe and efficient road crossing for the mobile robot are determined. The control commands may comprise an acceleration function with respect to time or distance, a braking function with respect to time or distance, a speed function with respect to time or distance, a direction of motion function with respect to time or distance, a time to start crossing the road, a time to contact the operator or any combination thereof.

In other words, during the generation of the control commands to realize a safe and preferably efficient and autonomous road crossing, multiple robot behaviors can be considered. A first set of the robot behaviors may relate to basic commands of the robot, that typically relates to motion of the robot for advancing on the road crossing, such as, acceleration, speed, braking, steering, etc. In addition, more complex robot behaviors can also be considered. Such robot behaviors may, for example, comprise the robot quickly reversing (i.e. jump back) to avoid a collision. The jump back command can be a last resource for avoiding collisions. The jump back maneuver for increasing safety during a road crossing is disclosed in the US patent application US 2019/0244525 A1 "Mobile robot having collision avoidance system for crossing a road from a pedestrian pathway" discloses a collision avoidance method and system for a mobile robot crossing a road.

The control commands considered in step S3 may further comprise the mobile robot abandoning autonomous operation. This can be further followed by the mobile robot requesting assistance from a human operator for crossing the road. Such a command is particularly advantageous when it is evaluated that the road crossing is associated with a high risk of collision (e.g. a road with a high and fast traffic). In step S3 it can also be determined to abandon autonomous operation and to request assistance from a human operator if the sensor data are noisy (e.g. due to low visibility).

In addition, other behaviors which the robot is capable of can be considered while generating control commands for the mobile robot.

For example, in the exemplary TTC map illustrated in FIG. 4e, a control command that can be generated in step S3 can be robot reversing or jumping back, to avoid the collision zone 422A with a high risk of collision (from the prediction illustrated in FIG. 4b it seems that the object 20A is driving toward the robot 10). This is illustrated in FIGS. 5c and 5d.

In some particular embodiments, step S3 can be performed through steps S3.1 and S3.2 depicted in FIG. 3.

In a step S3.1 an efficient road crossing plan is calculated based on the TTC map generated in step S2.5. Finding a road crossing plan in the TTC map translates into finding a route which avoids the collision zones 422, starts at the origin of the TTC map and ends at the end of the road. For example, the Dijkstra algorithm can be utilized for calculating the road crossing plan.

In a step S3.2, the road crossing plan is translated into robot commands.

FIGS. 5a and 5b illustrates with an example steps S3.1 and S3.2. FIG. 5a shows a TTC map 420 with one collision zone 422. The origin of the TTC map 420 indicates the pose of the robot 10 and "current" time. The end of the road crossing is indicated by the horizontal line 415. The hatched squares 430 indicate a calculated road crossing plan for reaching the end of the road crossing 415 and avoiding the collision zone 422. According to the road crossing plan 430, the robot shall initially wait for the dynamic object to pass and then start crossing the road with constant velocity. FIG. 5b, illustrates a velocity function with respect to time calculated from the road crossing plan.

FIGS. 5c and 5d illustrate a safe rad crossing plan 430 calculated for the scenario discussed with respect to FIGS. 4a to 4e. In the example scenario dynamic object 20A is estimated to be on a collision course with the mobile robot 10. Thus, in step S3 a control command that can be calculated can be the mobile robot moving in reverse or jump back to avoid collision. Thus, as also shown by the calculated velocity function in FIG. 5d, the robot 10 initially moves in reverse, stops waits for the objects 20A and 20B to pass the road and then initiates forward movement for crossing the road.

Note that another road crossing plan may be for the robot to immediately start crossing the road fast, before the vehicles 20B arrives. However, this may not be feasible, e.g., the required speed/acceleration to realize the crossing according to said plan may exceed maximum speed/acceleration the robot 10 is capable. Additionally, the said plan of quickly crossing the road before the vehicle 20B arrives may be riskier.

As it can be noticed, efficiency (which can be measured by the time required to cross the road) can be sacrificed to guarantee safety. The most efficient plan would be one wherein the robot does not wait but crosses directly. However, this may result in a collision as such a plan does not avoid the collision zone 422. In general, the road crossing plan 430 is calculated such that safety is maximized (or even guaranteed, at least in terms of the detected objects). At the same time, within the safety maximization restriction, the efficiency should be maximized (e.g. by minimizing the time required to perform the crossing).

In some embodiments, an architecture of three neural network can be configured for carrying out steps S1, S2 and S3. That is, a first neural network can be configured for detecting dynamic object from sensor data in step S1. A second neural network can be configured for predicting time and location of collision with the detected objects in step S2. The second neural network can make use of the dynamic object detections made by the first neural network. A third neural network, which can use reinforcement learning, can be configured to generate control commands for the mobile robot to cross the road in step S3. The third neural network can make use of the estimated collision points by the second neural network.

The first the second and the third neural network may run on respective processing unit. Such processing units may be artificial intelligence processing units (typically referred as tensor processing units or tensor cores). This may result in the completion of steps S1, S2 and S3 in a timely efficient manner—as the artificial intelligence processing units are particularly efficient in carrying out algorithms based on neural network.

Alternatively, the first the second and the third neural network may run on the data processing unit 40 (see FIGS. 1a and 1b). In some particular embodiments, the data processing unit 40 may comprise one or more cores reserved for carrying out steps S1, S2 and S3. In some further particular embodiments, the data processing unit 40 may comprise tensor cores which can efficiently run the first the second and the third neural network.

In some embodiments, steps S1, S2 and S3 can be carried out by respective submodules of one neural network.

Figure 5:
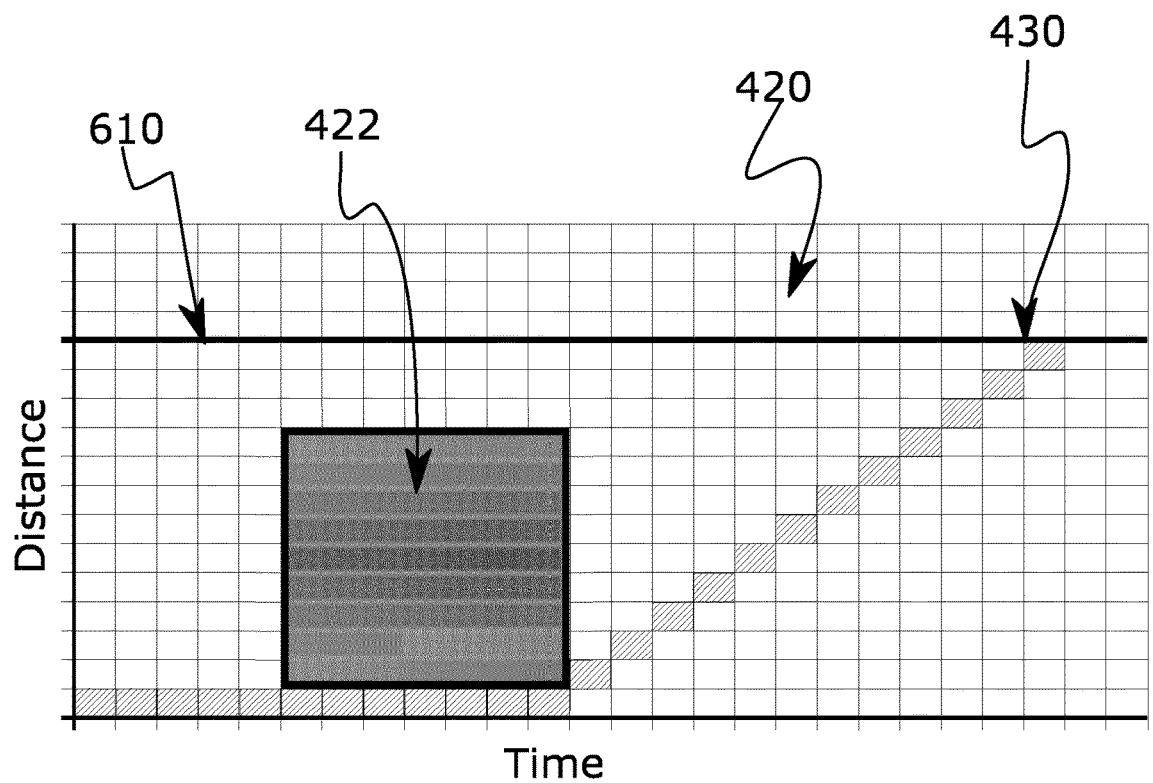
Figure 5:
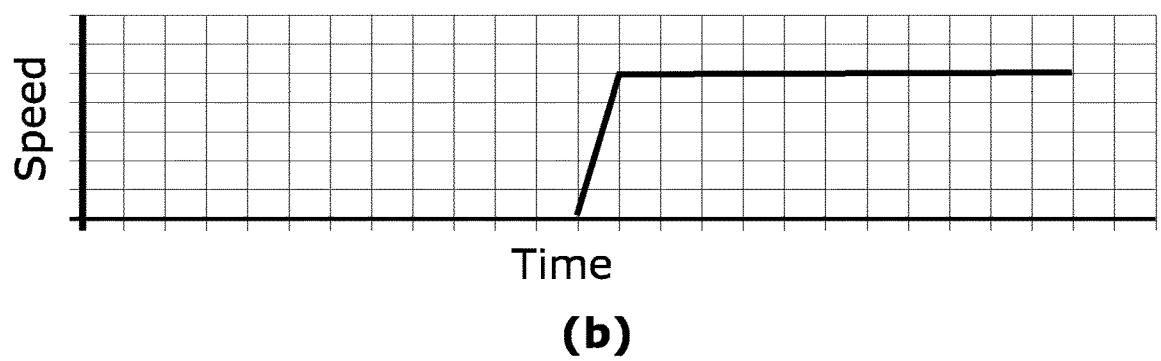
Figure 5:
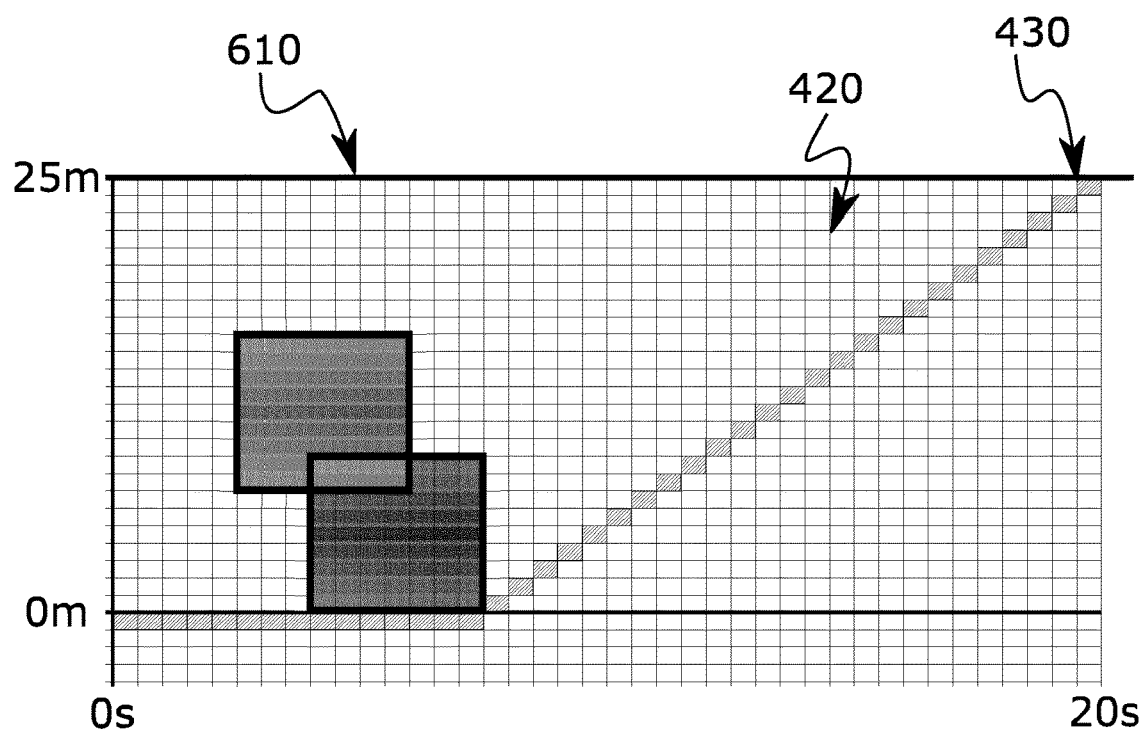
Figure 5:
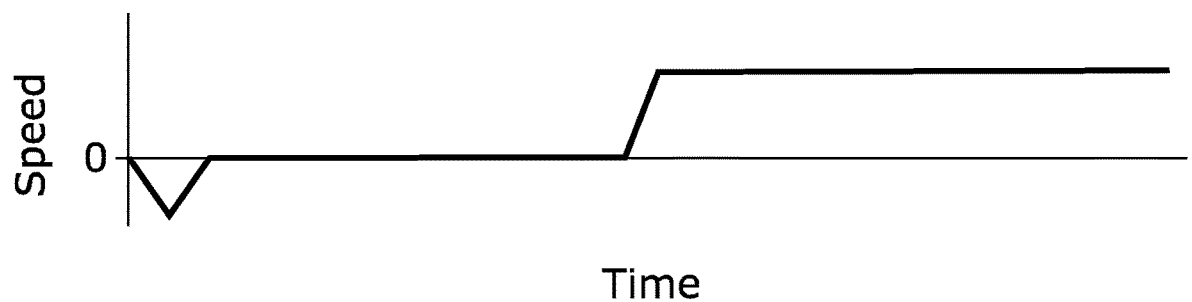

With respect to FIGS. 3 to 5, an advantageous method for performing a safe and efficient road crossing by a mobile robot has been discussed. In preferred embodiments, the road crossing method can be a computer implemented method. Furthermore, the road crossing method can be carried out by one or more processing units. The method can be carried out by the data processing unit 40, which can be internal to the mobile robot 10 (see FIG. 1a) or external to the mobile robot 10, e.g. a server 40 (see FIG. 1b). Preferably, the method can be carried out by a data processing unit 40 that is internal to the mobile robot 10, as shown in FIG. 1a.

In some embodiments, the steps of the road crossing method can be carried out by different processing units. That is, the method can be executed in a distributed manner. For example, in some embodiments, the object detection step S1 can be carried out by a processing unit internal to the object detector 30. That is, the object detector 30 can be configured as a stand-alone module configured to sense the surroundings of the mobile robot 10 and output object detections (e.g. location, type of object, state of motion, velocity, speed, direction of motion or any combination thereof). Furthermore, steps S2 and S3 of the method can be carried out by the data processing unit 40. The data processing unit 40 can be a module configured for calculating efficient and safe road crossing plans. Thus, the data processing unit 40 can make use of the output of the object detector module 30 to generate robot control commands for safely and efficiently crossing a road.

In some embodiments, the data processing unit 40 can a central processing unit of the mobile robot 10. The data processing unit 40 can receive data from peripheral devices of the robot (e.g. object detector 30, sensors 35, auxiliary sensors 37, communication components of the robot (not shown) or any combination thereof) and can be configured to process the received data to facilitate an autonomous operation of the robot 10, such as, an efficient, safe and autonomous road crossing.

Figure 6:
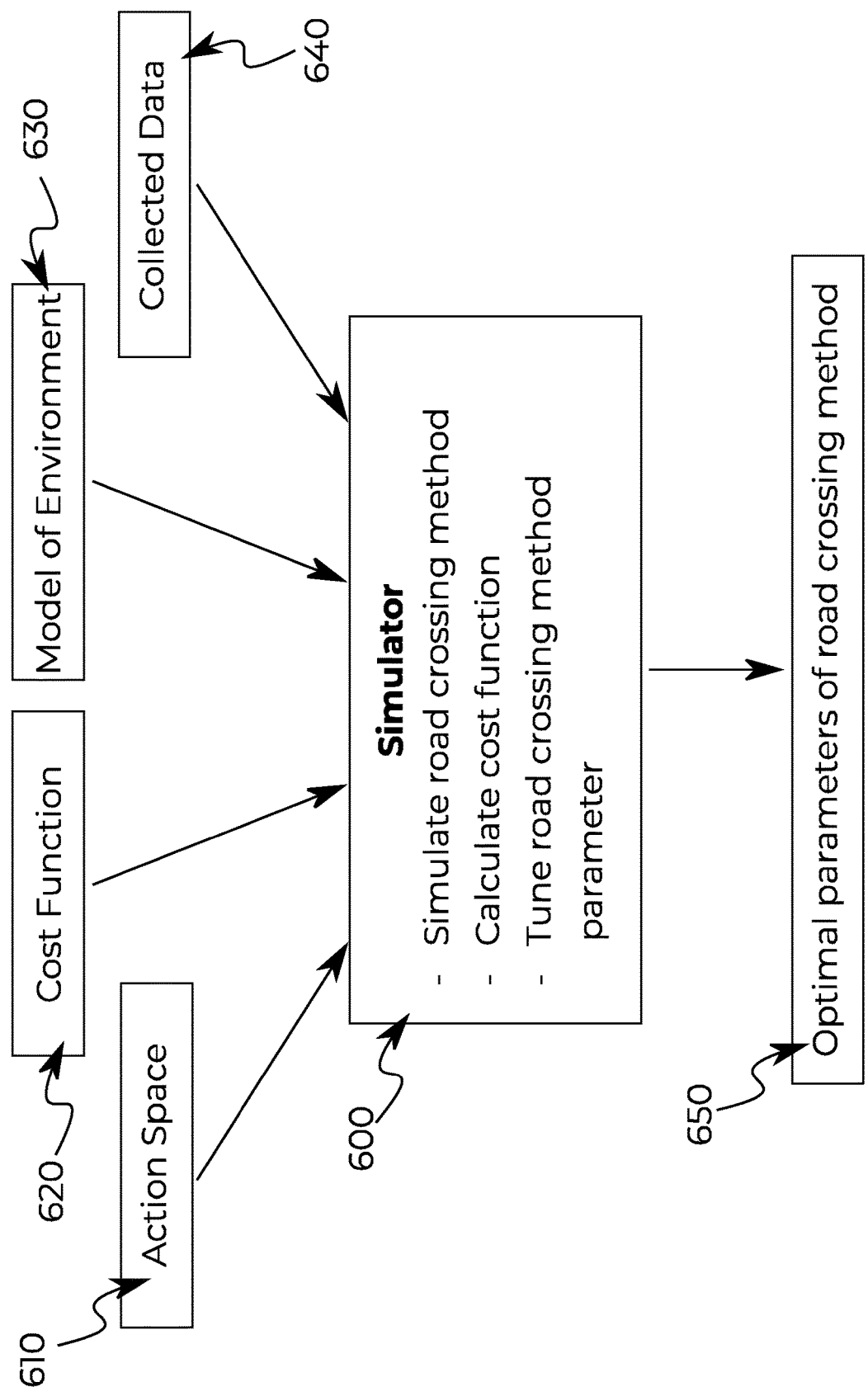
FIG. 6 depicts a simulation-based method for optimizing a road crossing method according to an aspect of the present technology.

FIG. 6 illustrates a simulation-based method for optimizing the road crossing method. That is, the calculation of a road crossing plan involves several trade-offs. In one hand, the road crossing should be performed safely. That is, the risk of a collision shall be minimized and preferably reduced to zero. On the other hand, the road crossing should also be efficient. Efficiency of the road crossing may depend on the time required to cross the road, the energy used for crossing the road, the energy/time wasted while waiting to cross the road and the like. As it will be understood, a high efficiency is achieved if the time and/or energy required to cross the road is minimized. Furthermore, efficiency can also depend on whether the road crossing is performed autonomously or through operator assistance. An autonomous crossing is typically more efficient than a crossing performed with operator assistance.

Figure 7:
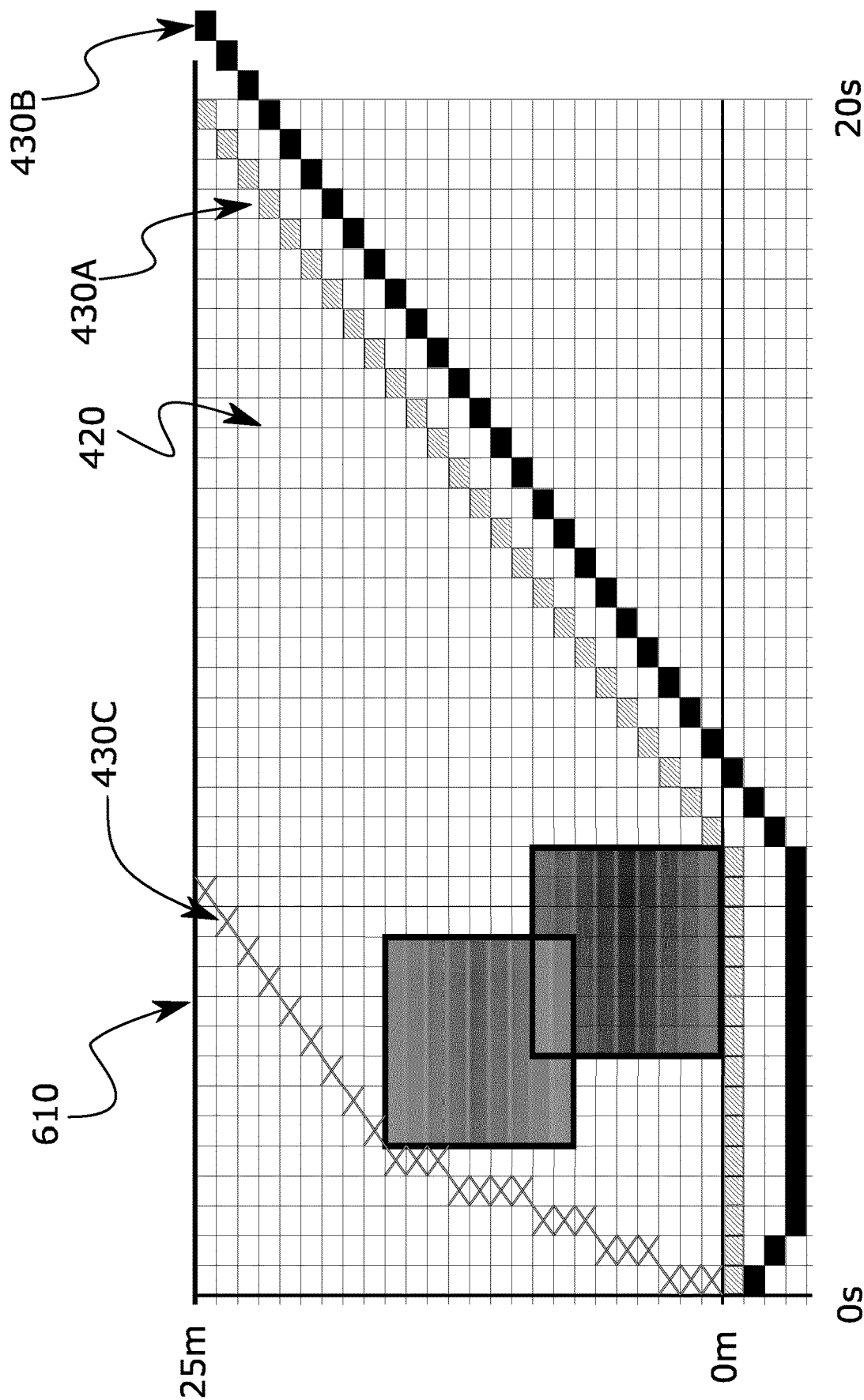
FIG. 7 illustrates different road crossing plans for the same TTC map.

To illustrate such tradeoffs, we refer to FIG. 7, wherein the different crossing plans 430 for the TTC map of FIG. 4e are illustrated. A first crossing plan 430A (also shown in FIG. 5a) involves the robot moving backwards, waiting for the moving objects to pass and then starting to cross the road. A second crossing plan 430B involves the robot moving backwards a larger distance then the crossing plan 430A, waiting for the moving objects to pass and then starting to cross the road. A third crossing plan 430C involves the robot starting to cross the road immediately. More particularly, the robot 10 according to the crossing plan 430C jumps forward to avoid the moving objects and then starts crossing the road at lower speed.

As it will be understood, the second crossing plan 430B is the safest of all the plans, but at the same time it is the least efficient as it takes the longest time to cross the road. On the other hand, the third plan 430C is the most efficient plan however it involves a greater risk. The first crossing plan 430A may be a good trade-off between safety and efficiency.

Depending on how the road crossing method is tuned, different road crossing plans can be calculated by the method. For example, a road crossing method configured to maximize efficiency may generate the third road crossing plan 430C for the exemplary scenario. On the other hand, a road crossing method configured to maximize safety may generate the second road crossing plan 430B. A tuned road crossing method configured to calculate road crossing methods with advantageous trade-offs between safety and efficiency may calculate the road crossing plan 430A.

Furthermore, as illustrated from FIG. 7, it can be possible to increase efficiency and safety at the same time. For example, the second road crossing plan 430B though it is safe, it wastes time resources. However, the first road crossing plan ensures safety and at the same time is more efficient. Thus, it can be advantageous to configure the road crossing method to calculate road crossing plans with advantageous trade-off between safety and efficiency. A simulation-based method for doing this is illustrated in FIG. 6.

FIG. 6 illustrates a simulator 600 configured to simulate road crossings for tuning a road crossing method. For this, the simulator can receive an action space 610, a cost function 620, a model of an environment 630 and collected data 640 and can output optimal parameters of a road crossing method.

The action space 610 may comprise data indicating possible actions (or behaviors) that the robot 10 can be capable of performing. In other words, the action space 610 can comprise possible control commands that the mobile robot 10 can execute. Some of such commands in the action space 610 may comprise basic commands related to the robot's driving, such as, accelerating, braking and steering. The action space 610 can further comprise data related to more complex behaviors of the robot 10, such as, reversing, jump back, jump forward, abandon autonomous operation and request operator assistance. The action space 610 may also comprise restrictions on the actions of the robot 10, such as, a maximum acceleration, maximum braking, maximum velocity, maximum steering and the like. The action space 610 can also be referred to as a control commands space 610.

The cost function 620 can be a function configured to measure (i.e. quantify, score) the quality (i.e. cost) of a road crossing plan. In this regard, the quality of the road crossing plan indicates the safety and efficiency of the road crossing plan. Safety can be measured by whether a road crossing plan can cause an accident or by the likelihood of the road crossing plan causing an accident. On the other hand, efficiency can be measured in terms of the time and energy spent to cross the road and/or whether the crossing was performed autonomously or under operator assistance. Thus, for a road crossing plan offering a high safety the cost function 620 may yield a good score or low cost. In contrast, for a road crossing plan causing an accident the cost function 620 may yield a low score or a high penalty or a high cost. The cost function 620 may be a weighted average between safety and efficiency. Furthermore, a higher weight may be assigned to safety. Put simply, the cost function 620 can facilitate comparing different road crossing plans and/or different configurations of a road crossing method.

The model of the environment 630 may comprise data indicative of a road crossing. Such data may for example indicate the boundaries of a road, the width of the road, the number of lanes on the road and other similar data.

The collected data 640 may be data collected at road crossings. For example, as discussed above when the robot 10 crosses a road it can acquire sensor data related to the road crossing, detect dynamic objects therein, estimate the trajectory of the dynamic objects and so on. This data can be stored in a database and can be used as collected data 640. In other words, the collected data 640 relate to previous road crossings performed by one or more robot 10.

The simulator 600 can be configured to simulate road crossings. Thus, using the model of the environment 630 and the collected data 640 the simulator 600 can simulate the conditions of previous road crossings. That is, the simulator 600 may simulate a road and dynamic objects passing on the road through playback of collected data 640. For example, the simulator 600 may recreate the exemplary scenario illustrated in FIG. 4*a* using the detections 20A to 20E. As the model of the environment 630 relates to a real road crossing and the collected data 640 relate to a real past situation, the simulated road crossing can be highly similar to a real road crossing.

In addition, the simulator 600 can be configured to simulate different robot behaviors using the action space 610. This can be advantageous as the robot 10 can be simulated to cross a road according to different road crossing plans. Through simulation each plan can be checked whether it results in a collision or not.

The cost function 620 can be used to assign a score or cost to each road crossing plan.

Put simply, the simulator 600 using the model of the environment 630 related to a particular road crossing may generate a model of the road crossing. Furthermore, using collected data 640 related to that road crossing the simulator 600 may replay previous scenarios on that road crossing. Further still, on the same road crossing and scenario the robot may be simulated, using the action space 610, to cross the road multiple times and according to different plans. Each plan can be checked for safety and efficiency (e.g. whether it leads to a collision with one of the simulated dynamic objects, the time it takes for the robot to cross the road). Using the cost function 620 a score or cost can be assigned to each crossing plan.

As the crossing plans can be scored, a comparison between them can be made. The plan with the best score can be a safe and efficient road crossing plan. Corollary, the method or techniques or parameters of the method used to generate said road crossing plan can be more advantageous than the others. Said methods or techniques or parameters of the method can be output by the simulator and can be an indication of the optimal parameters of road crossing method 650.

An exemplary list of parameters of a road crossing method that can be tuned or optimized may include the time limit for how long to wait unit calling for operator assistance, distance limit for jumping back to the start of the road crossing if a car is detected while crossing the road, which object detection technique to use, when to stop or go to avoid dynamic objects and the like.

In some embodiments, the simulator can be based on reinforcement learning neural networks. That is, the robot may be simulated to cross a road multiple times. During each crossing, the robot can get penalties for crashing and rewards for successful crossing. Using this technique different configurations of the road crossing method can be tested. For example, the road crossing method discussed with respect to FIG. 3, may comprise multiple configurations based on the time limit for how long to wait unit calling for operator assistance (parameter in step S3), distance limit for jumping back to the start of the road crossing if a car is detected while crossing the road (parameter in step S3), object detection technique used (parameter in step S1), when to stop or go to avoid dynamic objects, how to combine predictions made from object detections and history data (parameter in step S2) and the like. The configuration which minimizes the cost of the cost function 620 may be output and can relate to an optimized and advantageous configuration of the road crossing method.

Above, with reference to FIGS. 1 to 7, methods and system for increasing safety of a mobile robot, particularly for collision avoidance during a road crossing, have been discussed. In the following further methods for increasing safety during the operation of a mobile robot are described. More particularly, with respect to FIGS. 8 to 10, a positioning method (which can also be referred to as software braking method) will be discussed. The positioning method can further increase the safety during the operation of a mobile robot particularly in sloped terrains where the mobile robot can travel, such as, a sloped sidewalk, sloped road, sloped road crossing, etc.

Furthermore, the positioning method can be particularly advantageous for mobile robots equipped with an active braking system (rather than passive braking). An active braking system continuously requires a source of energy to be active (i.e. to provide a braking force), in contrast to a passive braking system that does not require a source of energy to be active. Typically, in a passive braking system the braking force is provided by a motor (generally the same motor that rotates the wheels) which keeps the wheels in a locked state such that the wheels cannot rotate. Thus, with such a braking system, a robot standing motionless in a sloped terrain will require energy for keeping the wheels from rotating. Otherwise, the robot may roll (e.g., as a result of the gravity component in the direction of the slope). This may further increase the risk of the robot colliding with static or dynamic objects.

This may be critical particularly in sloped road crossings. For example, typically the robot may wait motionless at the start of the road crossing before starting to cross the road. For example, the robot may wait at the start of the road crossing (e.g. on the sidewalk) while acquiring sensor data (e.g. during step S1, see FIG. 3), predicting collision points (e.g. step S2, FIG. 3) or for the moment it shall start crossing the road (e.g. according to the generated control commands in step S3, FIG. 3). To stay motionless, the robot may activate the active braking system which locks the wheels. This will require energy. If energy is interrupted (e.g. power source is empty, the robot restarts due to errors or ordered updates, etc.) the wheels cannot not hold in the locked state and the robot may roll in the direction of the slope, due to gravity. This can be particularly dangerous if the robot rolls towards the road as it can cause a collision with passing cars on the road.

To mitigate the described risks, the present technology provides an advantageous positioning method which can also be referred to as software braking system.

Figure 8:
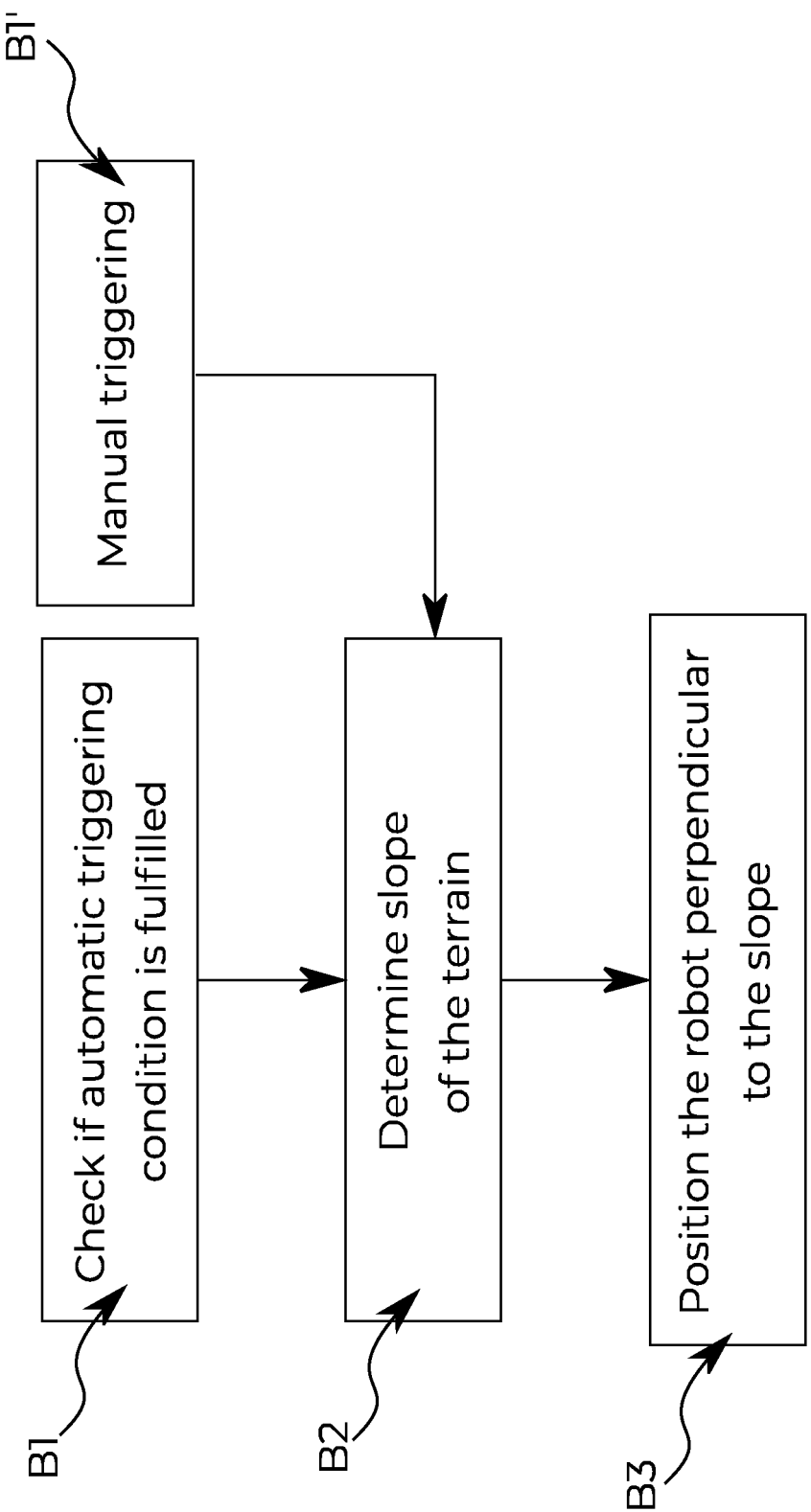
FIG. 8 depicts general steps of a positioning method according to an aspect of the present invention.

FIG. 8 generally describes the steps of the positioning method. As shown by step B1 and B1', the positioning method can be triggered manually or automatically. For manual triggering B1', an operator (e.g. a human operator) may provide a command for the positioning method to proceed. For automatic triggering, one or more automatic triggering conditions shall be fulfilled for triggering the positioning method.

The automatic triggering conditions may relate to whether the robot is positioned on sloped terrain or not. This can be determined based on sensor data that can indicate the direction of gravity relative to the orientation of the robot. Typical sensors that can be used can be a gyroscope and/or accelerometer or similar sensors. Alternatively or additionally, the method discussed in FIG. 9 can be utilized to detect if the robot is positioned in a sloped terrain (e.g. step B210).

Alternatively or additionally, the automatic triggering conditions of the positioning method may relate to the amount of energy left in the power source of a mobile robot. Thus, in step B1 if the power source level drops below a predetermined threshold value then the positioning method may proceed. In some embodiments, the power source level in the mobile robot can be measured periodically. In some embodiments, a counter can be maintained which estimates the time left until power source is emptied or drained below a threshold value. For example, if the counter indicates that less than 60 seconds are left before the power source is emptied or drained below a threshold value then the positioning method proceeds. Typically, the threshold for the counter can be determined based on the time that the positioning method takes to execute such that the power source is not drained before the positioning method finishes execution. For example, the threshold of the energy left in the power source of the mobile robot can be determined based on an estimation (e.g. an upper bound estimation) of the duration that the positioning method requires for completion.

Another automatic triggering condition of the positioning method may relate to whether a robot, particularly a robot on a sloped terrain, is idle or not. In some embodiments, an idle timer can be maintained. The idle timer indicates a time since when the robot has been idle. In an idle state the robot may stay motionless, without performing any driving plan. If the idle timer indicates an idle time longer than a predetermined threshold value (e.g. 5 minutes) then the positioning method may initiate. This is particularly advantageous for preserving energy.

Yet another automatic triggering condition of the positioning method may relate to whether a robot is standing on a sloped terrain and the active braking system (e.g. the motor) is overheating. That is, in a sloped terrain the active braking system needs to be active without interruption for the robot to be motionless. For example, the motor providing the braking force (i.e. keeping the wheels locked) is continuously active. This may overload the active braking system which in turn can cause an overheating of the active braking system. This particularly happens if the active braking systems stays active for extensive periods of time and/or if the slope of the terrain is substantially steep. Furthermore, during overheating components of the active braking system may reach temperatures that can cause damages to the mobile robot. When an overheating of the active braking system is detected the robot positioning method may proceed.

If triggered, manually or automatically, the method may further proceed with steps B2 and B3 wherein the robot can perform one or more maneuvers such that it can be positioned approximately or identically perpendicular to the slope. In such a position, a first component of the gravity can be perpendicular to the ground surface and a second component (i.e. the component parallel to the slope direction) can be approximately or identically perpendicular to the rolling direction of the wheels of the robot. The first component of gravity force can be balanced by the normal force perpendicular to the ground and the second component of the gravity force can be balanced by the frictional forces between the wheels of the robot and the ground. As such, the robot can be in a balanced state and maintain a motionless state. That is, the robot can be in equilibrium.

In other words, by positioning the robot approximately or identically perpendicular to the slope, the component of gravity that is parallel to the rolling direction of the wheels can be minimized (or reduced to zero). More particularly, the robot can be positioned relative to the slope of the terrain such that gravity cannot cause the wheels of the robot to rotate. As such, the robot can stay motionless (i.e. in equilibrium) on a sloped terrain through the presence of friction between the wheels and the ground. Thus, no energy is required for staying motionless. On one hand this increases safety. Even if the power source in the mobile robot is interrupted after the robot completes the positioning method, the robot may still continue to be motionless (as the forces acting on the robot balance each other without the need of brakes). That is, the positioning method may serve as a fallback method in case of a malfunction, such as, power interruption. On the other hand, the positioning method can increase efficiency. The power required to keep the robot from rolling downhill is minimized or even reduced to zero. This is particularly advantageous when the robot is waiting in a sloped terrain to perform a task.

In some embodiments, in step B2 the slope of the terrain can be determined using at least one sensor of the mobile robot, wherein the said sensor can be configured to measure and/or indicate the direction of gravity (i.e. the gravity vector) relative to the orientation of the robot (and vice versa). Said sensor(s) can be sensor(s) that typically measure the orientation of the mobile robot. In some embodiments, the mobile robot can comprise a gyroscope sensor. Alternatively or additionally, the mobile robot can comprise an accelerometer. The measurements of the gyroscope and/or accelerometer can be used to determine the slope of the terrain. Then on step B3, the robot can change its pose such that it is oriented perpendicular to the slope of the terrain. Alternatively, in step B3 the robot can change its pose such that the gravity cannot cause the robot to roll. That is, in some instances it may not be necessary for the robot to be positioned exactly perpendicular to the slope of the terrain. It may be sufficient to position the robot such that the gravity component in the rolling direction of the wheels can be balanced by frictional forces (i.e. said gravity component cannot cause the wheels to rotate). In general, the angle between the rolling direction of the wheels and the direction of the slope, such that gravity cannot cause the wheels to rotate, can depend on the slope of the terrain, the friction between the wheels and the ground and the friction of the wheel's rolling mechanism. Typically, the higher the slope the closer the angle between the rolling direction of the wheels and the direction of the slope needs to be to a right angle such that gravity cannot cause the wheels to rotate. For the sake of brevity, step B3 may be referred to as "position the robot perpendicular to the slope". However, as discussed above, the angle between the rolling direction of the wheels and the direction of the slope may not necessarily be exactly a right angle.

To handle possible errors during the determination of the slope of the terrain using sensor data in step B2 and/or during the positioning of the robot perpendicular to the slope in step B3, steps B2 and B3 may be repeated multiple times. That is, firstly sensor data indicating the direction of gravity can be acquired. Using the sensor data, the slope of the terrain can be determined. Then the robot may change its pose such that it can be positioned perpendicular to the determined slope. Further, sensor data indicating the direction of gravity can be acquired. Again, the slope of the terrain can be determined. Using the newly determined slope of terrain the position of the robot can be corrected such that it is perpendicular to the slope. This can be repeated multiple times or until no further corrections of the pose of the robot are required. That is, step B2 and B3 can be performed in a feedback loop.

To provide further safety, a final check can be performed wherein the robot can release the brakes and check the wheels whether they rotate due to gravity and/or check whether the robot rolls due to gravity. If the wheels do not rotate and the robot does not roll, then the positioning method may terminate. Otherwise, steps B2 and B3 can be repeated again.

However, in some instances the robot may not comprise any sensor(s) which can indicate the direction of gravity relative to the orientation of the robot. Alternatively or additionally, such sensors (e.g. gyroscope, accelerometer) can fail. In such instances, the slope of the terrain in step B2 cannot directly be determined based on sensor data and as such the robot cannot be positioned perpendicular to the slope in step B3. The present invention also deals with such scenarios.

Figure 9:
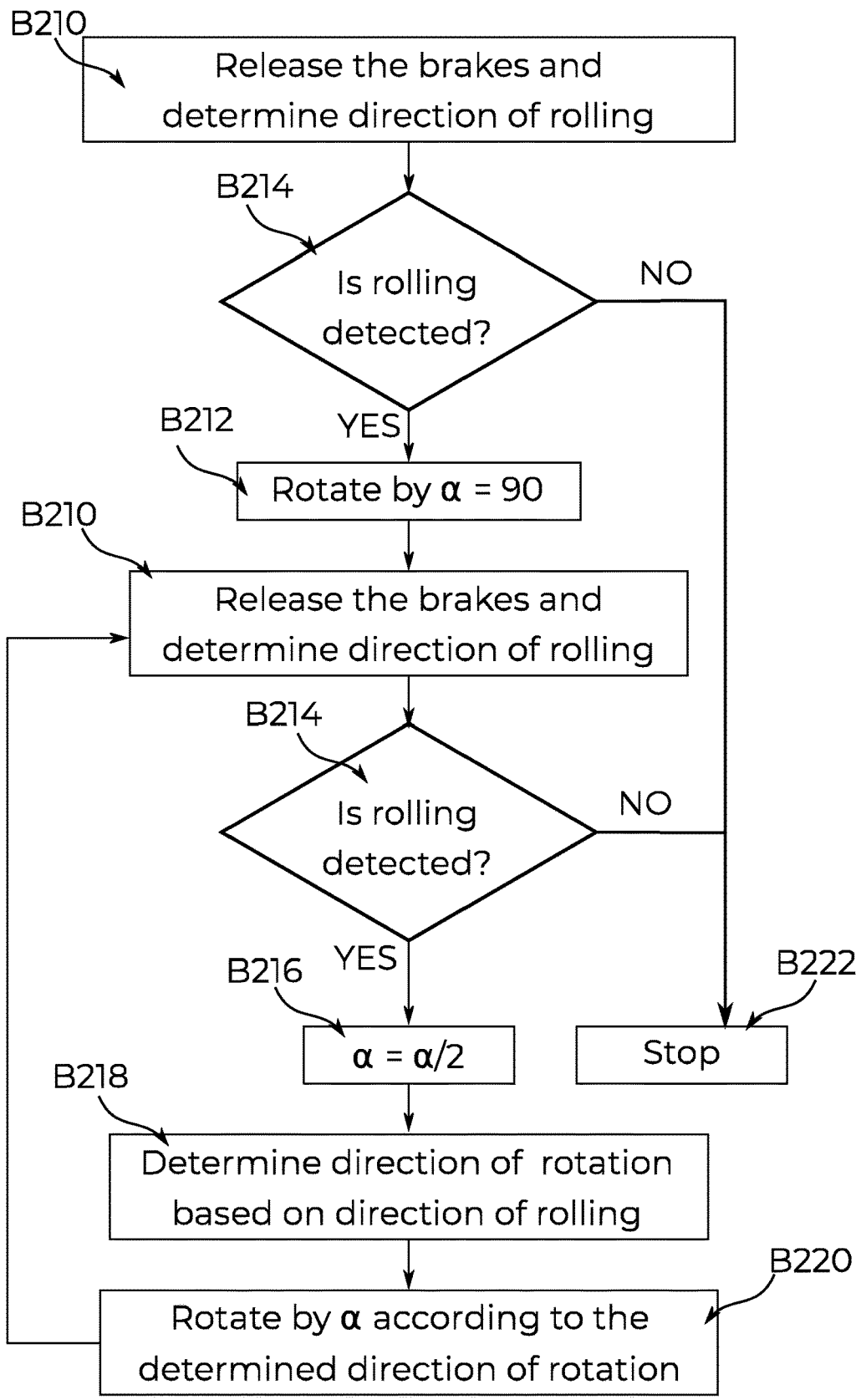
FIG. 9 depicts a particular embodiment of the positioning method.

FIG. 9 depicts a plurality of steps of the positioning method to position the robot approximately or identically perpendicular to the slope, without measuring the slope directly using sensors. More particularly FIG. 9 depicts a plurality of maneuvers that the robot can perform, such that it can be positioned approximately or identically perpendicular to the slope of the terrain.

More particularly, the robot can roll due to gravity if the force due to friction between the wheels and the terrain where the robot stands cannot cancel each other. The force due to friction between the wheels and the terrain is at maximum, when the wheels are oriented such that the friction force is perpendicular to the wheels rolling direction. Based on this rationale, the positioning method aims at changing the orientation of the robot such that the friction force between the wheels and the terrain is substantially perpendicular to the wheels rolling direction.

In other words, the acceleration of the robot due to gravity depends on the orientation of the robot and, more particularly, on the angle between the robot's forward direction and the slope of the terrain. For the sake of brevity, the angle between the robot's forward direction and the slope of the terrain can be referred to as the deviation angle (i.e. deviation angle). Thus, the acceleration of the robot due to gravity depends on (i.e. is a function of) the deviation angle. Moreover, the acceleration of the robot as a function of the deviation angle is a periodic function, with a period of 360°. Furthermore, two deviation angles with a difference of 180° yield the same acceleration due to gravity. Further still, the acceleration is zero if the deviation angle is 90° or 270°. That is, the acceleration function comprises two roots, which are 180° apart. Based on the above rationales, the problem of orienting the robot such that it cannot roll due to gravity is equivalent to finding the roots of the acceleration function. As discussed above, the roots of the acceleration function are located at deviation angles of 90° and 270°. Thus, if the orientation of the robot relative to the gravity vector can be measured (e.g. using a gyroscope and/or accelerometer, as discussed above), then the robot can directly orient itself such that the deviation angle is 90° or 270°. This embodiment was discussed above with reference to FIG. 8. However, in some cases, the robot may not be operable to measure or determine its orientation. As such, the robot cannot now the direction of the gravity vector and of the slope of the terrain. Hence, the robot cannot determine which orientation of the robot can result in a deviation angle of 90° or 270°. Thus, the robot needs to search for one of the said positions.

In general, the present invention relates to a positioning method which can orient a robot such that it cannot roll due to gravity without directly measuring the orientation of the robot relative to the gravity vector, the direction of the gravity vector and the slope of the terrain. The positioning method can comprise orienting the robot according to one or more orientations, such that at each orientation a respective deviation angle is formed. Further, the positioning method can comprise the robot at each orientation releasing the brakes and determining whether it moves and in which direction it moves. Herein, determining whether the robot moves forward or backwards can be sufficient. For example, the robot can measure whether the wheels rotate and/or the direction of rotation of the wheels (clockwise or anticlockwise). If the robot detects that it does not move when the brakes were released, this means that the root of the acceleration function is found, and the positioning method can stop executing. Otherwise, the robot can continue changing the orientation until it can no longer roll due to gravity.

In some embodiments, the positioning method can be based on a linear search (also referred to as a sequential search). Herein, the positioning method can initiate at any arbitrary orientation of the robot (i.e. at any deviation angel). The robot can release the brakes and can measure whether it rolls. If the robot does not roll, then the robot is already at an orientation wherein it cannot roll due to gravity and the positioning method may terminate. Otherwise, the robot can rotate in a predetermined direction (e.g. always rotate in the same direction) by a predetermined rotation step. The rotation step can be between 0.5° to 5°, preferably between 1° to 2.5°, such as 2°. After each rotation, the robot can release the brakes and check whether it rotates. The robot may continue rotating in the same direction in steps, until the robot is oriented such that gravitation cannot cause the robot to roll.

The positioning method based on a linear search can be advantageous as it requires very minimal measurements. That is, it can be sufficient to only measure whether the robot moves or not when breaks are released. Such a determination can be made by a plurality of sensors, hence, the positioning method based on a linear search can be robust against many sensor failures. On the other hand, measuring whether the robot moves requires simple sensors. Hence, the positioning method based on a linear search requires simple sensors to be performed.

In some embodiments, the positioning method based on a linear search can be optimized by measuring the direction of rolling due to gravity. In such embodiments, instead of rotating in the same direction at each step, the robot can determine in which step to rotate at each step based on the direction of rolling. As such, the number of maneuvers required to position the robot such that it cannot roll due to gravity can be reduced, however further sensors may be required.

The positioning method based on a linear search may converge slowly to the orientation wherein the robot cannot roll due to gravity. As such, more time and energy may be required to perform the positioning method. With respect to FIG. 9, another embodiment of the positioning method will be discussed, wherein the positioning method is based on a bisection search.

As illustrated in FIG. 9, in a step B210, the direction of rolling of the mobile robot due to gravity can be determined. In a particular embodiment, this can be performed by having the robot release the brakes. Additionally, the robot can keep the wheels straight (i.e. non-steered). If positioned in a sloped terrain, gravity may cause the robot to roll. Depending on the pitch angle of the robot, the robot may roll forward or backwards. The robot can compare the current pose with the previous pose (i.e. the pose before releasing the brakes) and based thereon can determine the direction of rolling of the robot due to gravity (i.e. the sign of the pitch angle). It will be noted that a determination of whether the robot rolls forwards or backwards can be sufficient in the present method. For example, this determination can be performed by detecting the direction of rotation of one or more wheels of the robot. The direction of rotation of the wheels of the robot can indicate whether the robot moved forwards or backwards due to gravity.

It will be noted that the task of the method is to minimize the acceleration vector due to gravity (i.e. the rolling of the robot due to gravity), preferably reduce it to zero. Furthermore, it will be noted that in step B210 the brakes can be released for a short duration of time, such as, 0.1 to 3.5 seconds, or for a specified number of wheel rotations or at least until a direction of rotation of the wheels can be reliably detected. This can avoid the robot rolling forward for long distances which may cause collisions. That is, preferably the maneuvers of the positioning method are performed on the spot, such as, on an area not larger than 1.1 to 2.4 times the area occupied by the robot.

Furthermore, it will be noted that the direction of rolling as used herein can refer or be equivalent to the sign of the pitch angle of the robot. That is, the direction of rolling only refers to whether the robot rolls forward or backwards. More particularly, the direction of rolling is a binary value. In other words, the rolling direction indicates the sign of the acceleration vector of the robot with respect to the yaw axis of the robot (i.e. with respect the forward direction of the robot). More particularly, the rolling direction indicates the sign of the component of the acceleration vector of the robot parallel to the yaw axis of the robot (i.e. with respect the forward direction of the robot).

In a further step B214, after releasing the brakes, the robot may check whether it rolled. Again, as discussed above this determination can be based by detecting whether the wheels rotated when the brakes were released. In some instances, the robot may be already positioned such that gravity may not cause the robot to roll. In such embodiments, no maneuvers may be required and the method may terminate at step B222. That is, if in step B210 the robot does not roll when the brakes are released, then step B214 is followed by step B222 wherein the positioning method terminates.

However, if in step B214-I it is determined that the robot rolled when the brakes were released, then the method continues in a further step B212, wherein the robot may rotate by 90° relative to the previous pose. The robot may arbitrarily choose to rotate clockwise or anticlockwise. Alternatively, the robot may determine to rotate such that at the end of the positioning method, the robot is positioned with its forward direction (i.e. with its nose) towards the sidewalk. This way, the robot may directly resume operation afterwards, by directly starting to travel on the sidewalk. This is particularly advantageous for mobile robots configured to typically travel on sidewalks. Alternatively, the robot may be configured to always perform the first rotation in step B212 in a predetermined direction (e.g. always turn to the right).

After the initial rotation in step B212, the positioning method continues with step B210, wherein the brakes are released and the direction of rolling of the robot (now in the new pose) can be determined, as discussed above. Afterwards, in step B214 it is checked whether the robot rolled when the brakes were released in the new orientation. If rolling is detected, this means that the gravity still causes the robot to roll. If this is the case, the positioning method can proceed with steps B216 wherein the angle of rotation for the next rotation is set to half the previous angle of rotation.

Then, in step B218, depending on the direction of rolling (i.e. sign of the pitch angle), determined in the previous instance of step B210 (i.e. in the previous iteration), the direction of rotation can be determined. In step B218, the direction of rotation can be determined such that the acceleration vector can be reduced. More particularly, the direction of rotation can be determined to be the same with the previous direction of rotation, if the direction of rolling is the same with the previous direction of rolling. Otherwise, if the direction of rolling is opposite to the previous direction of rolling, the direction of rotation is set opposite to the previous direction of rotation.

In a step B220, the robot performs the maneuver by rotating according to the angle determined in step B216 (i.e. half the previous angle of rotation) and according to the direction of rotation determined in step B218.

Afterwards, the positioning method can loop back to step B210 and proceed as discussed. Once the gravity cannot cause the robot to roll, the method can terminate at step B222.

As it will be understood, the above method can determine an equilibrium position of the robot in a sloped terrain without directly measuring the magnitude or direction of the slope of the terrain and without directly measuring the magnitude or direction of the acceleration of the robot due to gravity. Instead, the positioning method only requires the sign of the acceleration of the robot due to gravity, i.e., whether the robot moves forward or backwards.

Figure 10:
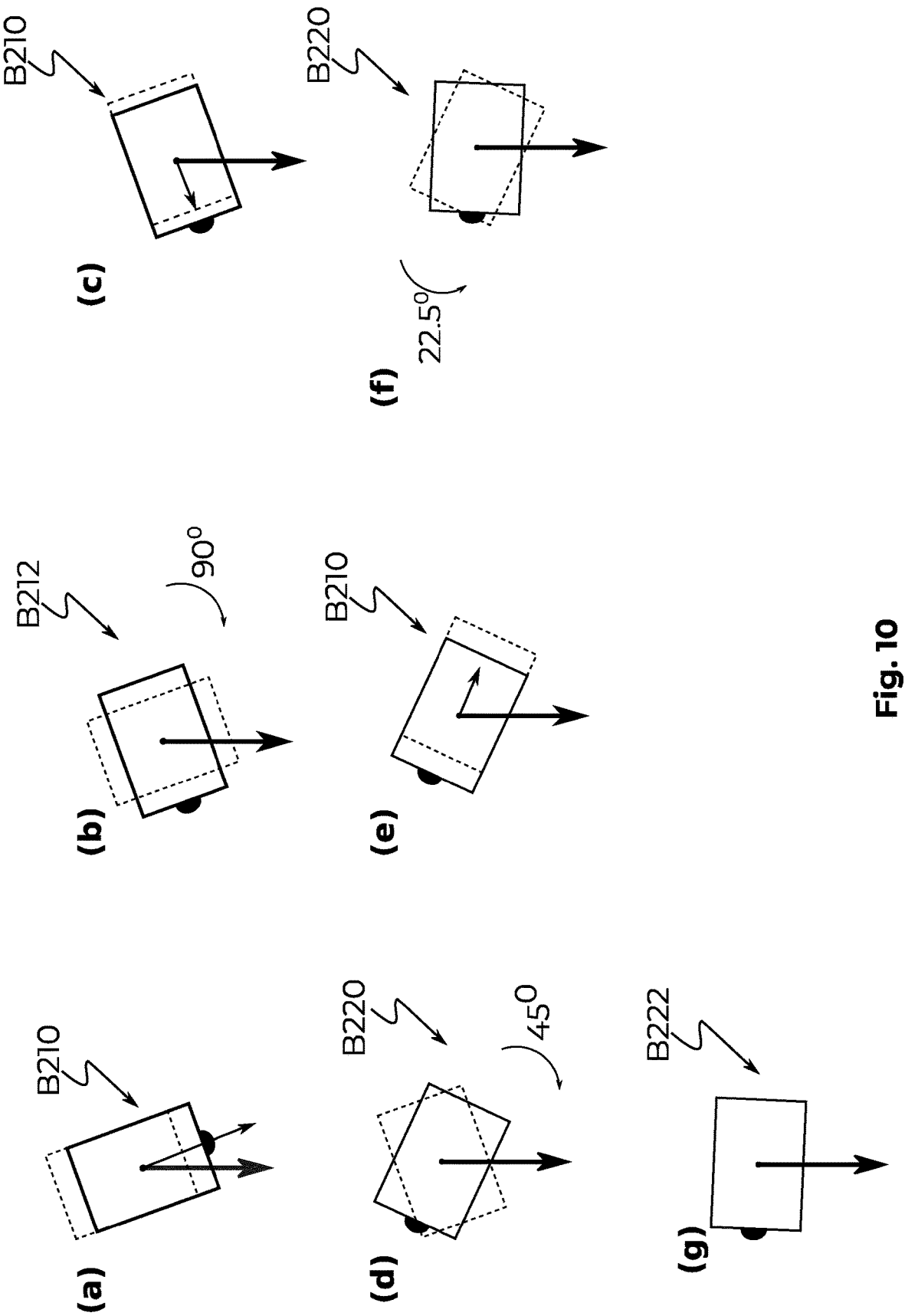
FIGS. 10a to 10g illustrate a plurality of maneuvers performed by the mobile robot while carrying the positioning method.

FIG. 10 illustrates the method of FIG. 9. The robot is depicted by the rectangle (with the filled semi-circle used to indicate one of the sides of the robot, e.g. the front side). The complete line depicts the current pose of the robot, while the dashed rectangle depicts the previous pose. The bold arrow depicts the direction of the slope of the terrain where the mobile robot is positioned, while the thin arrow depicts the forward direction of the robot. The angle between the bold arrow and the thin arrow represents the deviation angle.

In FIG. 10a, step B210 is illustrated, wherein the robot releases the brakes and rolls due to gravity in a forward direction (i.e. the direction of roll is positive with respect to the forward direction). Thus, in step B214 the robot determines that it is not oriented such that it cannot roll due to gravity. Hence, in step B212, the robot rotates by 90° as illustrated in FIG. 10b. As illustrated, the robot performs a 90° clockwise rotation in step B212.

As illustrated in FIG. 10c, the robot at the new orientation, performs steps B210 again, wherein the robot releases the brakes and determines the direction of rolling. As illustrated, the robot rolls in the forward direction. As the robot still rolls due to gravity, further maneuvers are required. The rolling in FIG. 10c has the same direction with the previous rolling in FIG. 10a, as in both orientations the robot rolls forward. Thus, in a next maneuver the robot rotates according to the same direction and with half the angle of the previous maneuver (illustrated in FIG. 10b). As illustrated in FIG. 10d, in step B220, the robot rotates by 45° in the clockwise direction.

As illustrated in FIG. 10e, performs steps B210 again, wherein the robot releases the brakes and determines the direction of rolling. The robot rolls in the backward direction (i.e. the direction of roll is negative with respect to the forward direction). As the direction of roll is opposite to the previous direction of roll, in a next maneuver illustrated in FIG. 10f, the robot rotates by 22.5° in the counter-clockwise direction.

The robot performs step B210 again in the orientation and can determine that the robot cannot roll anymore due to gravity. Based on this, the positioning method can terminate, as illustrated in FIG. 10g.

Typically, the robot cannot roll if it is within 2° of the axes perpendicular to the slope. This implies that the bisection method can reach the equilibrium state within 7 rotations. In some scenarios, the rotations may not be executed precisely to the desired angle. However, this can be compensated for by allowing for more steps. At the same time, the allowed deviation from the perpendicular direction can be greater than 2°. So, the algorithm is likely to complete within step 4 or 5. Thus, the bisection method can be advantageous to find a state in which the robot does not need to apply brakes.

The bisection method, as discussed with reference to FIGS. 9 and 10, can be advantageous because it uses only the sign of the acceleration function and it guarantees convergence to the root with known error, irrespective of the robot's starting orientation. The starting error can initially be 180° and at each step the error is halved.

Whenever a relative term, such as "about", "substantially" or "approximately" is used in this specification, such a term should also be construed to also include the exact term. That is, e.g., "substantially straight" should be construed to also include "(exactly) straight".

It should also be understood that whenever reference is made to an element this does not exclude a plurality of said elements. For example, if something is said to comprise an element it may comprise a single element but also a plurality of elements.

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, a preferred embodiment has been described with reference to the accompanying drawings, the skilled person will understand that this embodiment was provided for illustrative purpose only and should by no means be construed to limit the scope of the present invention, which is defined by the claims.

Furthermore, reference numbers and letters appearing between parentheses in the claims, identifying features described in the embodiments and illustrated in the accompanying drawings, are provided as an aid to the reader as an exemplification of the matter claimed. The inclusion of such reference numbers and letters is not to be interpreted as placing any limitations on the scope of the claims.

The invention claimed is:

1. A road crossing method for a mobile robot, the method comprising:

the mobile robot approaching a road crossing; and
a data processing unit:
estimating a location and time of collision with at least one dynamic object on the road crossing;
generating a time-to-collision (TTC) map based on the estimated locations and times of collision with the at least one dynamic object; and
generating control commands for the mobile robot to avoid collision with the at least one dynamic object based on the estimated location and time of collision with the at least one dynamic object,
wherein generating control commands for the mobile robot to avoid collision with the at least one dynamic object based on the estimated location and time of collision with the at least one dynamic object comprises finding on the TTC map a road crossing plan, and
wherein finding on the TTC map a road crossing plan comprises finding on the TTC map a safe road crossing plan, and
wherein a safe road crossing plan is a road crossing plan with a minimum or zero or less than a threshold likelihood of collision, and
wherein finding on the TTC map a road crossing plan comprises finding on the TTC map a minimum-cost and safe road crossing plan,
wherein the cost of a road crossing plan is proportional to the time required and/or distance traveled to perform the road crossing according to the road crossing plan.

2. The method according to claim 1, wherein the method comprises using a path finding algorithm to find on the TTC map a road crossing plan.

3. The method according to claim 1, wherein generating control commands for the mobile robot to avoid collision with the at least one dynamic object based on the estimated location and time of collision with the at least one dynamic object comprises:
calculating a velocity of the mobile robot as a function of time, at least for the duration of the road crossing, and/or
calculating a velocity of the mobile robot as a function of distance, at least for the length of the road crossing.

4. The method according to claim 1, wherein generating control commands for the mobile robot to avoid collision with the at least one dynamic object based on the estimated location and time of collision with the at least one dynamic object comprises
generating acceleration commands, braking commands, steering commands, reversing commands, jump back commands, jump forward commands, abandon autonomous operation commands, contact operator commands and/or request operator assistance command.

5. The method according to claim 1, wherein the method comprises using an artificial neural network to generate control commands for the mobile robot.

6. The method according to claim 5, wherein the method comprises inputting the TTC map to the artificial neural network to generate control commands for the mobile robot.

7. The method according to claim 1, wherein the method comprises the mobile robot crossing the road according to the generated control commands.

8. The method according to claim 1, wherein the method is executed iteratively and wherein, in each iteration, the method comprises:
generating control commands for the mobile robot to avoid collision with the at least one dynamic object based on the estimated location and time of collision with the at least one dynamic object; and the mobile robot crossing at least a portion of the road according to the control commands generated on that iteration.

9. The method according to claim 1, wherein the data processing unit estimating a location and time of collision with at least one dynamic object on the road crossing comprises the data processing unit predicting a trajectory of motion of the at least one dynamic object and detecting at least one intersection between the trajectory of motion of the at least one dynamic object and the trajectory of motion of the mobile robot.

10. The method according to claim 9, wherein predicting a trajectory of motion of the at least one dynamic object comprises at least one of:

extending a velocity vector of the at least one dynamic object; and/or extrapolating at least two previous locations of the at least one dynamic object.

11. The method according to claim 1, wherein the method further comprises the data processing unit correcting the estimated location and time of collision based on history data related to the road crossing, and wherein the history data related to a road crossing comprises a passing car histogram related to the road crossing, and wherein the method further comprises the data processing unit correcting the estimated location and time of collision based on the passing car histogram.

12. The method according to claim 11, wherein correcting the estimated location and time of collision based on a passing car histogram related to the road crossing comprises calculating the location and time of collision as a weighted average of the estimated location and time of collision and a mean or mode of the passing car histogram.

13. The method according to claim 1, wherein the TTC map is a two-dimensional map comprising, in a first axis, a distance along the road crossing, and, in a second axis, time.

14. The method according to claim 1, wherein the method comprises upon detecting a dynamic object and estimating the location and time to collision with the dynamic object, labeling a collision zone of the TTC map as occupied by the dynamic object.

15. The method according to claim 14, wherein labeling a collision zone of the TTC map as occupied by the dynamic object comprises assigning at least one probability of collision to the collision zone.

16. A mobile robot comprising:

a data processing unit configured to:

estimate a location and time of collision with the at least one dynamic object; and generate control commands for the mobile robot to avoid collision with the at least one dynamic object based on the estimated location and time of collision with the at least one dynamic object; and wherein the mobile robot is configured to carry out the road crossing method of claim 1.

17. A road crossing method for a mobile robot, the method comprising:

the mobile robot approaching a road crossing; and a data processing unit:

estimating a location and time of collision with at least one dynamic object on the road crossing;

generating a time-to-collision (TTC) map based on the estimated locations and times of collision with the at least one dynamic object; and generating control commands for the mobile robot to avoid collision with the at least one dynamic object based on the estimated location and time of collision with the at least one dynamic object, wherein the method further comprises the data processing unit correcting the estimated location and time of collision based on history data related to the road crossing, and wherein the history data related to a road crossing comprises a passing car histogram related to the road crossing, and the method further comprises the data processing unit correcting the estimated location and time of collision based on the passing car histogram.

* * * * *